United States Patent
Mugura et al.

(10) Patent No.: US 11,645,840 B2
(45) Date of Patent: May 9, 2023

(54) INFORMATION PROCESSING APPARATUS, INFORMATION PROCESSING METHOD, PROGRAM, AND MOVING BODY

(71) Applicant: Sony Corporation, Tokyo (JP)

(72) Inventors: Kazuto Mugura, Tokyo (JP); Ayaka Satoh, Kanagawa (JP); Satoshi Akagawa, Tokyo (JP); Shoji Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/640,727

(22) PCT Filed: Aug. 17, 2018

(86) PCT No.: PCT/JP2018/030489
§ 371 (c)(1),
(2) Date: Feb. 21, 2020

(87) PCT Pub. No.: WO2019/044536
PCT Pub. Date: Mar. 7, 2019

(65) Prior Publication Data
US 2020/0184219 A1  Jun. 11, 2020

(30) Foreign Application Priority Data

Aug. 31, 2017 (JP) .............................. JP2017-166871
Mar. 30, 2018 (JP) .............................. JP2018-069055

(51) Int. Cl.
*G06V 20/20* (2022.01)
*G01C 21/20* (2006.01)
(Continued)

(52) U.S. Cl.
CPC ............. *G06V 20/20* (2022.01); *G01C 21/20* (2013.01); *G06V 20/56* (2022.01); *G06V 20/59* (2022.01); *H04N 5/23212* (2013.01)

(58) Field of Classification Search
None
See application file for complete search history.

(56) References Cited

U.S. PATENT DOCUMENTS

| 7,561,966 B2 | 7/2009 | Nakamura |
| 2012/0114178 A1* | 5/2012 | Platonov ............ G06K 9/00791 |
| | | 382/103 |

(Continued)

FOREIGN PATENT DOCUMENTS

| JP | 2005-070231 A | 3/2005 |
| JP | 2015-504815 A | 2/2015 |
| WO | WO-2016181749 A1 | 11/2016 |

OTHER PUBLICATIONS

International Search Report and Written Opinion dated Sep. 18, 2018 for PCT/JP2018/030489 filed on Aug. 17, 2018, 14 pages including English Translation of the International Search Report.

*Primary Examiner* — Robert Bader
(74) *Attorney, Agent, or Firm* — Xsensus LLP

(57) ABSTRACT

The present technique relates to an information processing apparatus, an information processing method, a program, and a moving body that can appropriately display content on top of a scene viewed by a user.

An aspect of the present technique provides an information processing apparatus that sets a frame as a superimposition location of content in a region corresponding to a surface of an object on the basis of a movement state of a user and generates visual information for displaying the content in the region corresponding to the set frame. The present technique can be applied to an apparatus that performs AR display of content.

20 Claims, 60 Drawing Sheets

(51) Int. Cl.
*H04N 5/232* (2006.01)
*G06V 20/56* (2022.01)
*G06V 20/59* (2022.01)

(56) References Cited

U.S. PATENT DOCUMENTS

| | | | |
|---|---|---|---|
| 2012/0206452 A1* | 8/2012 | Geisner | H04S 7/304 345/419 |
| 2013/0050258 A1* | 2/2013 | Liu | G06F 3/005 345/633 |
| 2014/0012674 A1* | 1/2014 | Piccionielli | G06Q 30/0257 705/14.55 |
| 2015/0296199 A1* | 10/2015 | Fuehrer | H04N 13/239 348/47 |
| 2016/0147073 A1* | 5/2016 | Onda | G02B 27/01 345/7 |
| 2017/0116785 A1 | 4/2017 | Jarvis et al. | |
| 2018/0089899 A1* | 3/2018 | Piemonte | G06T 15/205 |
| 2019/0180451 A1* | 6/2019 | Kellner | G06T 7/285 |

\* cited by examiner

FIG.29

A
File_01
Type = Text
Number of Letters = 42    Time for Reading = 10 Sec.
Proportion = 4:3
Time for Viewing = Time for Reading = 10 Sec.
→ Positioning Factors B
File_02
Type = Movie
Playback Duration = 20 Sec.
Proportion = 16:9
Time for Viewing = Playback Duration = 20 Sec.
→ Positioning Factors C
File_03
Type = Image    Text = Included
Number of Letters = 28    Time for Reading = 7 Sec.
Proportion = 3:4
Time for Viewing = Time for Reading = 7 Sec.
→ Positioning Factors D
File_04
Type = Image    Text = Included
Number of Letters = 18    Time for Reading = 5 Sec.
Proportion = 1:1
Time for Viewing = Time for Reading = 5 Sec.
→ Positioning Factors

File_01 [Type = Text], [Proportion = 4:3], [Time for Viewing = 10 Sec.]
Frame_11[1:0.9] = 20, [4 Sec.] = 10 → Total:30
Frame_12[3:4.2] = 10, [7 Sec.] = 20 → Total:30
Frame_13[4:3.2] = 40, [14 Sec.] = 50 → Total:90
Frame_14[16:8] = 30, [17 Sec.] = 40 → Total:70

B

File_02 [Type = Movie], [Proportion = 16:9], [Time for Viewing = 20 Sec.]
Frame_11[1:0.9] = 0, [4 Sec.] = 0 → Total:0
Frame_12[3:4.2] = 0, [7 Sec.] = 0 → Total:0
Frame_13[4:3.2] = 20, [14 Sec.] = 30 → Total:50
Frame_14[16:8] = 40, [17 Sec.] = 40 → Total:80

C

File_03 [Type = Image & Text], [Proportion = 3:4], [Time for Viewing = 7 Sec.]
Frame_11[1:0.9] = 20, [4 Sec.] = 20 → Total:30
Frame_12[3:4.2] = 40, [7 Sec.] = 50 → Total:90
Frame_13[4:3.2] = 10, [14 Sec.] = 50 → Total:60
Frame_14[16:8] = 0, [17 Sec.] = 50 → Total:50

D

File_04 [Type = Image & Text], [Proportion = 1:1], [Time for Viewing = 5 Sec.]
Frame_11[1:0.9] = 40, [4 Sec.] = 30 → Total:70
Frame_12[3:4.2] = 20, [7 Sec.] = 50 → Total:70
Frame_13[4:3.2] = 20, [14 Sec.] = 50 → Total:70
Frame_14[16:8] = 10, [17 Sec.] = 50 → Total:60

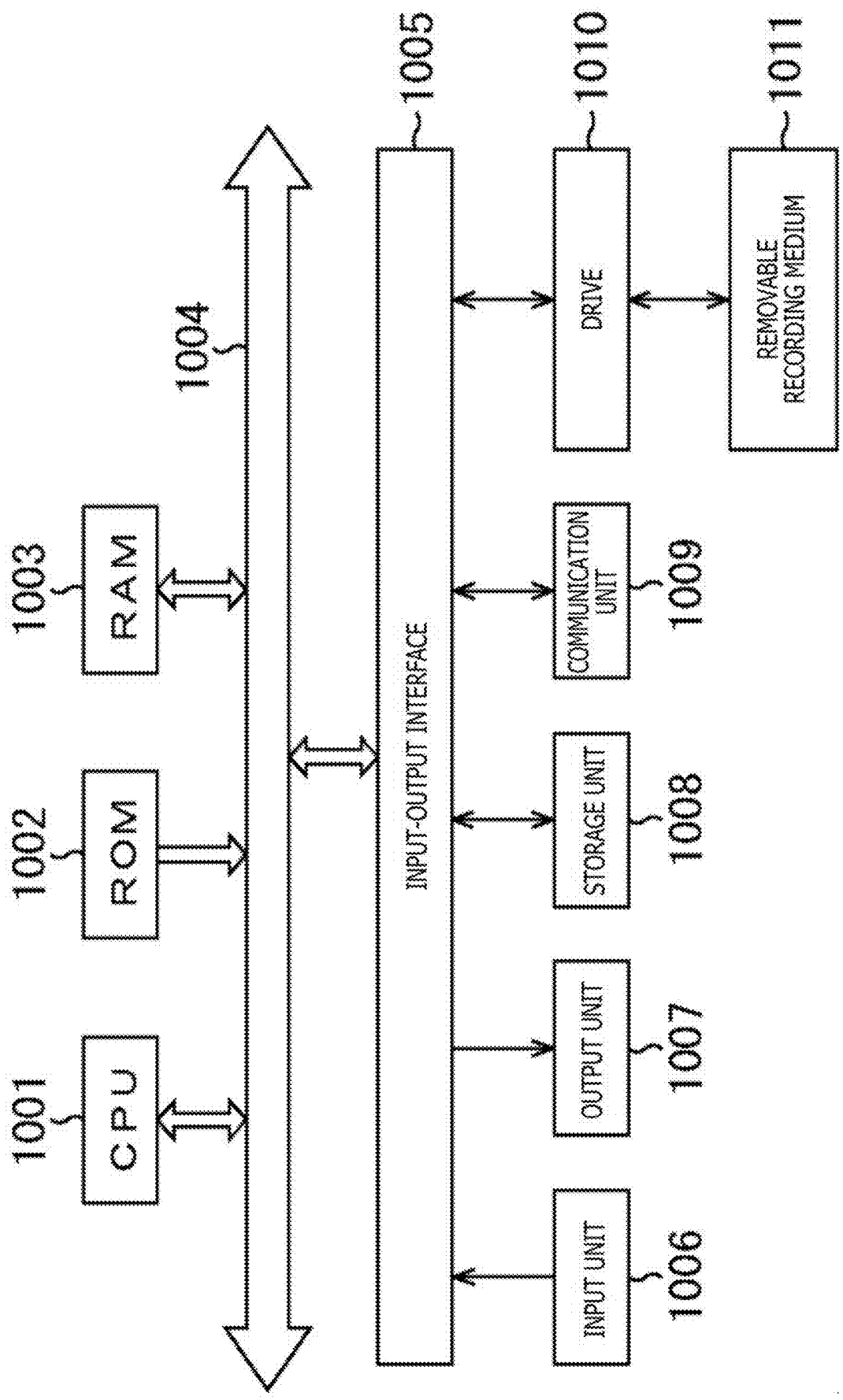

INFORMATION PROCESSING APPARATUS, INFORMATION PROCESSING METHOD, PROGRAM, AND MOVING BODY

CROSS-REFERENCE TO RELATED APPLICATIONS

The present application is based on PCT filing PCT/JP2018/030489, filed Aug. 17, 2018, which claims priority to JP 2017-166871, filed Aug. 31, 2017, and JP 2018-069055, filed Mar. 30, 2018, the entire contents of each are incorporated herein by reference.

TECHNICAL FIELD

The present technique relates to an information processing apparatus, an information processing method, a program, and a moving body, and particularly, to an information processing apparatus, an information processing method, a program, and a moving body that can appropriately display content on top of a scene viewed by a user.

BACKGROUND ART

There is a technique of using a head-up display to project, to a windshield, information regarding a facility or the like included in a visual field of a driver and presenting the information to the driver. The driver views various types of information on top of a scene spreading in front of the driver.

PTL 1 discloses a technique of displaying an AR (Augmented Reality) image regarding a facility in association with a real scene viewed by the driver, in which the AR image is displayed far when the vehicle speed is fast, and the AR image is displayed close when the vehicle speed is slow.

CITATION LIST

Patent Literature

[PTL 1]
Japanese Patent Laid-Open No. 2015-77876

SUMMARY

Technical Problem

It is desirable to present information in a form that the information can be viewed as if the information is fit into the scene. By displaying the information such that the information is fit into the scene, the driver can view the information while concentrating on the drive.

The present technique has been made in view of the circumstances, and the present technique can appropriately display content on top of a scene viewed by a user.

Solution to Problem

An aspect of the present technique provides an information processing apparatus including a setting unit that sets a frame as a superimposition location of content in a region corresponding to a surface of an object on the basis of a movement state of a user, and a display control unit that generates visual information for displaying the content in the region corresponding to the set frame.

In the aspect of the present technique, the frame as the superimposition location of the content is set in the region corresponding to the surface of the object on the basis of the movement state of the user, and the visual information for displaying the content is generated in the region corresponding to the set frame.

Advantageous Effect of Invention

According to the present technique, the content can be appropriately displayed on top of the scene viewed by the user.

Note that the advantageous effect described here may not necessarily be limited, and the advantageous effect may be any of the advantageous effects described in the present disclosure.

BRIEF DESCRIPTION OF DRAWINGS

FIG. 29 depicts diagrams each illustrating an example of content information items.

FIG. 30 depicts diagrams each illustrating an example of fitness.

FIG. 60 is a block diagram illustrating a configuration example of a computer.

DESCRIPTION OF EMBODIMENTS

Hereinafter, embodiments of the present technique will be described. The embodiments will be described in the following order.

1. First Embodiment
1-1. Display Example of Content
1-2. Configuration Example of Vehicle Control System
1-3. Motion of Vehicle Control System
1-4. Modification
2. Second Embodiment
2-1. Summary of Second Embodiment
2-2. Setting Example of Defocus Range 2-3. Setting Example of Defocus Ranges in Case Where There Is Plurality Of Information Superimposition Appropriate Frames
2-4. Configuration Example of Second Embodiment of Display Control Unit
2-5. Modification
3. Third Embodiment
3-1. Summary of Third Embodiment
3-2. Configuration Example of Vehicle Control System
3-3. Display Process of Display Processing Unit in FIG. 55
3-4. Modification 1. First Embodiment <<1-1. Display Example of Content>>

Figure 1:
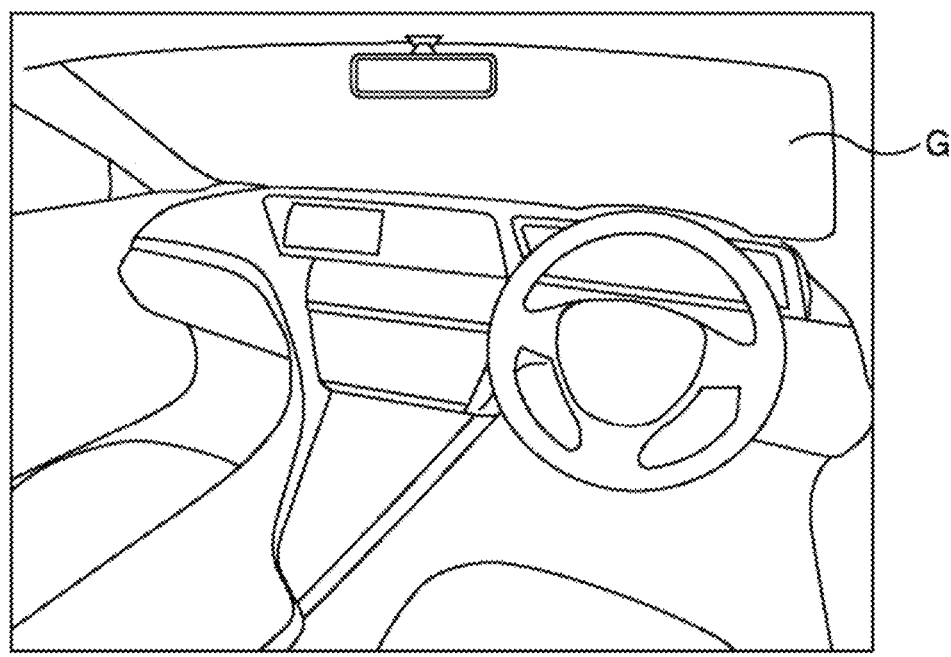
FIG. 1 is a diagram illustrating an interior of a vehicle provided with a vehicle control system according to a first embodiment of the present technique.

FIG. 1 is a diagram illustrating an interior near a driver's seat of a vehicle provided with a vehicle control system according to an embodiment of the present technique.

As illustrated in FIG. 1, a windshield G is provided beyond a dashboard as viewed from a user (driver) sitting on the driver's seat. The vehicle control system displays content by, for example, projecting an image on the windshield G. The user views the content on top of a scene that can be viewed through the windshield G.

Note that, although the occupant of the vehicle viewing the content is the driver in the case described below, the user viewing the content may also be another user sitting on the front seat or the back seat.

Examples of the content to be displayed include images representing various types of information, such as entertainment information, practical information, and advertisement. The images displayed as content are moving images in some cases and still images in other cases. The images may or may not include characters.

A projection unit that realizes AR display of the content is provided on a predetermined position, for example, on the back side of the rearview mirror and the upper surface of the dashboard. Other than the projection unit, various devices that project virtual images may be used as devices that realize the AR display. For example, a transmissive display attached to the windshield G may be used, or a transmissive HMD (Head Mounted Display) worn by the user may be used.

The vehicle control system uses optimal expression to display the content at an optimal place in the scene. Specifically, among frames set on a wall surface of an object, such as a building, existing in the scene, a frame that can be easily viewed by the user is selected as the optimal place on the basis of a movement state. In addition, to provide the content as if the content is actually projected on the wall surface of the building, the content is displayed after executing image processing according to the appearance of the wall surface.

Figure 2:
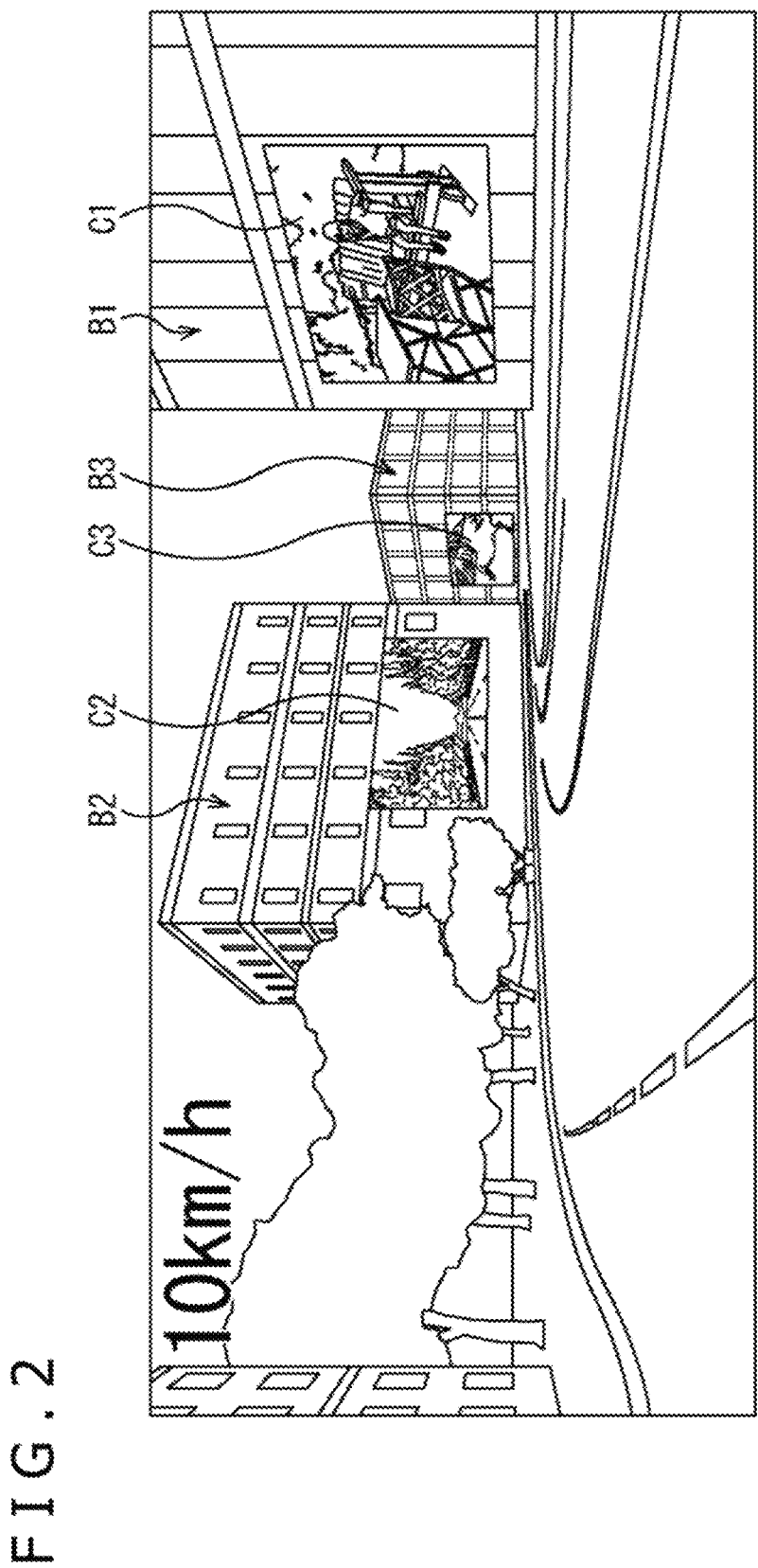
FIG. 2 is a diagram illustrating an example of an appearance of content.

FIG. 2 is a diagram illustrating an example of the appearance of the content.

A scene depicted in a range of a horizontally long rectangle illustrated in FIG. 2 represents part of the scene viewed by the user sitting on the driver's seat. A curve to the right can be viewed in front of the vehicle. There is a building B1 on the near side on the right of the curve, and there is a building B2 on the far side of the curve. There is a building B3 further beyond the building B2 along the road.

As illustrated in FIG. 2, a rectangular frame modified according to the orientation of the wall surface is set on the wall surface of the building B1, and content C1 is displayed in the frame.

Similarly, content C2 is displayed in the frame set on the wall surface of the building B2, and content C3 is displayed in the frame set on the wall surface of the building B3. The content is displayed large on the wall surface of a building at a short distance, and the content is displayed small on the wall surface of a building at a long distance.

The vehicle speed is displayed on the upper left. In this way, various types of information other than the content can also be displayed.

Figure 3:
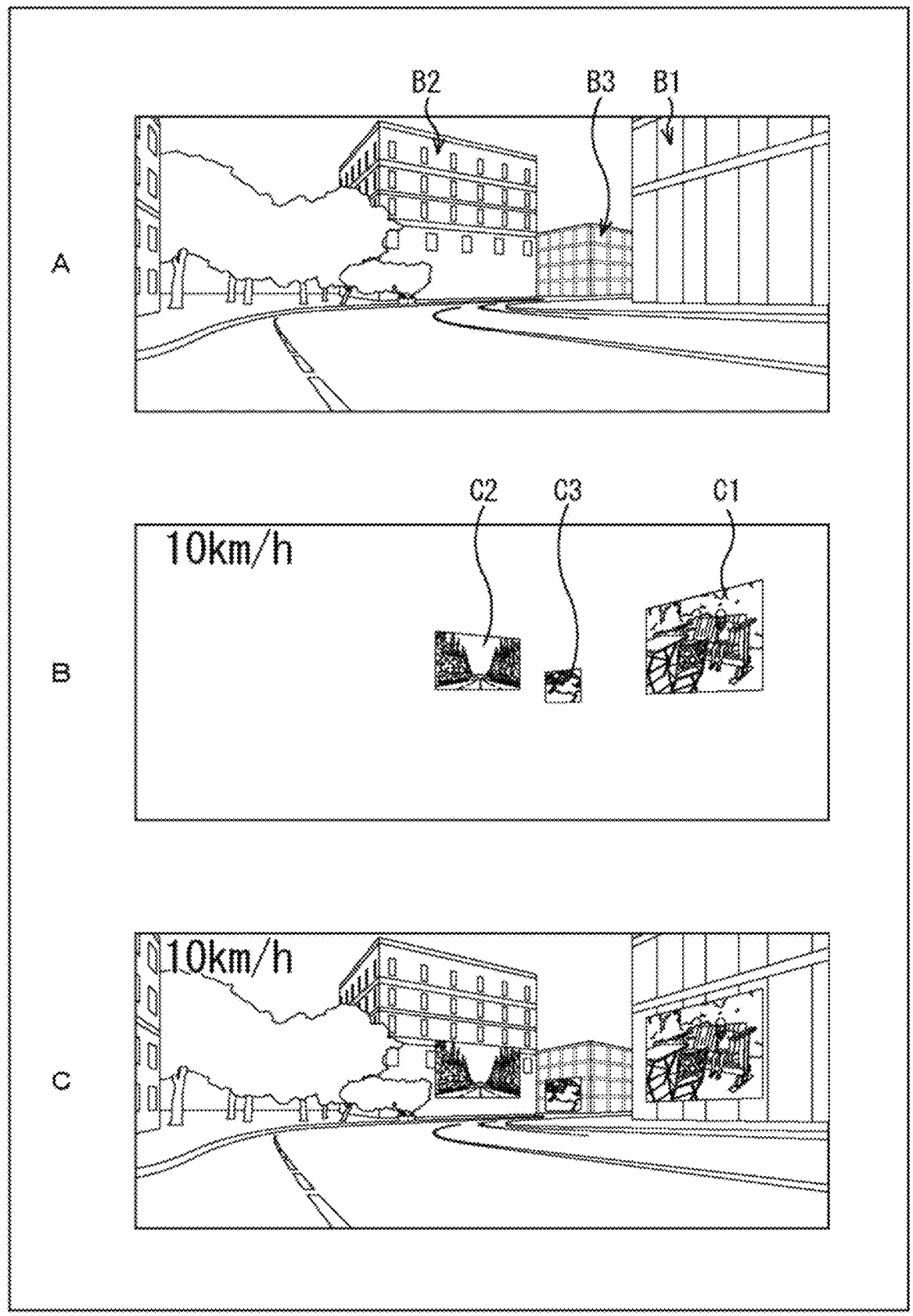
FIG. 3 depicts diagrams each illustrating a display example of the content for realizing the appearance illustrated in FIG. 2.

FIG. 3 depicts diagrams each illustrating a display example of the content for realizing the appearance of the scene as illustrated in FIG. 2.

A of FIG. 3 illustrates an actual scene viewed in front of the user. As illustrated in A of FIG. 3, the curve to the right can be viewed in front of the vehicle, and the buildings B1 to B3 can be viewed along the road in the actual scene.

The contents C1 to C3 are displayed in the scene in a form as illustrated in B of FIG. 3, and the same appearance of content as in FIG. 2 is realized as illustrated in C of FIG. 3.

Figure 4:
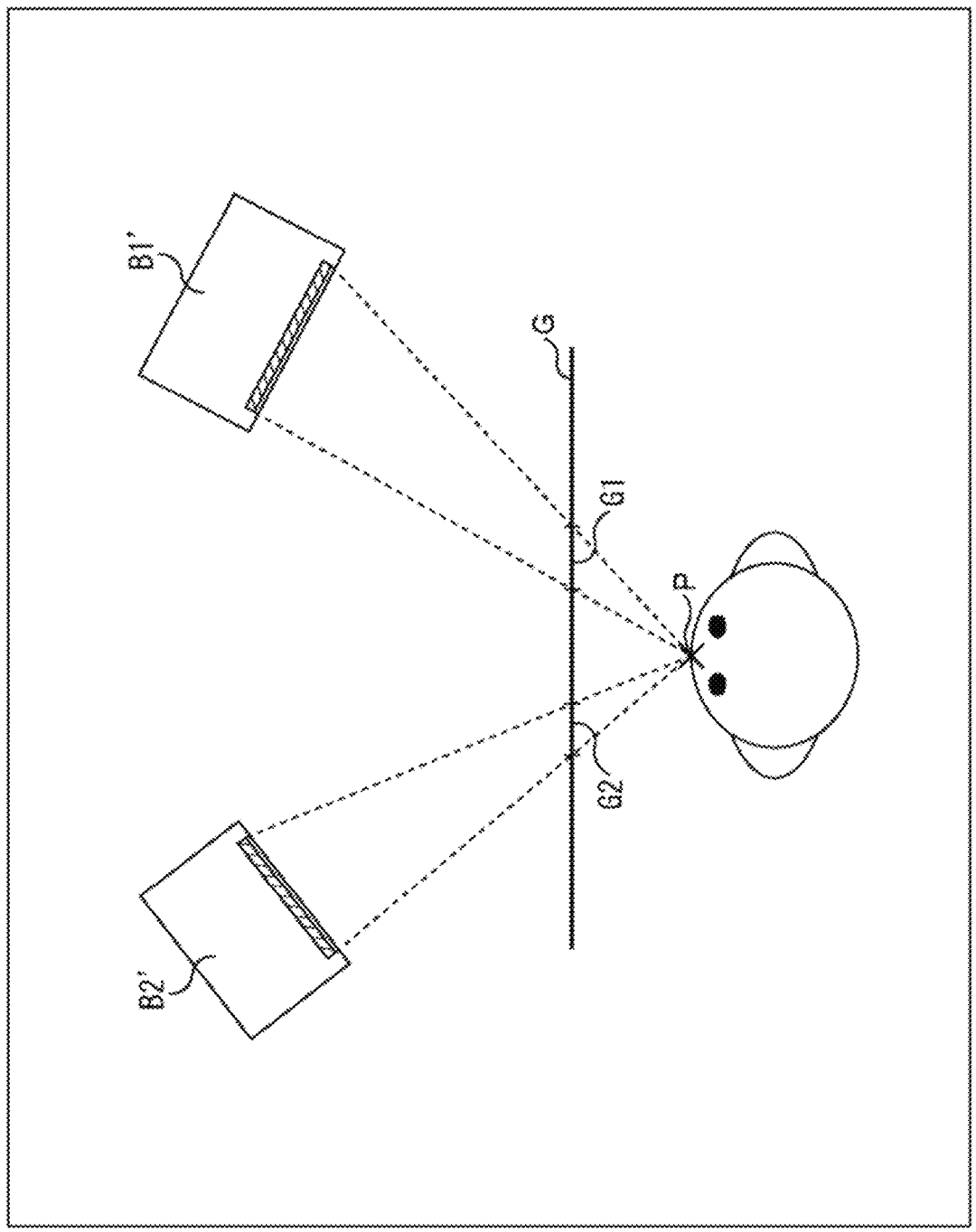
FIG. 4 is a diagram schematically illustrating display of the content.

FIG. 4 is a diagram schematically illustrating the display of the content.

The content is displayed by displaying the image in a region on the windshield G corresponding to the frame set on the building. On the basis of a position P that is the position of the user, a region inside straight lines connecting the position P and the frame (diagonal line part) is the region on the windshield G corresponding to the frame. A horizontal line in FIG. 4 represents the windshield G as a display surface between the user and the building.

In the example of FIG. 4, a region on the windshield G corresponding to a frame set on a building B1' is a region G1, and a region on the windshield G corresponding to a frame set on a building B2' is a region G2. The content can be displayed in each of the region G1 and the region G2 to realize the appearance as if the content is displayed on each of the wall surfaces of the building B1' and the building B2'.

The user views the content displayed in the region G1 on top of the building B1' viewed through the windshield G. In addition, the user views the content displayed in the region G2 on top of the building B2' viewed through the windshield G. In this way, the user can view various types of information as if the information is displayed on the wall surfaces of the buildings.

In this way, the superimposition of the content on the frames set on the wall surfaces of the buildings is realized by displaying the images on the windshield G.

The displayed content is updated in real time according to the traveling state (movement state) during the traveling of the vehicle. The appearance of the content also changes with a change in appearance of the scene from the driver's seat.

Figure 5:
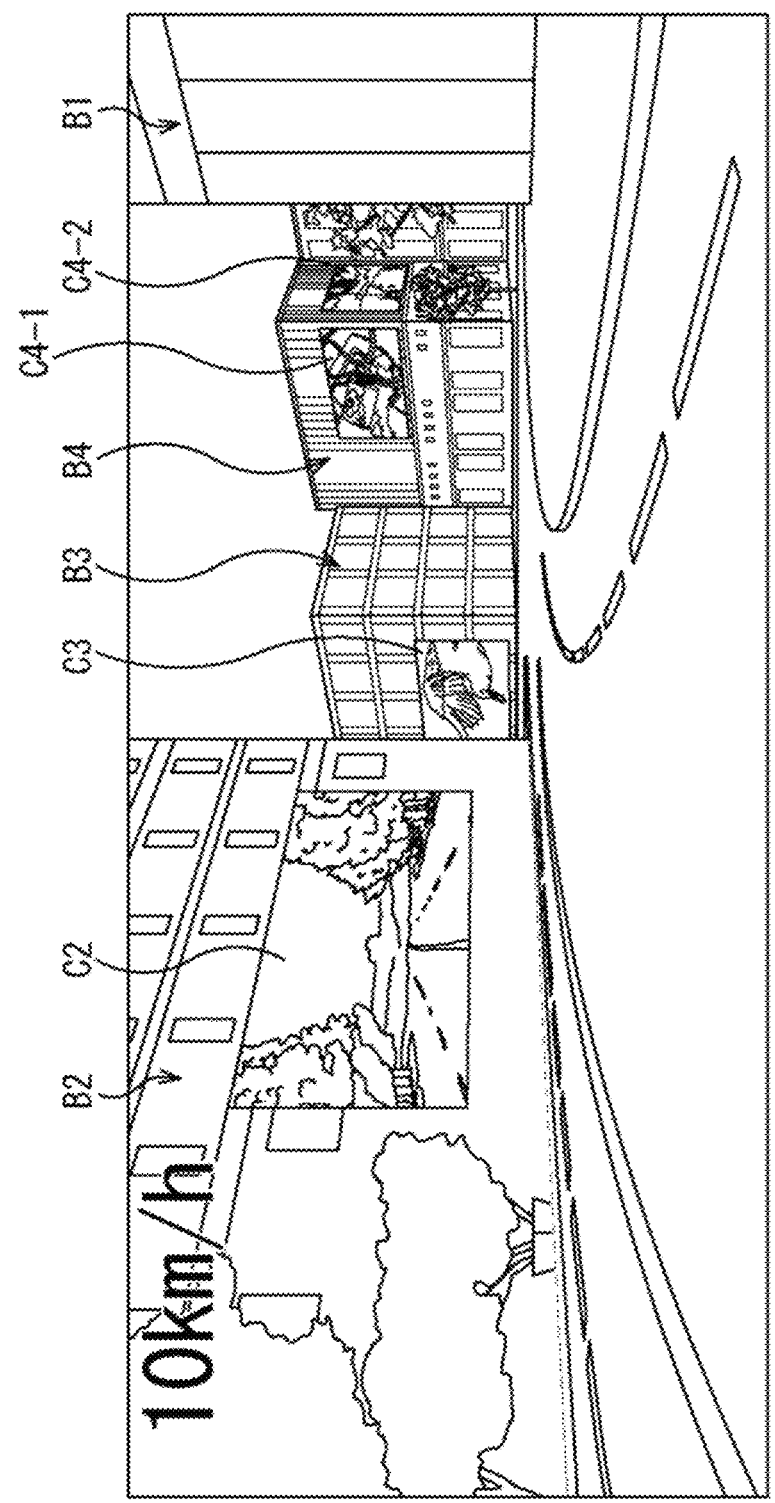
FIG. 5 is a diagram illustrating an example of the appearance of the content after a lapse of certain time from the state of FIG. 2.

FIG. 5 is a diagram illustrating an example of the appearance of the content after a lapse of certain time from the state of FIG. 2.

The state of FIG. 5 is a state in which the vehicle is turning the curve. Most of the building B1 viewed on the right is out of the visual field, and the content C1 superimposed on the building B1 cannot be viewed.

In addition, the building B2 is getting closer in front of vehicle, and the content C2 is displayed larger than in the state of FIG. 2. The content C2 is displayed in a size and a shape as if the content C2 is displayed on the wall surface of the building B2 on the basis of the positional relationship between the vehicle and the wall surface of the building B2. The details of the displayed content C2 also change with a lapse of time.

Similarly, the display of the content C3 also changes with a change in appearance of the building B3.

In addition, a building B4 not viewed in the state of FIG. 2 is newly viewed beyond the building B3 in the example of FIG. 5. Frames are also set on two wall surfaces of the building B4 that can be viewed from the user, and content C4-1 and content C4-2 are superimposed on the frames, respectively.

Figure 6:
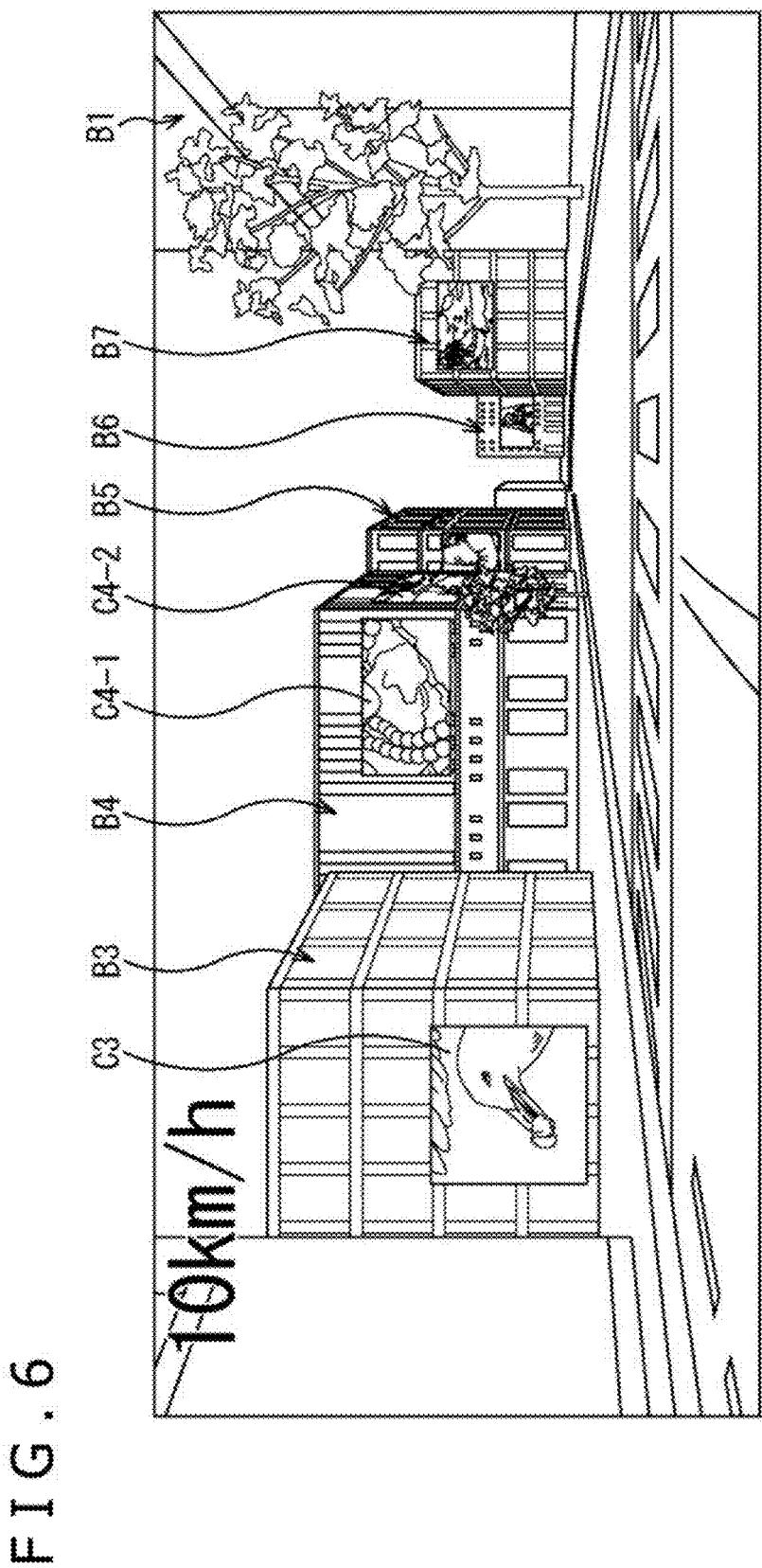
FIG. 6 is a diagram illustrating an example of the appearance of the content after a lapse of certain time from the state of FIG. 5.

FIG. 6 is a diagram illustrating an example of the appearance of the content after a lapse of certain time from the state of FIG. 5.

The state of FIG. 6 is a state in which the vehicle is moving straight the road after turning the curve. Most of the building B2 viewed on the left is out of the visual field, and the content C2 superimposed on the building B2 cannot be viewed.

Furthermore, in addition to a building B5 hardly viewed in the state of FIG. 5, buildings B6 and B7 can be viewed in front, and content is superimposed on each of the wall surfaces.

Figure 7:
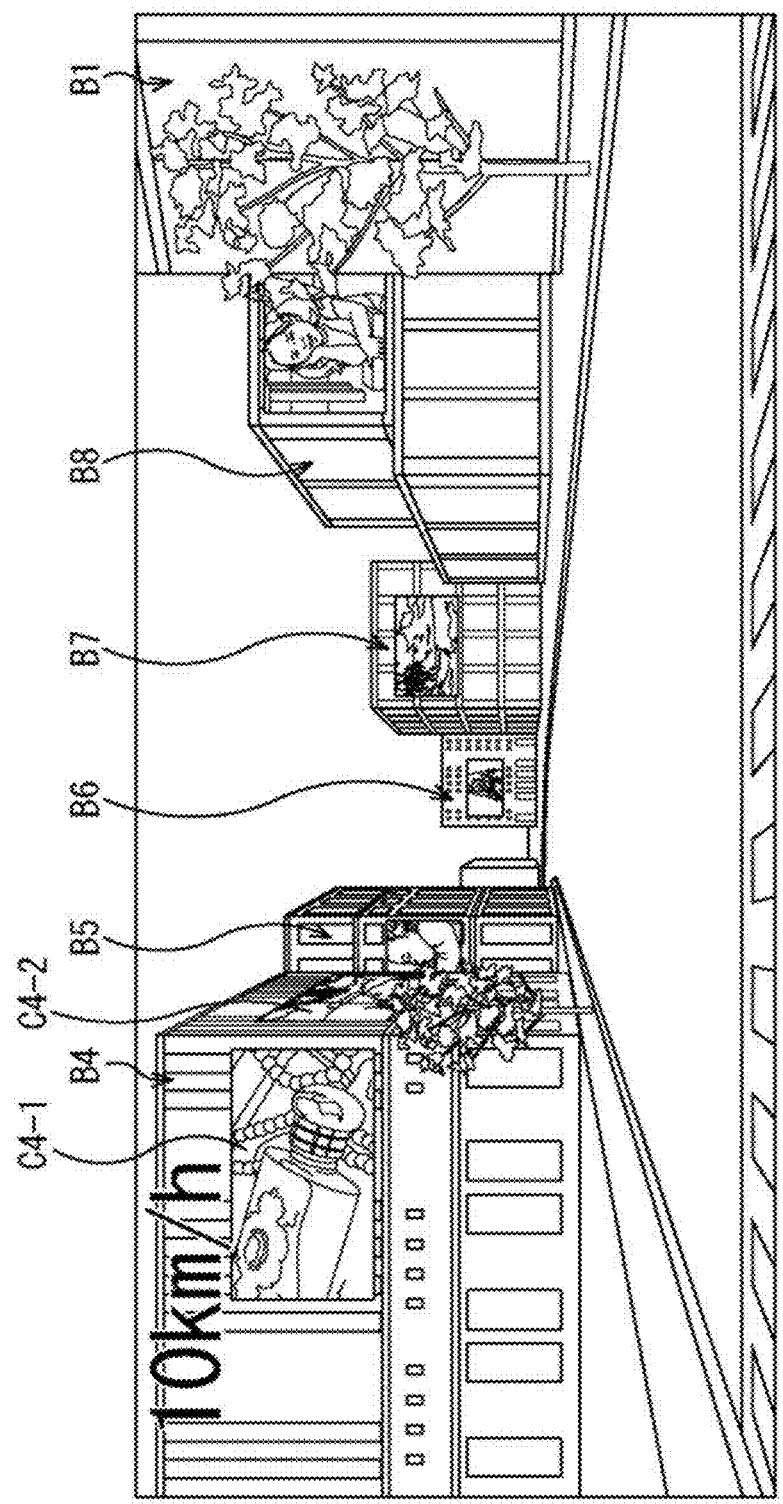
FIG. 7 is a diagram illustrating an example of the appearance of the content after a lapse of certain time from the state of FIG. 6.

FIG. 7 is a diagram illustrating an example of the appearance of the content after a lapse of certain time from the state of FIG. 6.

The state of FIG. 7 is a state in which the vehicle is moving straight at a position in front of the building B4. The display of the content superimposed on each of the buildings B4 to B7 is changed with a change in appearance of the building. In addition, a building B8 hardly viewed in the state of FIG. 6 can be viewed large on the right, and content is also superimposed on the wall surface of the building B8.

Note that, although the frames are set on the wall surfaces of the buildings in the case described here, the frames are also set on various structures, such as a water storage tank and sound-proof walls installed on both sides of a highway, and the content is superimposed. The target of setting the frames is not limited to the structures, and the target may also be natural objects, such as a slope of a mountain viewed at a long distance and a sea surface. The frames may also be set on the road itself, and the content may be superimposed.

That is, the frames can be set on various objects in the visual field of the user driving the vehicle, and the content can be superimposed. In the following description, the object as a superimposition location of the content is mainly the building.

In this way, the vehicle control system displays the content by superimposing the content on the building viewed during driving. Furthermore, the content superimposed on the building is displayed by changing the shape and the size according to the change in appearance viewed by the user.

As described in detail later, image processing is actually applied to the content by reducing the contrast in a case where the building is at a long distance so that the building looks blurry or by reducing the contrast in a case where intense light shines on the building so that the building looks bright.

The content is displayed in a form as if the content is displayed on the building, and the display changes with a change in appearance of the scene. Therefore, the user can view the content in a natural form while driving.

A process of the vehicle control system that realizes the display of the content will be described later with reference to flow charts.

<<1-2. Configuration Example of Vehicle Control System>>
<1-2-1. Overall Configuration of Vehicle Control System>

Figure 8:
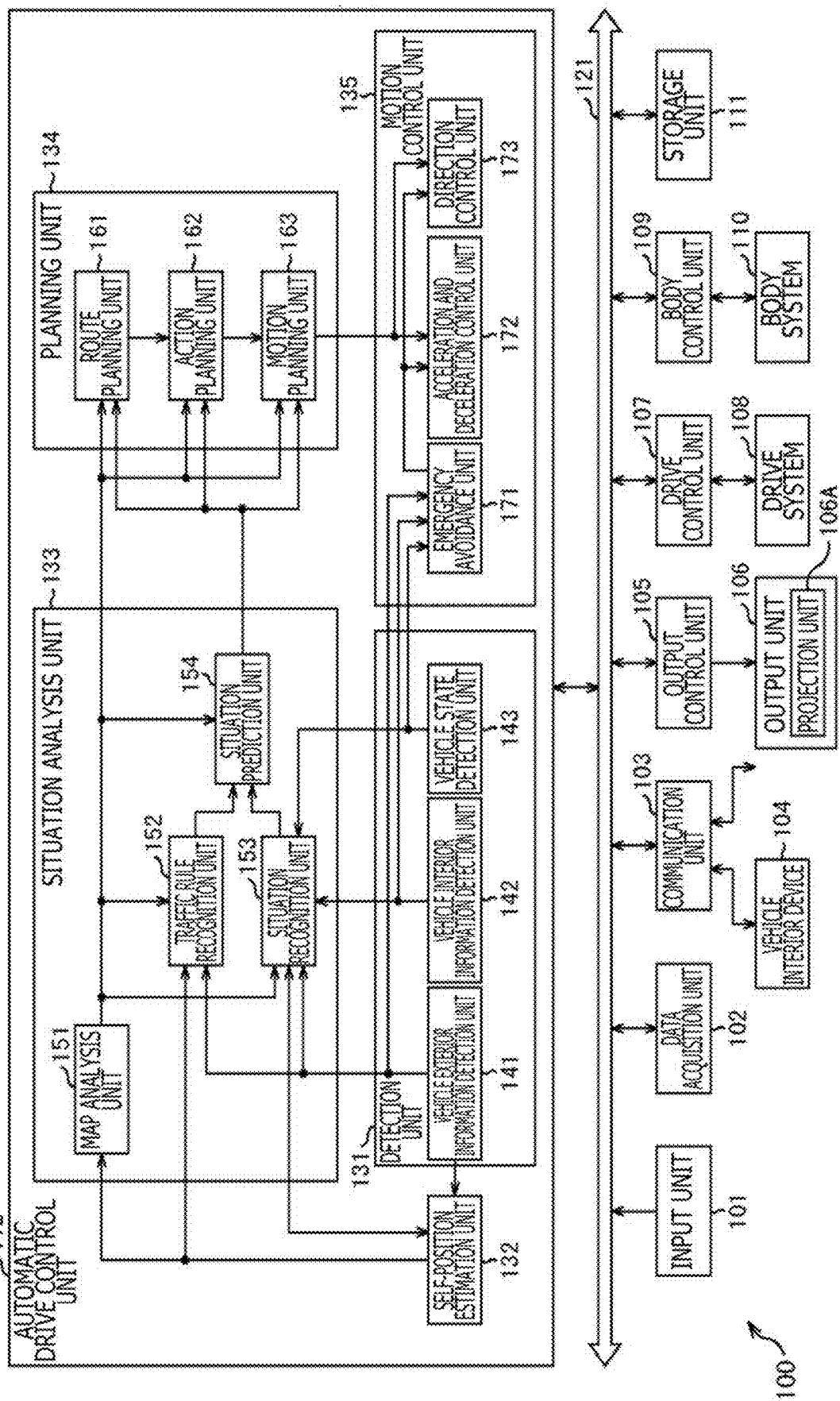
FIG. 8 is a block diagram illustrating a configuration example of the vehicle control system of the first embodiment.

FIG. 8 is a block diagram illustrating a configuration example of a vehicle control system 100. The vehicle control system 100 illustrated in FIG. 8 functions as an information processing apparatus.

Note that, in a case where the vehicle provided with the vehicle control system 100 is to be distinguished from other vehicles, the vehicle will be appropriately referred to as a user's car or a user's vehicle.

The vehicle control system 100 includes an input unit 101, a data acquisition unit 102, a communication unit 103, a vehicle interior device 104, an output control unit 105, an output unit 106, a drive control unit 107, a drive system 108, a body control unit 109, a body system 110, a storage unit 111, and an automatic drive control unit 112. The input unit 101, the data acquisition unit 102, the communication unit 103, the output control unit 105, the drive control unit 107, the body control unit 109, the storage unit 111, and the automatic drive control unit 112 are connected to each other through a communication network 121.

The communication network 121 includes, for example, an on-board communication network in compliance with an arbitrary standard, such as CAN (Controller Area Network), LIN (Local Interconnect Network), LAN (Local Area Network), and FlexRay (registered trademark), a bus, and the like. The components of the vehicle control system 100 may be directly connected without the involvement of the communication network 121.

The input unit 101 includes an apparatus used by the occupant to input various data, instructions, and the like. For example, the input unit 101 includes an operation device, such as a touch panel, a button, a microphone, a switch, and a lever, an operation device that allows input using a method other than manual operation, such as sound and gesture, and the like.

In addition, for example, the input unit 101 may be a remote control apparatus using infrared rays or other radio waves or may be an external connection device, such as a mobile device and a wearable device, corresponding to operation of the vehicle control system 100. The input unit 101 generates an input signal on the basis of data, an instruction, or the like input by the occupant and supplies the input signal to each component of the vehicle control system 100.

The data acquisition unit 102 includes various sensors and the like that acquire data to be used for the process of the vehicle control system 100 and supplies the acquired data to each component of the vehicle control system 100.

For example, the data acquisition unit 102 includes various sensors for detecting the state and the like of the user's car. Specifically, the data acquisition unit 102 includes, for example, a gyrosensor, an acceleration sensor, an inertial measurement apparatus (IMU), and sensors for detecting an amount of operation of an accelerator pedal, an amount of operation of a brake pedal, a steering angle of a steering wheel, an engine speed, a motor speed, a rotational speed of a wheel, and the like.

In addition, the data acquisition unit 102 includes, for example, various sensors for detecting information outside the user's car. Specifically, the data acquisition unit 102 includes, for example, an imaging apparatus, such as a ToF (Time Of Flight) camera, a stereo camera, a monocular camera, an infrared camera, and other cameras. In addition, the data acquisition unit 102 includes, for example, environment sensors for detecting weather, climate conditions, and the like and surrounding information detection sensors for detecting objects around the user's car. The environment sensors include, for example, a rain sensor, a fog sensor, a sunlight sensor, a snow sensor, and the like. The surrounding information detection sensors include, for example, an ultrasonic sensor, a radar, a LiDAR (Light Detection and Ranging, Laser Imaging Detection and Ranging), a sonar, and the like.

Furthermore, the data acquisition unit 102 includes, for example, various sensors for detecting a current position of the user's car. Specifically, the data acquisition unit 102 includes, for example, a GNSS receiver or the like that receives a signal from a GNSS (Global Navigation Satellite System) satellite.

In addition, the data acquisition unit 102 includes, for example, various sensors for detecting information inside the vehicle. Specifically, the data acquisition unit 102 includes, for example, an imaging apparatus that images the driver, a biosensor that detects biological information of the driver, a microphone that collects sound of the vehicle interior, and the like. The biosensor is provided on, for example, the seat surface, the steering wheel, or the like, and the biosensor detects the biological information of the occupant sitting in the seat or the driver holding the steering wheel.

The camera included in the data acquisition unit 102 images the scene in the traveling direction of the vehicle. A scene image taken by the camera is analyzed to specify the presence or absence of buildings, the brightness of the buildings, the brightness of the surroundings, and the like.

In addition, the state of the vehicle, such as the traveling direction and the velocity, is specified on the basis of the results detected by various sensors included in the data acquisition unit 102. The specified state of the vehicle is used for prediction or the like of the traveling route of the vehicle.

The communication unit 103 communicates with the vehicle interior device 104 as well as various devices, servers, base stations, and the like outside the vehicle to transmit data supplied from each of the components of the vehicle control system 100 and to supply received data to each of the components of the vehicle control system 100. Note that the communication protocol supported by the communication unit 103 is not particularly limited, and the communication unit 103 can also support a plurality of types of communication protocols.

For example, the communication unit 103 uses a wireless LAN, Bluetooth (registered trademark), NFC (Near Field Communication), WUSB (Wireless USB), or the like to wirelessly communicate with the vehicle interior device 104. In addition, the communication unit 103 uses a USB (Universal Serial Bus), HDMI (registered trademark) (High-Definition Multimedia Interface), MHL (Mobile High-definition Link), or the like to perform wired communication with the vehicle interior device 104 through a connection terminal (and a cable if necessary) not illustrated.

The communication unit 103 communicates with a device (for example, an application server or a control server) existing on an external network (for example, the Internet, a cloud network, or a network specific to a service provider) through a base station or an access point.

The content to be superimposed on the scene may be acquired from a server that manages the content. In this case, the communication unit 103 communicates with the server to acquire the content. The content acquired by the communication unit 103 is supplied and stored in, for example, the storage unit 111.

The communication unit 103 uses a P2P (Peer To Peer) technique to communicate with a terminal (for example, a terminal of a pedestrian or a shop, or an MTC (Machine Type Communication) terminal) existing near the user's car. In addition, the communication unit 103 performs V2X communication, such as vehicle-to-vehicle communication, vehicle-to-infrastructure communication, vehicle-to-home communication, and vehicle-to-pedestrian communication. The communication unit 103 includes a beacon reception unit and receives a radio wave or an electromagnetic wave transmitted from a wireless station or the like installed on the road to acquire information regarding a current position, a traffic jam, a traffic regulation, a required time, and the like.

The vehicle interior device 104 includes, for example, a mobile device or a wearable device possessed by the occupant, an information device carried in or attached to the user's car, a navigation apparatus that searches for a route to an arbitrary destination, and the like.

The output control unit 105 controls output of various types of information to the occupant of the user's car or to the outside of the vehicle. For example, the output control unit 105 generates an output signal including at least one of visual information (for example, image data) and auditory information (for example, audio data) and supplies the output signal to the output unit 106 to control the output of the visual information and the auditory information from the output unit 106.

Specifically, for example, the output control unit 105 combines image data imaged by different imaging apparatuses of the data acquisition unit 102 to generate a bird's-eye image, a panoramic image, or the like and supplies an output signal including the generated image to the output unit 106. In addition, for example, the output control unit 105 generates audio data including warning sound, a warning message, or the like for danger, such as collision, contact, and entry into a danger zone, and supplies an output signal including the generated audio data to the output unit 106.

The output unit 106 includes an apparatus that can output the visual information or the auditory information to the occupant of the user's car or to the outside the vehicle. For example, the output unit 106 includes a display apparatus, an instrument panel, an audio speaker, headphones, a wearable device such as a head-mounted display worn by the occupant, a lamp, and the like.

In addition, the output unit 106 includes a projection unit 106A. The projection unit 106A is a display device, such as an HUD and a transmissive display, with an AR display function. The projection unit 106A projects various types of information, such as content, to the windshield G as described above.

The drive control unit 107 supplies various control signals to the drive system 108 to control the drive system 108. In addition, the drive control unit 107 supplies control signals to components other than the drive system 108 as necessary to send a notification or the like of the control state of the drive system 108.

The drive system 108 includes various apparatuses regarding the drive system of the user's car. For example, the drive system 108 includes a driving force generation apparatus, such as an internal combustion engine and a drive motor, for generating driving force, a driving force transmission mechanism for transmitting the driving force to the wheel, a steering mechanism that adjusts the steering angle, a braking apparatus that generates braking force, an ABS (Antilock Brake System), an ESC (Electronic Stability Control), an electric power steering apparatus, and the like.

The body control unit 109 generates various control signals and supplies the control signals to the body system 110 to control the body system 110. In addition, the body control unit 109 supplies the control signals to components other than the body system 110 as necessary to send a notification or the like of the control state of the body system 110.

The body system 110 includes various apparatuses of the body equipped on the vehicle body. For example, the body system 110 includes a keyless entry system, a smart key system, a power window apparatus, a power seat, a steering wheel, an air conditioner, various lamps (for example, a headlamp, a back lamp, a brake lamp, a turn signal, a fog lamp, and the like), and the like.

The storage unit 111 includes a storage device, such as an SSD (Solid State Drive) and an HDD (Hard Disc Drive). The storage unit 111 stores programs, data, and the like used by the components of the vehicle control system 100.

For example, map data, such as a three-dimensional highly accurate map like a dynamic map, a global map covering a wide area with lower accuracy than the highly accurate map, and a local map including information regarding the surroundings of the user's car, is stored in the storage unit 111.

The automatic drive control unit 112 performs control regarding automatic drive, such as autonomous traveling and drive support. For example, the automatic drive control unit 112 performs cooperative control to realize functions of ADAS (Advanced Driver Assistance System) including collision avoidance or shock mitigation of the user's car, follow-up traveling on the basis of the following distance, traveling at a constant speed, collision warning of the user's car, lane departure warning of the user's car, and the like. In addition, the automatic drive control unit 112 performs cooperative control aimed at automatic drive or the like for autonomous traveling regardless of the operation of the driver.

The automatic drive control unit 112 includes a detection unit 131, a self-position estimation unit 132, a situation analysis unit 133, a planning unit 134, and a motion control unit 135.

The detection unit 131 detects various types of information necessary for controlling the automatic drive. The detection unit 131 includes a vehicle exterior information detection unit 141, a vehicle interior information detection unit 142, and a vehicle state detection unit 143.

The vehicle exterior information detection unit 141 executes a detection process of information outside the user's car on the basis of data or a signal from each component of the vehicle control system 100. For example, the vehicle exterior information detection unit 141 executes a detection process, a recognition process, and a tracking process of an object around the user's car as well as a detection process of the distance to the object. Examples of the object to be detected include a vehicle, a person, an obstacle, a structure, a road, a traffic light, a traffic sign, a road sign, and the like.

In addition, the vehicle exterior information detection unit 141 executes a detection process of the environment around the user's car. Examples of the surrounding environment to be detected include weather, temperature, humidity, brightness, a state of a road surface, and the like. The vehicle exterior information detection unit 141 supplies data indicating the results of the detection process to the self-position estimation unit 132, a map analysis unit 151, a traffic rule recognition unit 152, and a situation recognition unit 153 of the situation analysis unit 133, an emergency avoidance unit 171 of the motion control unit 135, and the like.

The vehicle interior information detection unit 142 executes a detection process of information inside the vehicle on the basis of data or signals from the components of the vehicle control system 100. For example, the vehicle interior information detection unit 142 executes an authentication process and a recognition process of the driver, a detection process of the state of the driver, a detection process of the occupant, a detection process of the environment inside the vehicle, and the like. Examples of the state of the driver to be detected include physical conditions, alertness, concentration, fatigue, a visual line direction, and the like. Examples of the environment inside the vehicle to be detected include the temperature, humidity, brightness, odor, and the like. The vehicle interior information detection unit 142 supplies data indicating the results of the detection process to the situation recognition unit 153 of the situation analysis unit 133, the emergency avoidance unit 171 of the motion control unit 135, and the like.

The vehicle state detection unit 143 executes a detection process of the state of the user's car on the basis of data or signals from the components of the vehicle control system 100. Examples of the state of the user's car to be detected include the velocity, the acceleration, the steering angle, the presence/absence and details of abnormality, the state of driving operation, the position and inclination of a power seat, the state of a door lock, the state of other on-board devices, and the like. The vehicle state detection unit 143 supplies data indicating the results of the detection process to the situation recognition unit 153 of the situation analysis unit 133, the emergency avoidance unit 171 of the motion control unit 135, and the like.

The self-position estimation unit 132 executes an estimation process of a position, an orientation, and the like of the user's car on the basis of data or signals from the components of the vehicle control system 100, such as the vehicle exterior information detection unit 141 and the situation recognition unit 153 of the situation analysis unit 133.

In addition, the self-position estimation unit 132 generates a local map used for estimating the self-position (hereinafter, referred to as a self-position estimation map) as necessary. The self-position estimation map is a highly accurate map using, for example, a technique such as SLAM (Simultaneous Localization and Mapping).

The self-position estimation unit 132 supplies data indicating the results of the estimation process to the map analysis unit 151, the traffic rule recognition unit 152, and the situation recognition unit 153 of the situation analysis unit 133 and the like. In addition, the self-position estimation unit 132 causes the storage unit 111 to store the self-position estimation map.

The situation analysis unit 133 executes an analysis process of the situation of the user's car and the surroundings. The situation analysis unit 133 includes the map analysis unit 151, the traffic rule recognition unit 152, the situation recognition unit 153, and a situation prediction unit 154.

The map analysis unit 151 executes an analysis process of various maps stored in the storage unit 111 while using data or signals from the components of the vehicle control system 100, such as the self-position estimation unit 132 and the vehicle exterior information detection unit 141, as necessary and constructs a map including information necessary for the process of automatic drive. The map analysis unit 151 supplies the constructed map to, for example, the traffic rule recognition unit 152, the situation recognition unit 153, and the situation prediction unit 154 as well as a route planning unit 161, an action planning unit 162, and a motion planning unit 163 of the planning unit 134.

The traffic rule recognition unit 152 executes a recognition process of traffic rules around the user's car on the basis of data or signals from the components of the vehicle control system 100, such as the self-position estimation unit 132, the vehicle exterior information detection unit 141, and the map analysis unit 151. As a result of the recognition process, for example, the position and the state of signals around the user's car, the details of traffic regulations around the user's car, driving lanes that can be traveled, and the like are recognized. The traffic rule recognition unit 152 supplies data indicating the results of the recognition process to the situation prediction unit 154 and the like.

The situation recognition unit 153 executes a recognition process of the situation regarding the user's car on the basis of data or signals from the components of the vehicle control system 100, such as the self-position estimation unit 132, the vehicle exterior information detection unit 141, the vehicle interior information detection unit 142, the vehicle state detection unit 143, and the map analysis unit 151. For example, the situation recognition unit 153 executes a recognition process of the situation of the user's car, the situation around the user's car, the situation of the driver of the user's car, and the like. In addition, the situation recognition unit 153 generates a local map used for recognizing the situation around the user's car (hereinafter, referred to as a situation recognition map) as necessary. The situation recognition map is, for example, an occupancy grid map.

Examples of the situations of the user's car to be recognized include the position, the orientation, and the motion (for example, a velocity, an acceleration, a movement direction, and the like) of the user's car as well as the presence/absence and the details of abnormality. Examples of the situation around the user's car to be recognized include a type and a position of a surrounding stationary object, a type, a position, and motion (for example, a velocity, an acceleration, a movement direction, and the like) of a surrounding moving object, a configuration of a surrounding road, the state of the road surface, and the weather, the temperature, the humidity, and the brightness of the surroundings. Examples of the state of the driver to be recognized include physical conditions, alertness, concentration, fatigue, motion of a visual line, and driving operation.

The situation recognition unit 153 supplies data (including the situation recognition map as necessary) indicating the results of the recognition process to the self-position estimation unit 132, the situation prediction unit 154, and the like. In addition, the situation recognition unit 153 causes the storage unit 111 to store the situation recognition map.

The situation prediction unit 154 executes a prediction process of the situation regarding the user's car on the basis of data or signals from the components of the vehicle control system 100, such as the map analysis unit 151, the traffic rule recognition unit 152, and the situation recognition unit 153. For example, the situation prediction unit 154 executes a prediction process of the situation of the user's car, the situation around the user's car, the situation of the driver, and the like.

The situation of the user's car to be predicted includes, for example, behavior of the user's car, generation of abnormality, a possible travel distance, and the like. The situation around the user's car to be predicted includes, for example, behavior of a moving object around the user's car, change in the state of a signal, change in the state of the environment such as the weather, and the like. The situation of the driver to be predicted includes, for example, behavior and physical conditions of the driver, and the like.

The situation prediction unit 154 supplies data indicating the results of the prediction process to, for example, the route planning unit 161, the action planning unit 162, and the motion planning unit 163 of the planning unit 134 along with the data from the traffic rule recognition unit 152 and the situation recognition unit 153.

The route planning unit 161 plans a route to the destination on the basis of data or signals from the components of the vehicle control system 100 such as the map analysis unit 151 and the situation prediction unit 154. For example, the route planning unit 161 sets the route from the current position to the designated destination on the basis of the global map. In addition, the route planning unit 161 appropriately changes the route on the basis of, for example, the situation of a traffic jam, an accident, a traffic regulation, a construction work, and the like, the physical conditions of the driver, and the like. The route planning unit 161 supplies data indicating the planned route to the action planning unit 162 and the like.

The action planning unit 162 plans actions of the user's car for safely traveling the route planned by the route planning unit 161 in a planned period of time on the basis of data or signals from the components of the vehicle control system 100 such as the map analysis unit 151 and the situation prediction unit 154. For example, the action planning unit 162 plans start, stop, a traveling direction (for example, forward, backward, left turn, right turn, change of the direction, and the like), a driving lane, a traveling speed, passing, and the like. The action planning unit 162 supplies data indicating the planned actions of the user's car to the motion planning unit 163 and the like.

The motion planning unit 163 plans motions of the user's car for realizing the actions planned by the action planning unit 162 on the basis of data or signals from the components of the vehicle control system 100 such as the map analysis unit 151 and the situation prediction unit 154. For example, the motion planning unit 163 plans acceleration, deceleration, a traveling path, and the like. The motion planning unit 163 supplies data indicating the planned motions of the user's car to an acceleration and deceleration control unit 172 and a direction control unit 173 of the motion control unit 135, and the like.

The motion control unit 135 controls the motions of the user's car. The motion control unit 135 includes the emergency avoidance unit 171, the acceleration and deceleration control unit 172, and the direction control unit 173.

The emergency avoidance unit 171 executes a detection process of emergency, such as collision, contact, entry into a danger zone, abnormality of a driver, and abnormality of a vehicle, on the basis of the detection results of the vehicle exterior information detection unit 141, the vehicle interior information detection unit 142, and the vehicle state detection unit 143. The emergency avoidance unit 171 plans motions of the user's car for avoiding emergency, such as sudden stop and sharp turn, in a case where emergency is detected. The emergency avoidance unit 171 supplies data indicating the planned motions of the user's car to the acceleration and deceleration control unit 172, the direction control unit 173, and the like.

The acceleration and deceleration control unit 172 controls the acceleration and the deceleration for realizing the motions of the user's car planned by the motion planning unit 163 or the emergency avoidance unit 171. For example, the acceleration and deceleration control unit 172 computes control target values of the driving force generation apparatus or the braking apparatus for realizing the planned acceleration, deceleration, or sudden stop and supplies a control command indicating the computed control target values to the drive control unit 107.

The direction control unit 173 controls the direction for realizing the motions of the user's car planned by the motion planning unit 163 or the emergency avoidance unit 171. For example, the direction control unit 173 computes control target values of the steering mechanism for realizing the traveling path or sharp turn planned by the motion planning unit 163 or the emergency avoidance unit 171 and supplies a control command indicating the computed control target values to the drive control unit 107.

<1-2-2. Configuration of Output Control Unit>

Figure 9:
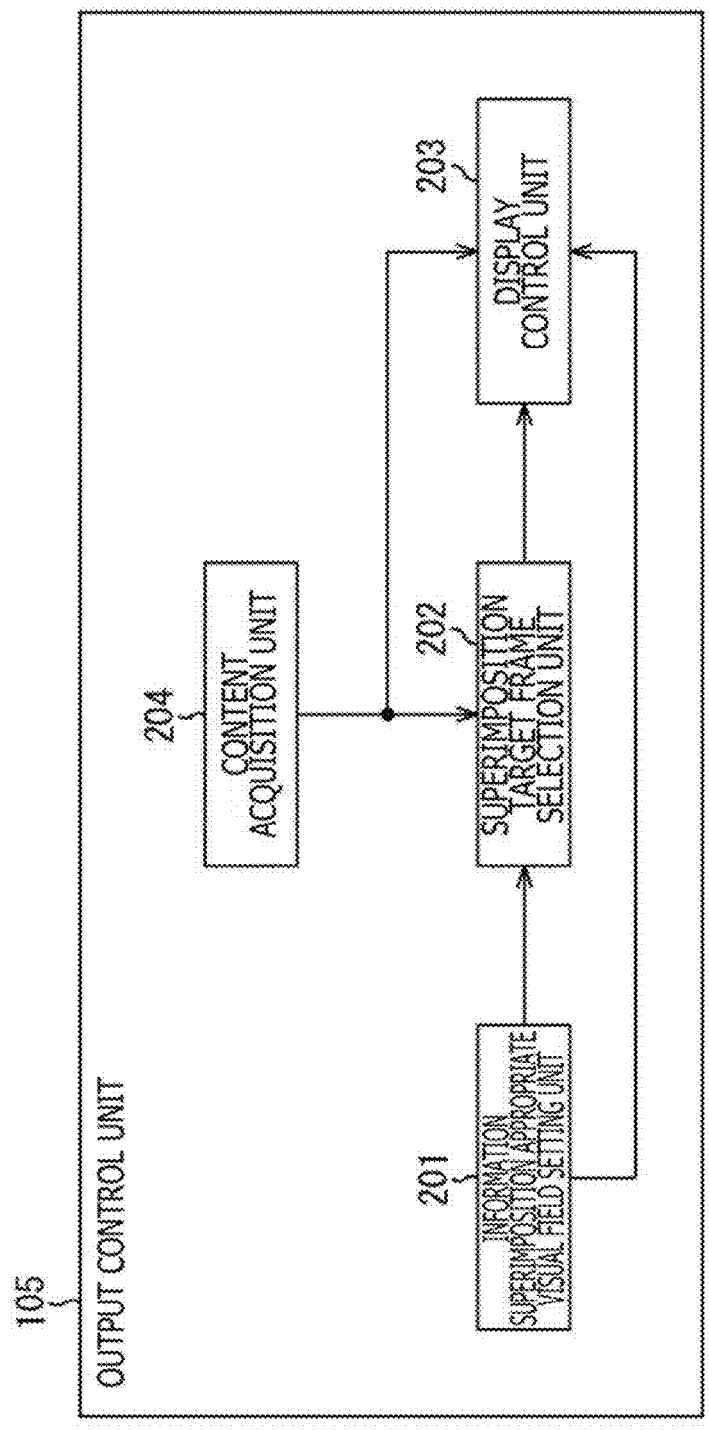
FIG. 9 is a block diagram illustrating a functional configuration example of an output control unit of FIG. 8.

FIG. 9 is a block diagram illustrating a functional configuration example of the output control unit 105 of FIG. 8. At least part of functional units illustrated in FIG. 9 is realized by executing a predetermined program.

The output control unit 105 includes an information superimposition appropriate visual field setting unit 201, a superimposition target frame selection unit 202, a display control unit 203, and a content acquisition unit 204.

The information superimposition appropriate visual field setting unit 201 analyzes an image obtained by imaging the scene in the traveling direction of the vehicle. The information superimposition appropriate visual field setting unit 201 is supplied with, for example, a scene image taken by the camera included in the data acquisition unit 102.

The information superimposition appropriate visual field setting unit 201 sets information superimposition possible frames on the wall surfaces of buildings in the scene image. The information superimposition possible frame is a region of the surface (region corresponding to the surface) of an object, such as a building, in which the content can be superimposed.

In addition, the information superimposition appropriate visual field setting unit 201 selects predetermined frames of the information superimposition possible frames as information superimposition appropriate frames that are frames suitable for superimposing the content.

That is, the content is not superimposed on all of the information superimposition possible frames, and the information superimposition possible frames suitable for superimposing the content are selected according to the traveling state and the like. Information regarding the information superimposition appropriate frames set by the information superimposition appropriate visual field setting unit 201 is supplied to the superimposition target frame selection unit 202. Information of the analysis results of the scene image is appropriately supplied from the information superimposition appropriate visual field setting unit 201 to the display control unit 203.

The superimposition target frame selection unit 202 selects a superimposition location of the content acquired by the content acquisition unit 204 from the information superimposition appropriate frames set by the information superimposition appropriate visual field setting unit 201. Information regarding the information superimposition appropriate frame selected as the superimposition location of the content is supplied to the display control unit 203.

The display control unit 203 applies image processing to the content according to the situation of the information superimposition appropriate frame selected as the superimposition location to adjust the appearance. In this way, the display control unit 203 has a function of generating visual information for displaying the content. In addition, the display control unit 203 controls the projection unit 106A to superimpose, on the information superimposition appropriate frame, the content subjected to the image processing. The display control unit 203 projects the content to the region of the windshield G corresponding to the information superimposition appropriate frame to display the content.

The content acquisition unit 204 reads the content from the storage unit 111 to acquire the content. For example, content acquired from a server not illustrated is stored in the storage unit 111. The content acquired by the content acquisition unit 204 is supplied to the superimposition target frame selection unit 202 and the display control unit 203.

In this way, the content is displayed by executing the process of the information superimposition appropriate visual field setting unit 201 as a process of a first stage, executing the process of the superimposition target frame selection unit 202 as a process of a second stage, and executing the process of the display control unit 203 as a process of a third stage.

Hereinafter, details of the processes of the stages will be described along with configurations of components of the information superimposition appropriate visual field setting unit 201, the superimposition target frame selection unit 202, and the display control unit 203.

<1-2-3. Process of First Stage (Setting of Information Superimposition Appropriate Visual Field)>

Figure 10:
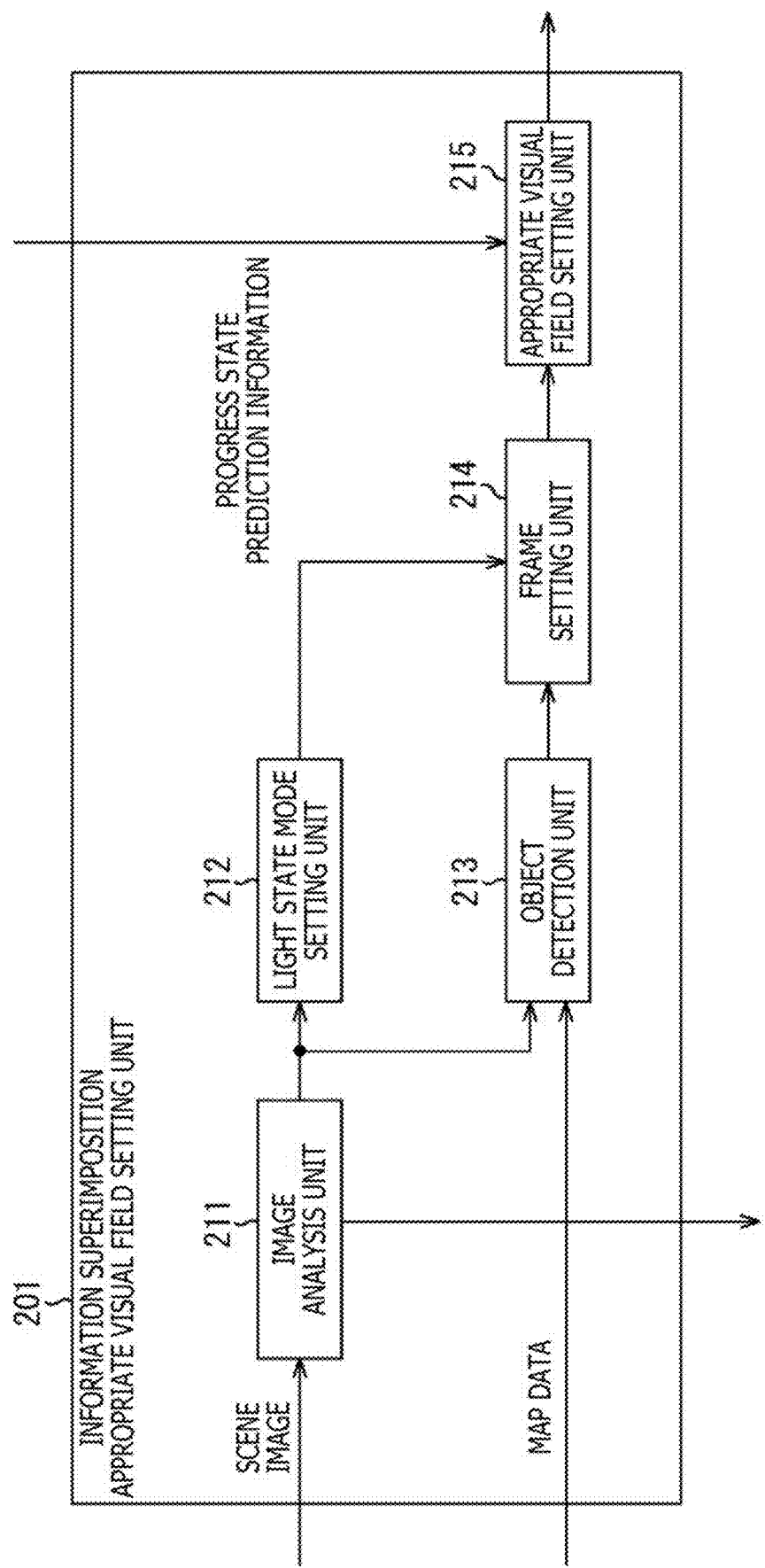
FIG. 10 is a block diagram illustrating a configuration example of an information superimposition appropriate visual field setting unit of FIG. 9.

FIG. 10 is a block diagram illustrating a configuration example of the information superimposition appropriate visual field setting unit 201 of FIG. 9.

The information superimposition appropriate visual field setting unit 201 includes an image analysis unit 211, a light state mode setting unit 212, an object detection unit 213, a frame setting unit 214, and an appropriate visual field setting unit 215.

The image analysis unit 211 analyzes a scene image obtained by imaging. As a result of the analysis of the scene image, the outlines of the buildings are detected, and the brightness (luminance) of the surroundings is detected. In addition, as a result of the analysis of the scene image, the state of sunlight, the state of lighting, the state of atmosphere, and the like are also detected. Information indicating the analysis results of the image analysis unit 211 is supplied to the light state mode setting unit 212 and the object detection unit 213 and is also supplied to the display control unit 203.

The light state mode setting unit 212 sets a light state mode on the basis of information supplied from the image analysis unit 211. For example, one of a "daytime mode," a "dusk mode," and a "night mode" is set as the light state mode.

For example, the "daytime mode" is set when the sun is in the sky so that the surroundings are bright. The "dusk mode" is set when the surroundings are a little dark, such as in the evening and at dawn. The "night mode" is set when the sun is set so that the surroundings are dark.

A reference threshold of brightness is set for each mode. The light state mode setting unit 212 compares the brightness of the surroundings specified by analyzing the image and the brightness as the threshold to set the light state mode according to the current situation of brightness. Information regarding the light state mode set by the light state mode setting unit 212 is supplied to the frame setting unit 214.

The light state mode setting unit 212 may set the light state mode on the basis of the detection results of the sensors included in the data acquisition unit 102, instead of the analysis results of the scene image. In addition, the light state mode may be set with reference to the current time or the like.

The object detection unit 213 acquires the map data and plots the buildings with detected outlines on the map to thereby generate a three-dimensional model of the buildings which are along the driving road and are included in the visual field of the user.

For example, the driving road is specified on the basis of position measurement results of the GNSS receiver included in the data acquisition unit 102. The map data supplied to the object detection unit 213 may be stored in the storage unit 111 or may be acquired from a server not illustrated.

Figure 11:
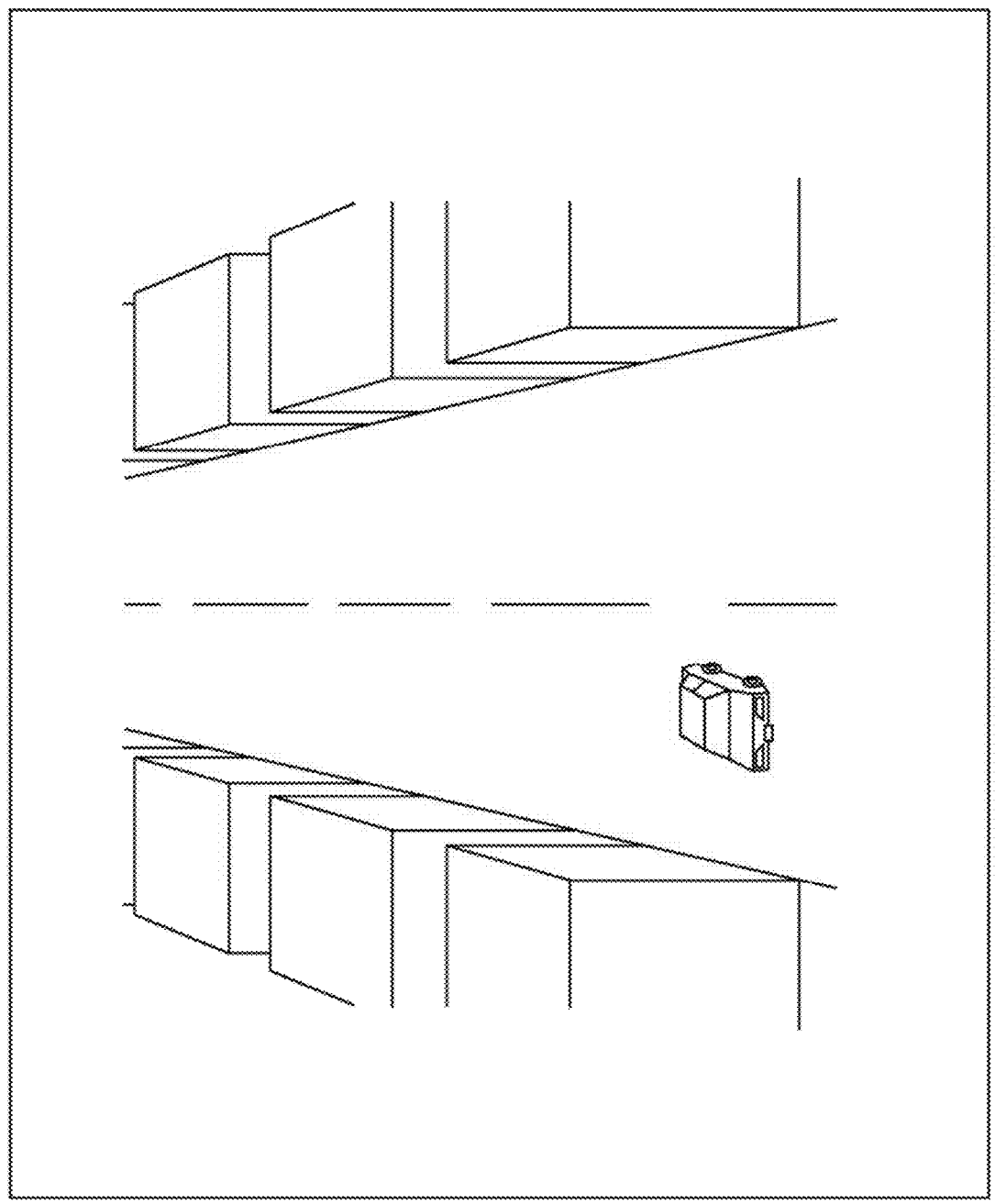
FIG. 11 is a diagram illustrating an example of a three-dimensional model of an object.

FIG. 11 is a diagram illustrating an example of the three-dimensional model of the objects along the road.

In the example of FIG. 11, buildings are lined up on the left and right of a linear road traveled by the user's vehicle. Such a three-dimensional model including the data of the outlines of the buildings is generated by the object detection unit 213. The three-dimensional model also includes data of outlines of objects other than the buildings included in the scene image, such as trees and telephone poles.

In a case where the map data supplied to the object detection unit 213 includes not only information regarding the position of each building, but also information regarding the height and the like of the building, the three-dimensional model as illustrated in FIG. 11 may be generated on the basis of the map data. In this case, the object detection unit 213 determines whether or not the buildings on the map data actually exist on the basis of the analysis results of the scene image of the image analysis unit 211 and identifies the positions of the buildings that actually exist.

For example, a building existing on the map data may be destroyed. In a case where the same building as the building on the map data is not in the scene image, the object detection unit 213 excludes the building from the target of superimposition of the content.

In this way, whether the objects exist can be checked on the basis of the scene image, thereby preventing superimposition of the content on a building not in the visual field of the user because the building is not actually there.

In general, the map data is updated every predetermined period, such as every year, and a building existing on the map data may not be there at the time of the traveling of the vehicle. Although the content looks floating in a case where the content is superimposed on the wall surface of the building that is not there at the time of the traveling of the vehicle, such an unnatural appearance can be prevented.

The object detection unit 213 outputs information of the three-dimensional model of the buildings actually in the scene image to the frame setting unit 214.

The frame setting unit 214 sets the information superimposition possible frames on the wall surfaces of the buildings included in the visual field of the user on the basis of the three-dimensional model supplied from the object detection unit 213. For example, planes with areas wider than a threshold are set as the information superimposition possible frames.

Figure 12:
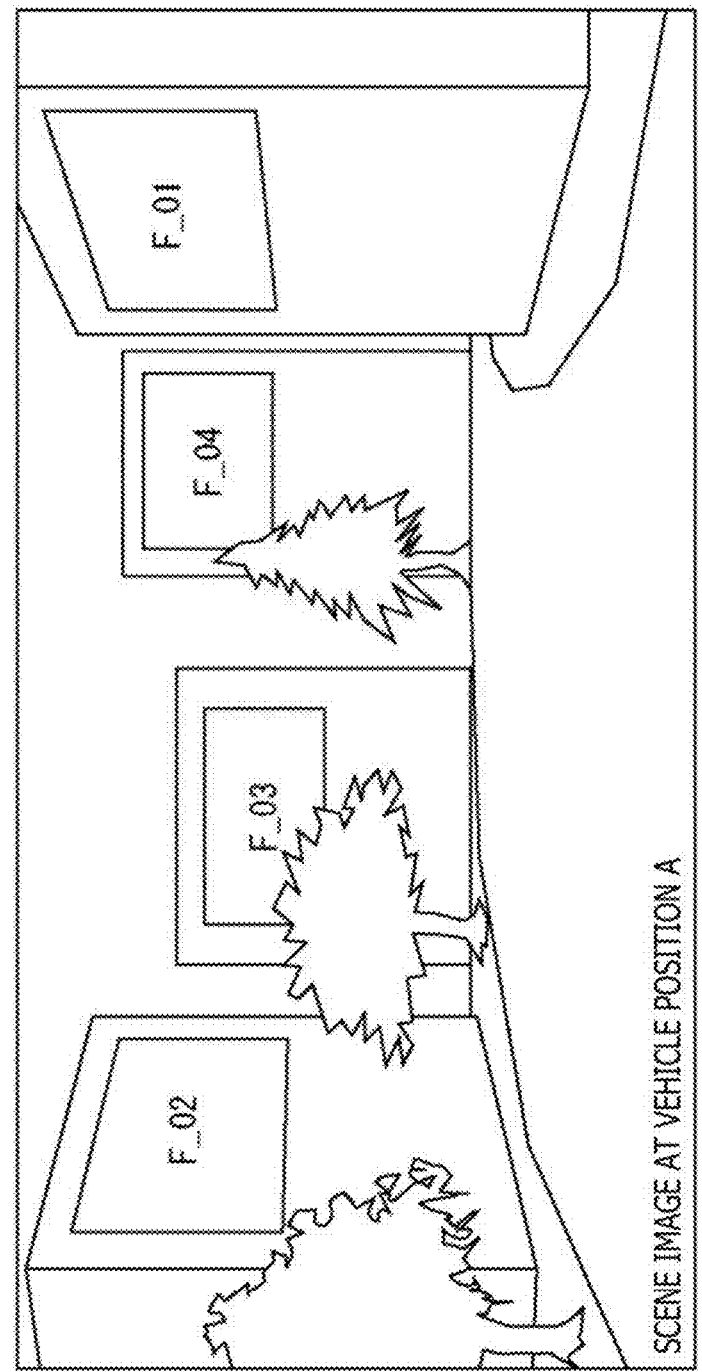
FIG. 12 is a diagram illustrating an example of setting information superimposition possible frames.

FIG. 12 is a diagram illustrating an example of setting the information superimposition possible frames.

In the example of FIG. 12, an information superimposition possible frame F_01 is set for a building on the near side on the right of a curve. In addition, there are three buildings on the left side along the curve, and information superimposition possible frames F_02, F_03, and F_04 are set from the buildings on the near side. Note that the scene illustrated in FIG. 12 is a scene at a vehicle position A described later.

In this way, the information superimposition possible frames as candidates for the superimposition locations of the content are set on the basis of the three-dimensional model of the buildings viewed from the road traveled by the user's vehicle. The frame as the superimposition location of the content is selected from the information superimposition possible frames set by the frame setting unit 214. Although one information superimposition possible frame is set on one surface of the building in FIG. 12, a plurality of information superimposition possible frames may be set.

In addition, the frame setting unit 214 excludes the information superimposition possible frames not appropriate for the superimposition locations of the content among the information superimposition possible frames set in this way. The information superimposition possible frames are excluded on the basis of the light state mode set by the light state mode setting unit 212, the brightness of each part of the building in the scene image analyzed by the image analysis unit 211, and the like.

<Determination on Basis of Exclusion Rules>
Exclusion Rule 1

The frame setting unit 214 excludes parts in an intense light emitting state, such as a large monitor, from the information superimposition possible frames in all cases of the "daytime mode," the "dusk mode," and the "night mode." For example, parts of buildings with luminance equal to or greater than a threshold are specified as the parts in the intense light emitting state.

In this case, whether or not to exclude the part from the information superimposition possible frames is determined on the basis of absolute luminance of each part.

Figure 13:
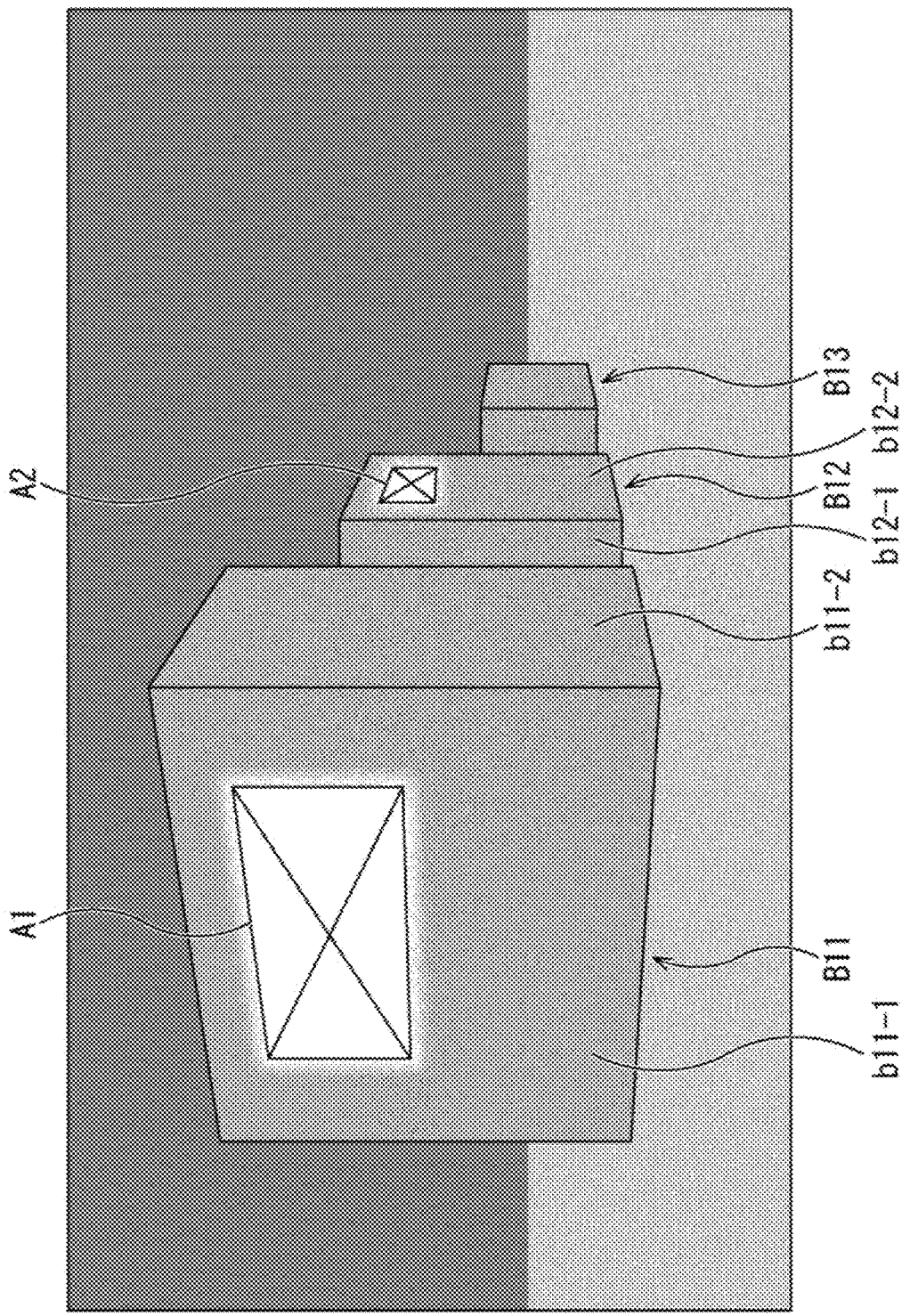
FIG. 13 is a diagram illustrating an example of the information superimposition possible frames excluded by an exclusion rule 1.

FIG. 13 is a diagram illustrating an example of the information superimposition possible frames excluded by the exclusion rule 1.

As illustrated in FIG. 13, large monitors are installed on a part of a region A1 in an upper section of a surface b11-1 included in a building B11 and a part of a region A2 in an upper section of a surface b12-2 included in a building B12. In this case, the part of the region A1 and the part of the region A2 are excluded from the information superimposition possible frames.

In a case where the content is superimposed on a part in the light emitting state, such as a large monitor, it may seem like the light is leaking from around the content. The part can be excluded from the information superimposition possible frames according to the exclusion rule 1 to prevent such an unnatural appearance.

Exclusion Rule 2

The frame setting unit 214 excludes, from the information superimposition possible frames, parts darkly shadowed due to the sunlight in the case of the "daytime mode." In a case where there are a part with high luminance caused by sunshine and a part in which the difference in luminance from the luminance of the part is equal to or greater than a threshold, the part with low luminance is specified as the part darkly shadowed due to the sunlight.

In this case, whether or not to exclude the part from the information superimposition possible frames is determined on the basis of the absolute luminance of each part and the difference in luminance from the surroundings.

Figure 14:
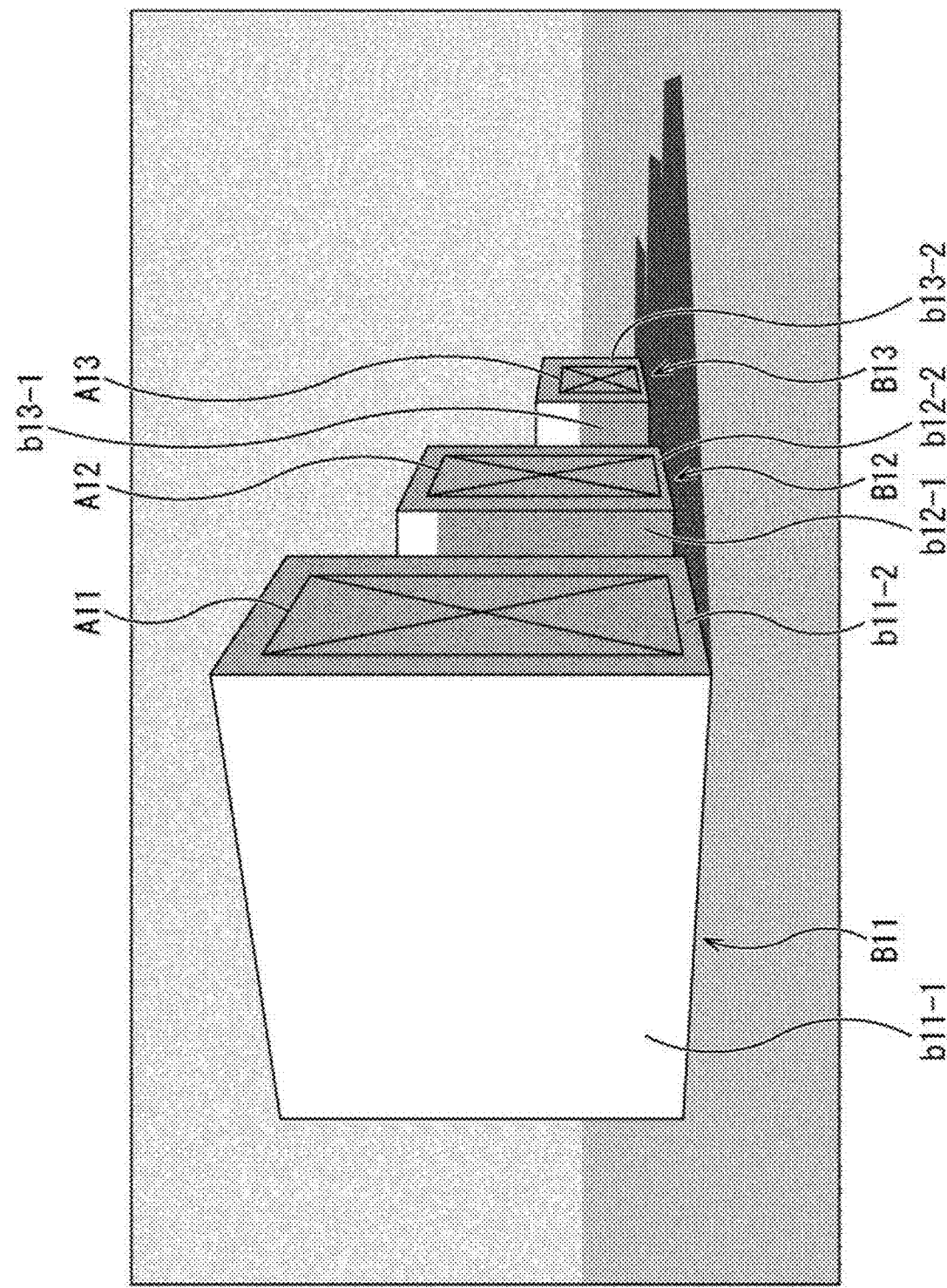
FIG. 14 is a diagram illustrating an example of the information superimposition possible frames excluded by an exclusion rule 2.

FIG. 14 is a diagram illustrating an example of the information superimposition frames excluded by the exclusion rule 2.

As illustrated in FIG. 14, it is assumed that the sunlight shines on the surface b11-1 included in the building B11, and an entire surface b11-2 that is another surface is shadowed so that the luminance difference between the surfaces is equal to or greater than the threshold. In this case, a part of a region A11 of the surface b11-2 with low luminance is excluded from the information superimposition possible frames.

Similarly, a part of a region A12 of the surface b12-2 included in the building B12 and a part of a region A13 of a surface b13-2 included in a building B13 are excluded from the information superimposition possible frames. The luminance difference is equal to or greater than the threshold between the upper section of the surface b12-1 and the surface b12-2 in the building B12, and the luminance difference is equal to or greater than the threshold between the upper section of the surface b13-1 and the surface b13-2 in the building B13.

The content is hard to see in a case where the content is superimposed on a shadow part where there is a very bright part in the surroundings. The part can be excluded from the information superimposition possible frames according to the exclusion rule 2 to ensure the visibility of the content.

Exclusion Rule 3

The frame setting unit 214 excludes parts that look particularly dark due to various reasons from the information superimposition possible frames in the case of the "dusk mode." For example, parts with luminance lower than a threshold are specified as the parts that look particularly dark.

In this case, whether or not to exclude the parts from the information superimposition possible frames is determined on the basis of the absolute luminance of each part as in the exclusion rule 1.

Figure 15:
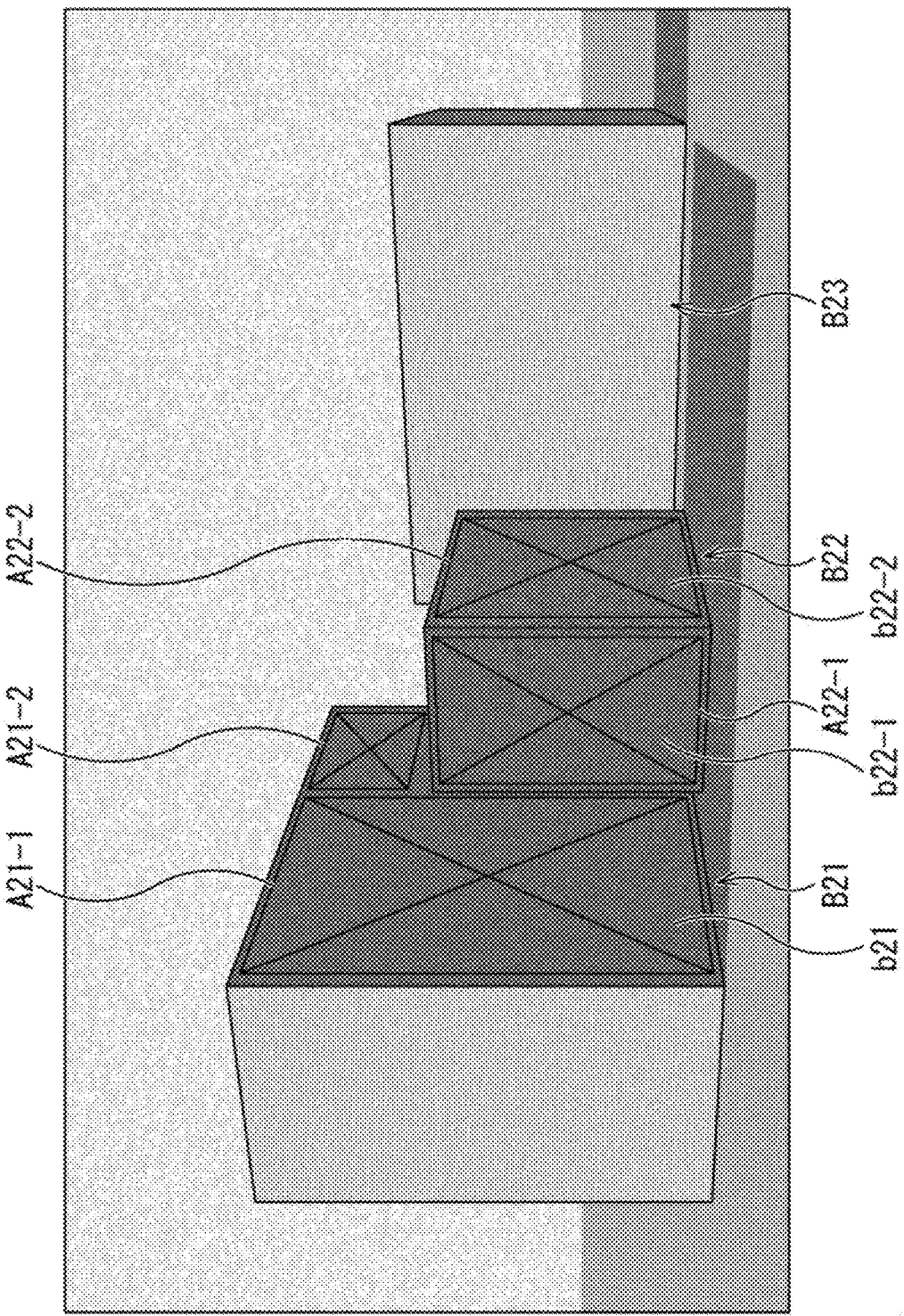
FIG. 15 is a diagram illustrating an example of the information superimposition possible frames excluded by an exclusion rule 3.

FIG. 15 is a diagram illustrating an example of the information superimposition possible frames excluded by the exclusion rule 3.

As illustrated in FIG. 15, it is assumed that the luminance of a surface b21-1 included in a building B21 is lower than the threshold. In addition, it is assumed that a surface b22-1 and a surface b22-2 included in a building B22 are shadowed by the building B21, and the luminance is lower than the threshold. In this case, parts of regions A21-1 and A21-2 of the surface b21-1, a part of a region A22-1 of the surface b22-1, and a part of a region A22-2 of the surface b22-2 are excluded from the information superimposition possible frames.

In a case where the content is superimposed on the particularly dark part, the content is hard to see. The visibility of the content can also be ensured by excluding the information superimposition possible frames according to the exclusion rule 3.

Note that, although a surface that can be viewed on the front side of a building B23 is a little dark in FIG. 15, the surface is not a part that looks particularly dark. Therefore, the surface is not excluded.

Exclusion Rule 4

The frame setting unit 214 excludes parts darkly shadowed by illumination light from the information superimposition possible frames in the case of the "night mode." For example, in a case where there are a part with high luminance due to illumination light and a part in which the difference in luminance from the luminance of the part is equal to or greater than a threshold, the part with low luminance is specified as the part darkly shadowed by the illumination light.

In this case, whether or not to remove the part from the information superimposition possible frames is determined on the basis of the absolute luminance of each part and the difference in luminance from the surroundings as in the exclusion rule 2.

Figure 16:
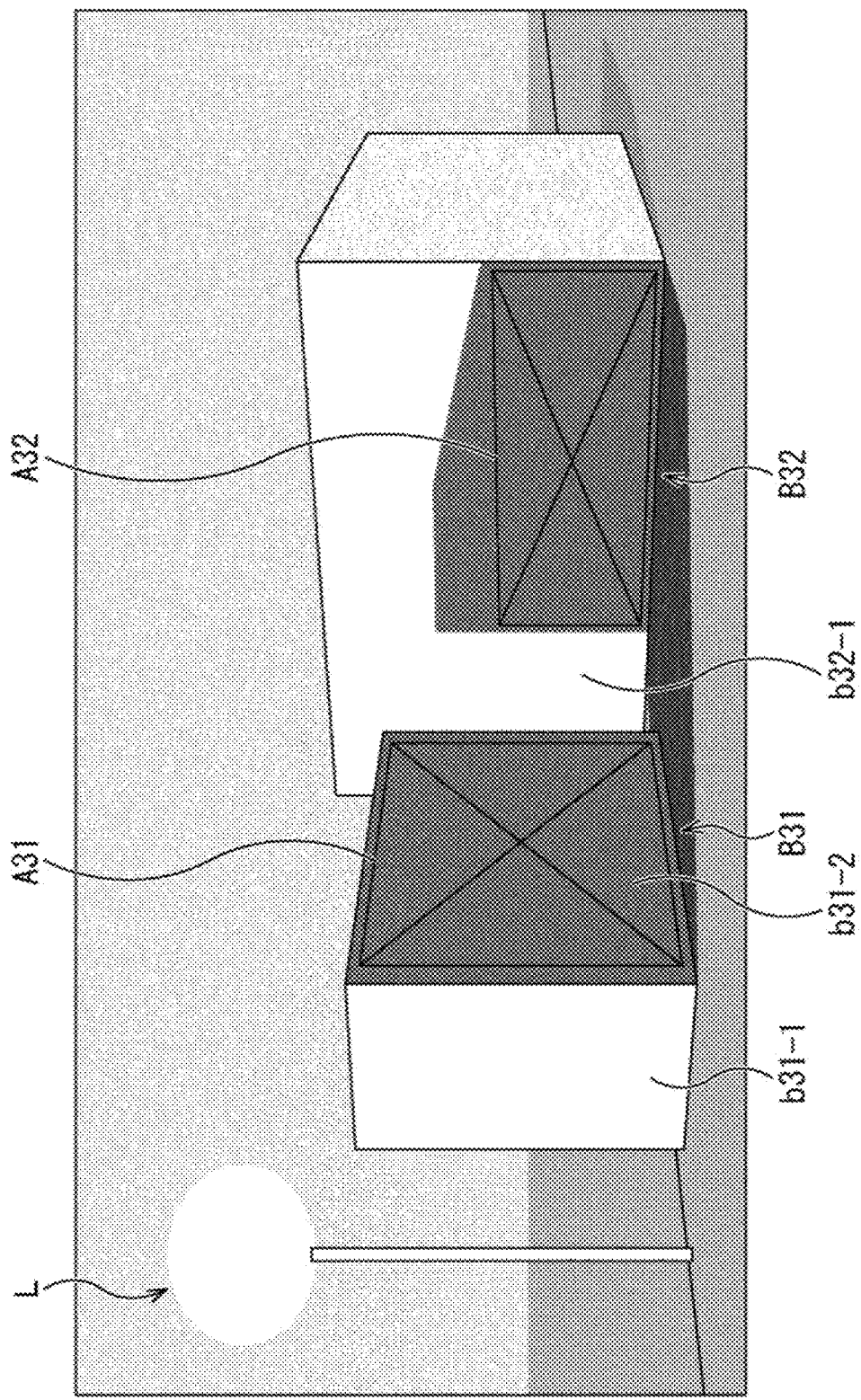
FIG. 16 is a diagram illustrating an example of the information superimposition possible frames excluded by an exclusion rule 4.

FIG. 16 is a diagram illustrating an example of the information superimposition possible frames excluded by the exclusion rule 4.

As illustrated in FIG. 16, it is assumed that light from a street lamp L shines on a surface b31-1 included in a building B31, and an entire surface b31-2 that is another surface is shadowed so that the luminance difference between the surfaces is equal to or greater than a threshold. In this case, a part of a region A31 of the surface b31-2 with low luminance is excluded from the information superimposition possible frames.

Similarly, it is assumed that the light from the street lamp L shines on part of a surface b32-1 included in a building B32, and another part is shadowed by the building B31 so that the luminance difference between the parts is equal to or greater than the threshold. In this case, a part of a region A32 with low luminance in the surface 32-1 is excluded from the information superimposition possible frames.

The content is hard to see in a case where the content is superimposed on a shadow part where there is a very bright part in the surroundings. The visibility of the content can also be ensured by excluding the information superimposition possible frames according to the exclusion rule 4.

Exclusion Rule 5

The frame setting unit 214 excludes parts in the light emitting state in outer walls of buildings and window parts in the light emitting state due to internal lighting or the like from the information superimposition possible frames in the case of the "night mode." For example, parts of buildings with luminance equal to or greater than a threshold are specified as the parts in the light emitting state.

In this case, whether or not to exclude the parts from the information superimposition possible frames is determined on the basis of the absolute luminance of each part.

Figure 17:
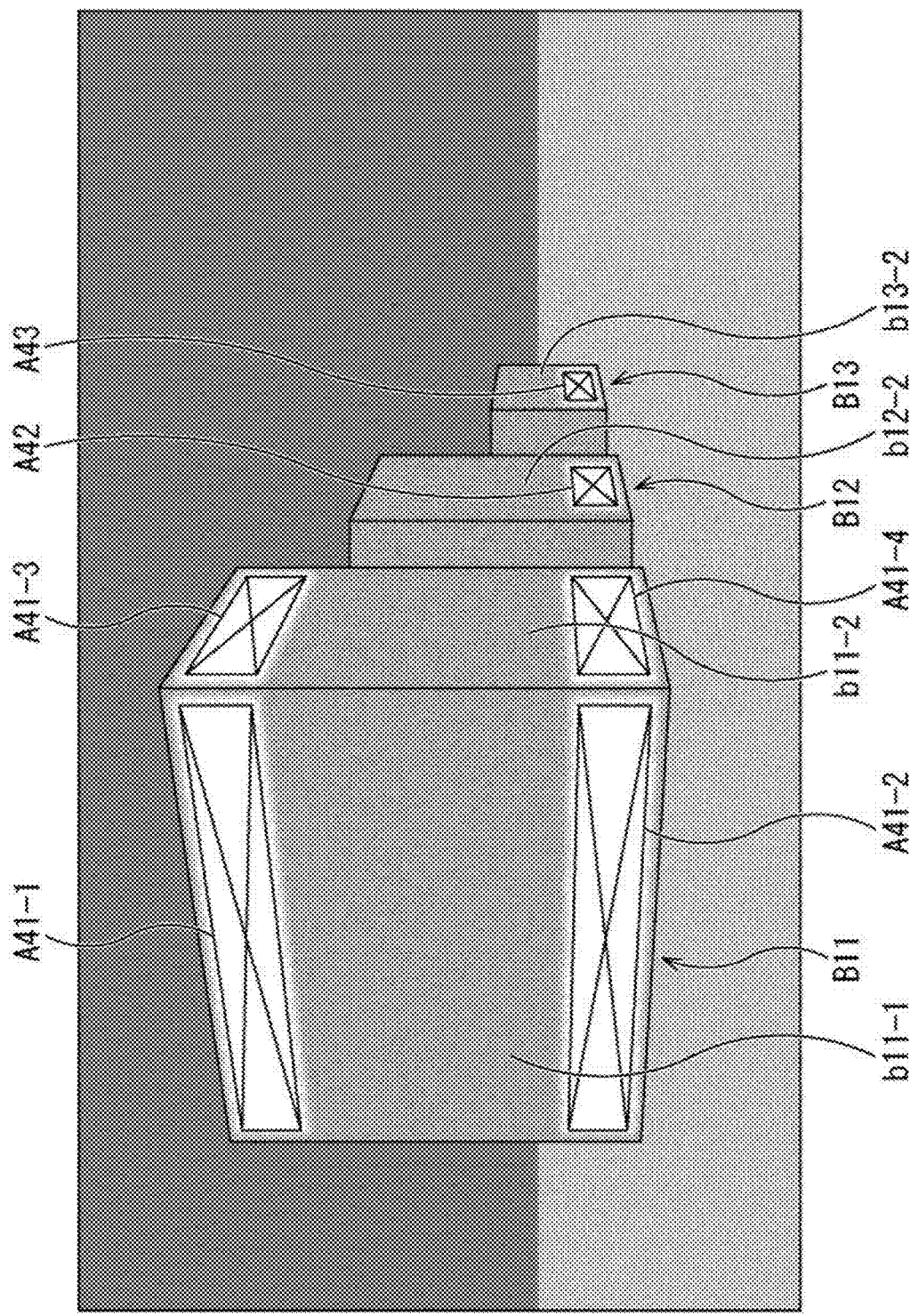
FIG. 17 is a diagram illustrating an example of the information superimposition possible frames excluded by an exclusion rule 5.

FIG. 17 is a diagram illustrating an example of the information superimposition possible frames excluded by the exclusion rule 5.

As illustrated in FIG. 17, it is assumed that parts of regions A41-1 and A41-2 of the surface b11-1 included in the building B11 and parts of regions A41-3 and A41-4 of the surface b11-2 include windows, and the parts are in the light emitting state due to lighting in the room. In this case, the parts of the regions A41-1 to A41-4 are excluded from the information superimposition possible frames.

Similarly, a part of a region A42 of the surface b12-2 included in the building B12 and a part of a region A43 of the surface b13-2 included in the building B13 are excluded from the information superimposition possible frames. It is assumed that the parts also include windows, and the parts are in the light emitting state due to lighting in the room.

In a case where the surroundings are dark, it may seem like the light is leaking from around the content in a case where the content is superimposed on a window part or the like where the light inside the room is leaking. The information superimposition possible frames can be excluded according to the exclusion rule 5 to prevent such an unnatural appearance.

Exclusion Rule 6

The frame setting unit 214 excludes parts morally or customarily inappropriate for superimposing the content, such as a historical structure, a display object like a signboard, and an object at a sightseeing spot, from the information superimposition possible frames. The exclusion rule 6 is adopted in all of the cases of the "daytime mode," the "dusk mode," and the "night mode."

Figure 18:
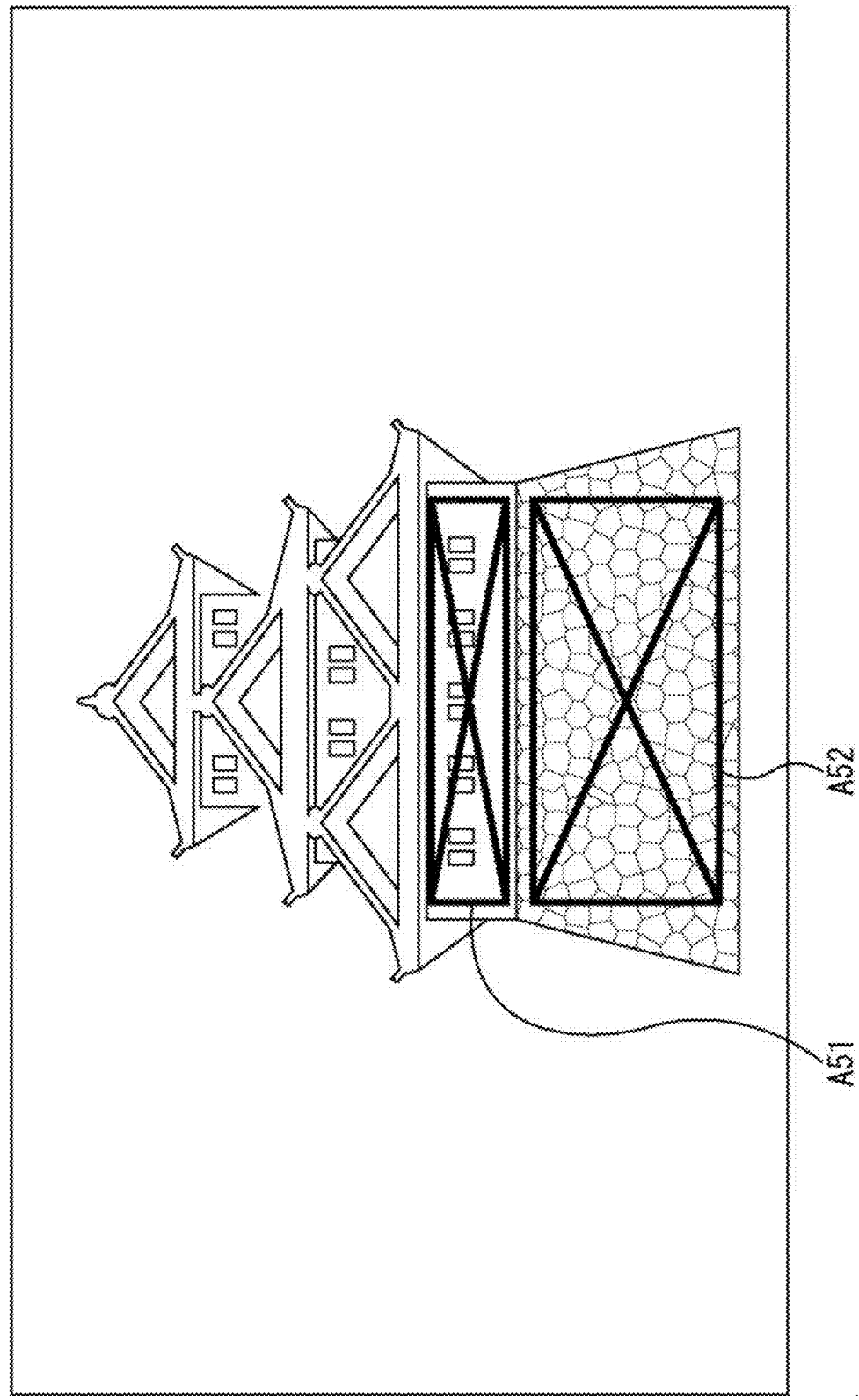
FIG. 18 is a diagram illustrating an example of the information superimposition possible frames excluded by an exclusion rule 6.

FIG. 18 is a diagram illustrating an example of the information superimposition possible frames excluded by the exclusion rule 6.

As indicated by regions A51 and A52 of FIG. 18, for example, outer walls of a castle as a historical structure are excluded from the information superimposition possible frames.

The determination on the basis of the exclusion rule 6 is performed by the frame setting unit 214 on the basis of, for example, the information included in the map data. The scene image may be analyzed to detect a historical structure and the like to determine whether or not to remove the regions from the information superimposition possible frames.

The frame setting unit 214 excludes the information superimposition possible frames according to the rules described above and outputs information regarding the remaining (not excluded) information superimposition possible frames to the appropriate visual field setting unit 215.

<Determination of Information Superimposition Appropriate Frames>

The appropriate visual field setting unit 215 of FIG. 10 determines whether or not the information superimposition possible frames set by the frame setting unit 214 and determined on the basis of the exclusion rules satisfy the following conditions 1 to 4.

Condition 1: The distance from the user, the angle with respect to the vehicle traveling direction, and the angular velocity in a user visual field calculated from the vehicle speed are within reference ranges.

Condition 2: The angle with respect to the vehicle traveling direction is equal to or greater than a minimum reference value.

Condition 3: The exposed area ratio is equal to or greater than a reference value in a case where the information superimposition possible frame can be viewed beyond a front object, such as a tree and a telephone pole.

Condition 4: The stay time in the user visual field is equal to or greater than a reference value.

Whether or not these conditions are satisfied is determined by appropriately using the analysis results of the scene image, the information regarding the road included in the map data, the traveling direction of the vehicle, the vehicle speed, and the like. Information regarding the current state of the vehicle, such as the traveling direction of the vehicle and the vehicle speed, is specified on the basis of, for example, information supplied from the situation analysis unit 133 and the like. In addition, information regarding the state of the vehicle in the future is specified on the basis of, for example, progress state prediction information supplied from the motion planning unit 163 and the like.

The appropriate visual field setting unit 215 sets the information superimposition possible frame satisfying all of the conditions 1 to 4 as an information superimposition appropriate frame. The information superimposition possible frame not satisfying at least any one of the conditions 1 to 4 is not selected as an information superimposition appropriate frame.

Although the determination of whether or not the conditions 1 to 4 are satisfied will be described, a specific example of a prerequisite state of the vehicle will be described first.

Figure 19:
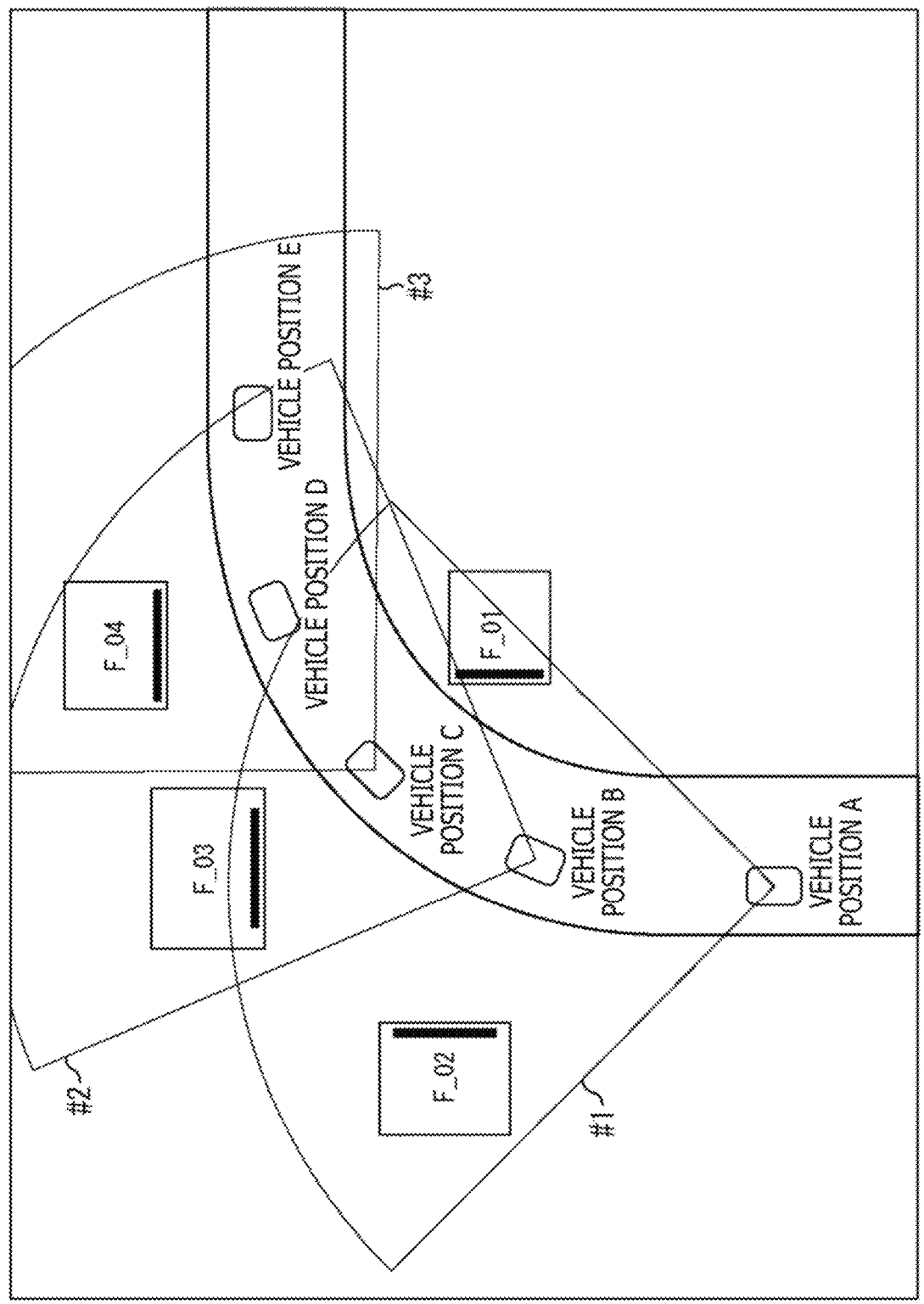
FIG. 19 is a diagram illustrating an example of transition of a vehicle position.

FIG. 19 is a diagram illustrating an example of transition of the vehicle position.

FIG. 19 illustrates a state of transition in the position of the vehicle traveling a curve to the right, as viewed from a plane. A rectangle with rounded corners on the road represents the vehicle, and a rectangle on both sides of the road represents a building. There is one building inside the curve, and the information superimposition possible frame F_01 is set on the surface on the road side of the building. In addition, there are three buildings outside the curve, and the information superimposition possible frames F_02, F_03, and F_04 are set on the buildings from the near side. In FIG. 19, a thick line in the rectangle representing the building indicates the information superimposition possible frame.

Vehicle positions A to E represent the positions of the vehicle at each time. The vehicle sequentially travels on a trajectory connecting the vehicle positions A to E.

Figure 20:
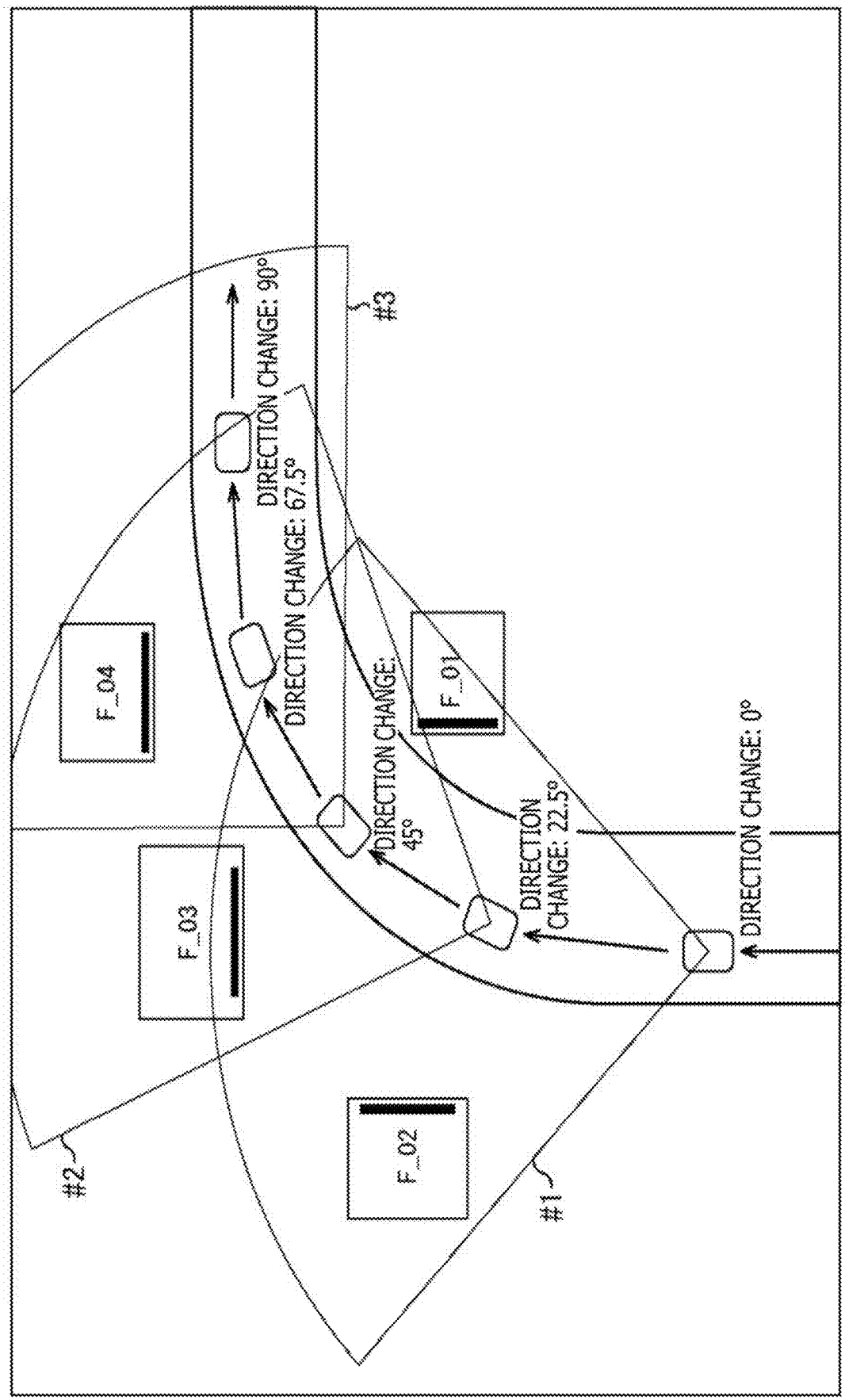
FIG. 20 is a diagram illustrating an example of a change in direction of the vehicle.

For example, based on the orientation of the vehicle at the vehicle position A, the direction change at the vehicle position B is expressed as 22.5°, and the direction change at the vehicle position C is expressed as 45° as illustrated in FIG. 20. The direction change of the vehicle at the vehicle position D is expressed as 67.5°, and the direction change of the vehicle at the vehicle position E is expressed as 90°.

An interior angle of a sector indicated on the basis of the vehicle position represents a range of the visual field of the user at each position of the vehicle. For example, the visual field at the vehicle position A is indicated by a sector #1, and the visual field at the vehicle position B is indicated by a sector #2. The visual field at the vehicle position C is indicated by a sector #3. In this way, the scene viewed by the user changes according to the vehicle position and the direction of the vehicle.

The state of the vehicle at each time is generated at each timing on the basis of the current state of progress of the vehicle and the state of progress in the future. FIG. 19 illustrates the state of transition in the vehicle position generated at a timing that the vehicle is traveling at the vehicle position A. The states of the vehicle at the vehicle positions B to E are states predicted on the basis of the state of progress in the future. The state of progress in the future is indicated by the progress state prediction information input from the outside.

Figure 21:
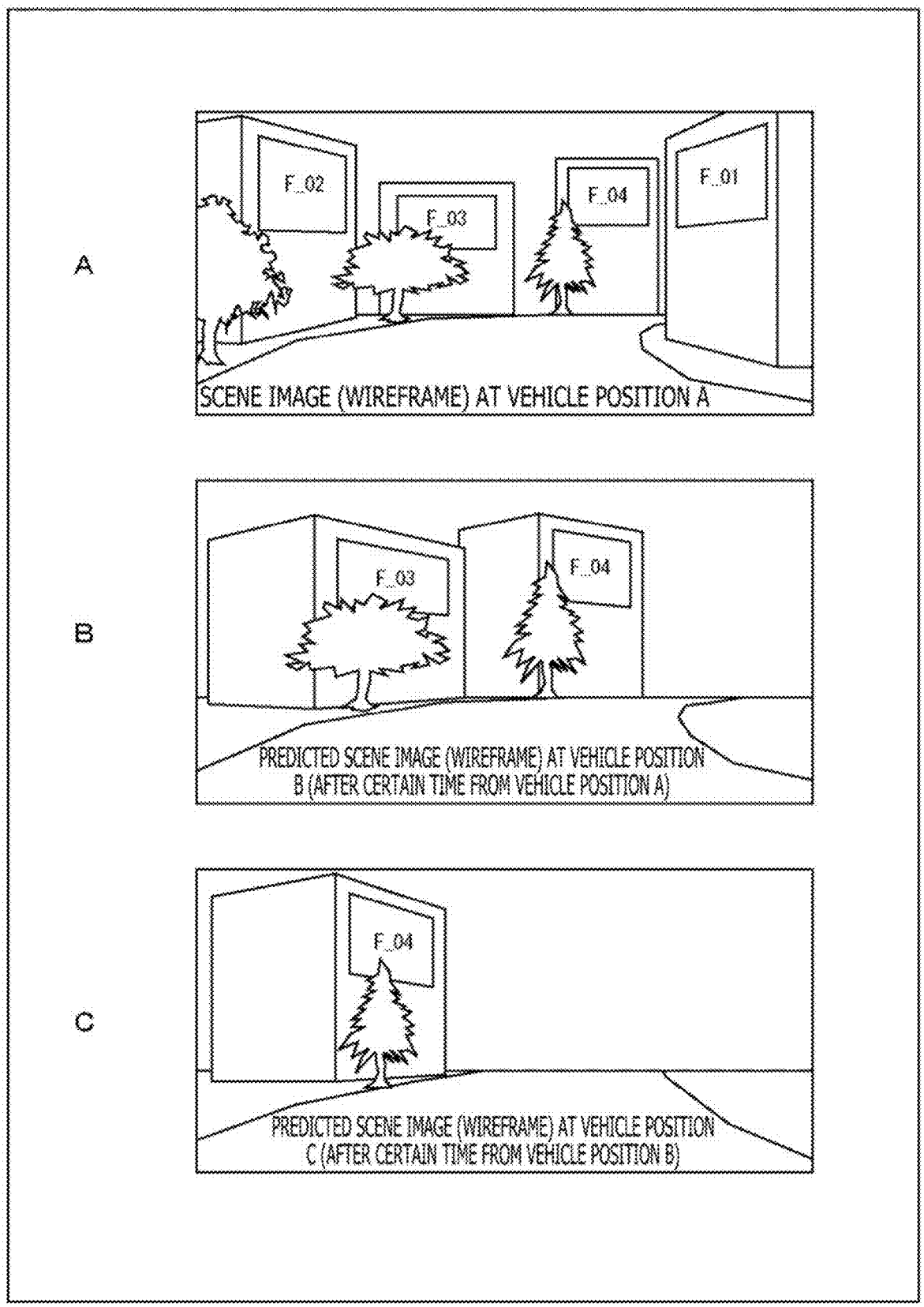
FIG. 21 depicts diagrams illustrating scene images at vehicle positions.

FIG. 21 depicts diagrams illustrating scene images at the vehicle positions.

For the convenience of description, it is assumed that the range of the scene image captured by the camera matches the range of the visual field of the user. The entire scene viewed by the user is imaged by the camera.

A of FIG. 21 illustrates a scene image at the vehicle position A. The scene image at the vehicle position A includes all of the information superimposition possible frames F_01 to F_04. As indicated by the sector #1 of FIG. 19, the visual field of the user at the timing of traveling at the vehicle position A includes the information superimposition possible frames F_01 to F_04.

In the state of A in FIG. 21, respective trees are planted at the position in front of the building provided with the information superimposition possible frame F_03 and at the position in front of the building provided with the information superimposition possible frame F_04 in a manner that the trees partially overlap the information superimposition possible frames. Note that the scene illustrated in A of FIG. 21 is the same as the scene described with reference to FIG. 12.

B of FIG. 21 illustrates a scene image at the vehicle position B. The current vehicle position is the vehicle position A, and therefore, the scene image illustrated in B of FIG. 21 represents a scene predicted to be viewed after a lapse of certain time.

The scene image at the vehicle position B includes the information superimposition possible frame F_03 and the information superimposition possible frame F_04. As indicated by the sector #2 in FIG. 19, the visual field of the user at the timing of traveling at the vehicle position B includes the information superimposition possible frame F_03 and the information superimposition possible frame F_04.

C of FIG. 21 illustrates a scene image at the vehicle position C. The current vehicle position is the vehicle position A, and therefore, the scene image illustrated in C of FIG. 21 represents a scene predicted to be viewed after an additional lapse of certain time from the timing of traveling at the vehicle position B.

The scene image at the vehicle position C includes the information superimposition possible frame F_04. As indicated by the sector #3 in FIG. 19, the information superimposition possible frame F_04 is included on the left side of the visual field of the user at the timing of traveling at the vehicle position C.

At the timing of traveling at the vehicle positions D and E, all of the information superimposition possible frames F_01 to F_04 are out of the visual field of the user.

Determination of Condition 1

The appropriate visual field setting unit 215 determines that the condition 1 is satisfied in a case where the distance from the user, the angle with respect to the vehicle traveling direction, and the angular velocity in the user visual field calculated from the vehicle speed are within reference ranges. The angular velocity in the user visual field represents an angular velocity of the vehicle during the time that the information superimposition possible frame is within the visual field of the user on the basis of the position of each information superimposition possible frame.

Figure 22:
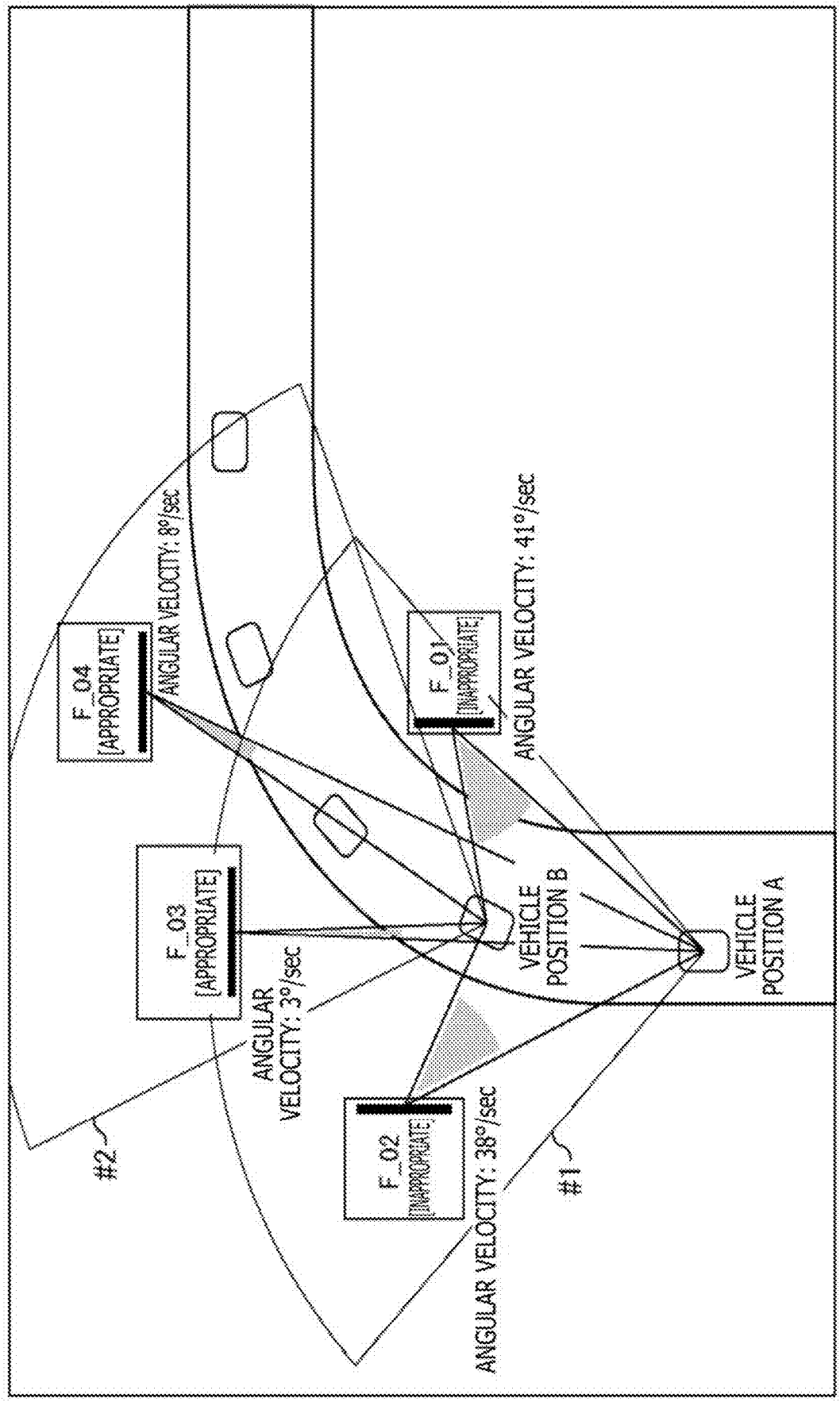
FIG. 22 is a diagram illustrating an example of an angular velocity in a user visual field.

FIG. 22 is a diagram illustrating an example of the angular velocity in the user visual field.

The example of FIG. 22 illustrates determination using the angular velocity in the user visual field during movement from the vehicle position A to the vehicle position B. In this case, as illustrated in FIG. 22, the angular velocity in the user visual field of the information superimposition possible frame F_01 is 41°/sec, and the angular velocity in the user visual field of the information superimposition possible frame F_02 is 38°/sec. In addition, the angular velocity in the user visual field in the information superimposition possible frame F_03 is 3°/sec, and the angular velocity in the user visual field of the information superimposition possible frame F_04 is 8°/sec.

For example, in a case where an upper limit of the reference value of the angular velocity in the user visual field is 30°/sec, the information superimposition possible frame F_01 and the information superimposition possible frame F_02 exceeding the reference value do not satisfy the condition 1, and it is determined that the frames are inappropriate for the frames to be provided with the content.

In contrast, the information superimposition possible frame F_03 and the information superimposition possible frame F_04 within the range of the reference value satisfy the condition 1, and it is determined that the frames are appropriate for the frames to be provided with the content. The fact that the angular velocity in the user visual field is smaller than the reference value indicates that the amount of movement in the visual field of the user is small.

In this way, whether or not the frame is appropriate for the frame to be provided with the content can be determined on the basis of the condition 1 to select a frame with a small amount of movement in the visual field of the user, that is, a frame that can be easily viewed when the content is superimposed.

For example, in a case where the content is superimposed on the information superimposition possible frame with a large angular velocity in the user visual field, the movement of the content looks large. The determination on the basis of the condition 1 can prevent the superimposition of the content on the information superimposition possible frame that moves large in the visual field.

Determination of Condition 2

The appropriate visual field setting unit 215 determines that the condition 2 is satisfied in a case where the angle with respect to the vehicle traveling direction is equal to or greater than a minimum reference value.

Figure 23:
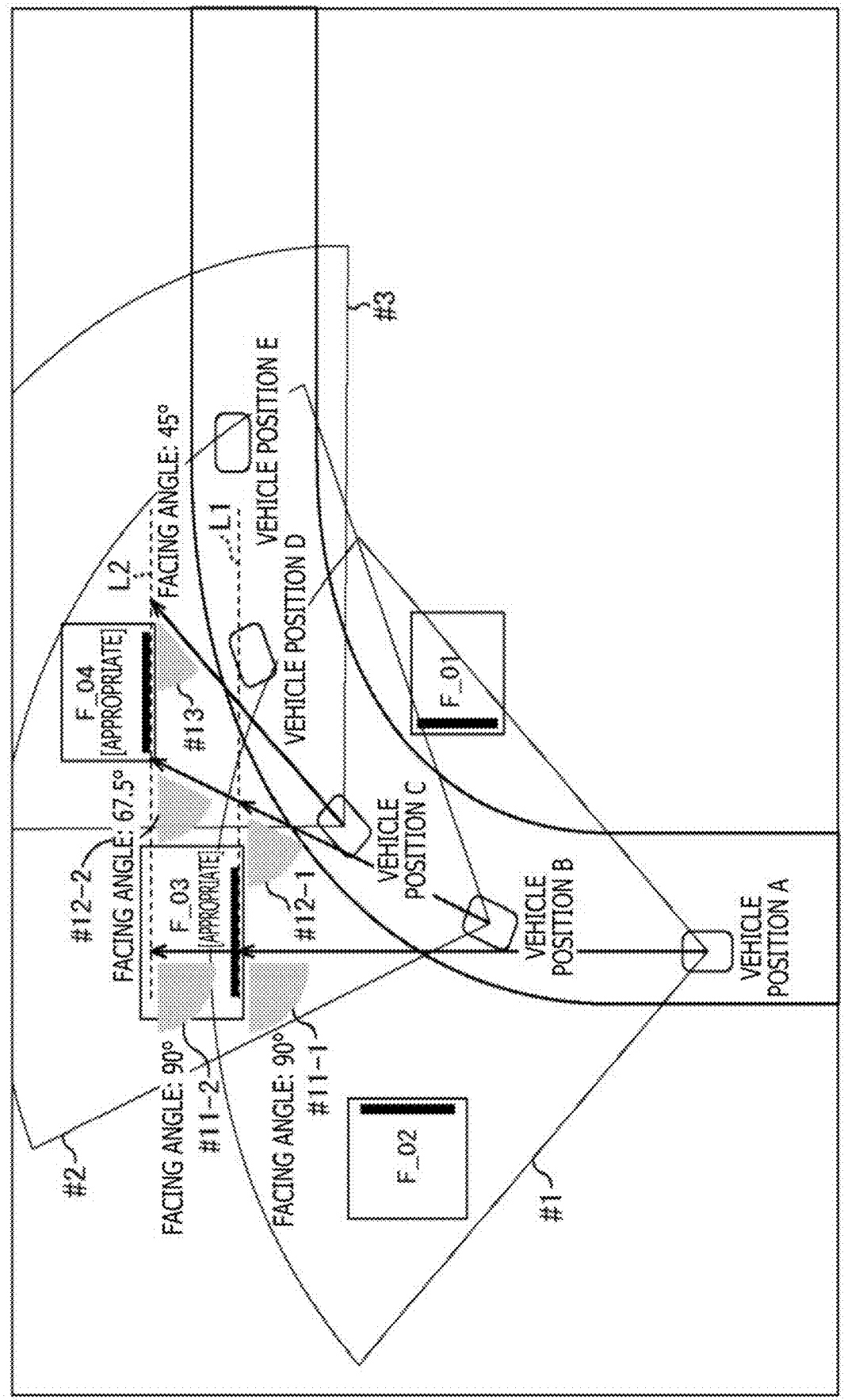
FIG. 23 is a diagram illustrating an example of an angle with respect to a vehicle traveling direction.

FIG. 23 is a diagram illustrating an example of the angle with respect to the vehicle traveling direction.

As illustrated in FIG. 23, the setting surface of the information superimposition possible frame F_03 is indicated by a broken line L1, and the setting surface of the information superimposition possible frame F_04 is indicated by a broken line L2. The information superimposition possible frame F_01 and the information superimposition possible frame F_02 are determined as inappropriate frames in the determination on the basis of the condition 1, and therefore, the determination on the basis of the condition 2 is not performed for the information superimposition possible frame F_01 and the information superimposition possible frame F_02.

The angle of the information superimposition possible frame F_03 with respect to the vehicle traveling direction at the vehicle position A is indicated by a sector #11-1, and the angle of the information superimposition possible frame F_04 with respect to the vehicle traveling direction is indicated by a sector #11-2. The angles of the information superimposition possible frames with respect to the vehicle traveling direction are both 90°.

In the example, the information superimposition possible frame F_03 and the information superimposition possible frame F_04 are set on parallel surfaces, and the angles with respect to the vehicle traveling direction are the same angle at the same vehicle position. In a case where the frames are set on surfaces that are not parallel, the angles with respect to the vehicle traveling direction are different angles.

The angles of the information superimposition possible frames with respect to the vehicle traveling direction at each vehicle position are similarly obtained.

That is, the angle of the information superimposition possible frame F_03 with respect to the vehicle traveling direction at the vehicle position B is indicated by a sector #12-1, and the angle of the information superimposition possible frame F_04 with respect to the vehicle traveling direction is indicated by a sector #12-2. The angles of the information superimposition possible frames with respect to the vehicle traveling direction are both 67.5°.

The angle of the information superimposition possible frame F_04 with respect to the vehicle traveling direction at the vehicle position C is indicated by a sector #13. The angle of the information superimposition possible frame F_04 with respect to the vehicle traveling direction is 45°. The determination using the angle of the information superimposition possible frame F_03 with respect to the vehicle traveling direction is not performed because the frame is already out of the visual field of the user at the timing of traveling at the vehicle position C.

For example, in a case where the reference value of the minimum angle with respect to the vehicle traveling direction is 30°, the angles of the information superimposition possible frame F_03 and the information superimposition possible frame F_04 with respect to the vehicle traveling direction both exceed the reference value at the timing of traveling at the vehicle position A. The information superimposition possible frame F_03 and the information superimposition possible frame F_04 satisfy the condition 2, and it is determined that the frames are appropriate for the frames to be provided with the content.

In addition, both of the angles of the information superimposition possible frame F_03 and the information superimposition possible frame F_04 with respect to the vehicle traveling direction also exceed the reference value at the timing of traveling at the vehicle position B. The information superimposition possible frame F_03 and the information superimposition possible frame F_04 satisfy the condition 2, and it is determined that the frames are appropriate for the frames to be provided with the content.

The angle of the information superimposition possible frame F_04 with respect to the vehicle traveling direction exceeds the reference value at the timing of traveling at the vehicle position C. The information superimposition possible frame F_04 satisfies the condition 2, and it is determined that the frame is appropriate for the frame to be provided with the content.

An information superimposition possible frame in which the angle with respect to the vehicle traveling direction exceeds the reference value not only at one timing, but also at a plurality of timings may be determined to satisfy the condition 2.

The fact that the angle of the information superimposition possible frame with respect to the vehicle traveling direction is equal to or greater than the reference value indicates that the information superimposition possible frame is set in a direction close to the front of the user.

In this way, whether or not the frame is appropriate for the frame to be provided with the content can be determined on the basis of the condition 2 to select a frame set in a direction close to the front of the user, that is, a frame that can be easily viewed when the content is superimposed.

Determination of Condition 3

The appropriate visual field setting unit 215 determines that the condition 3 is satisfied in a case where the exposed area ratio is equal to or greater than a reference value when the information superimposition possible frame can be viewed beyond a front object, such as a tree and a telephone pole. The front object is an object in front of the information superimposition possible frame as viewed from the position of the user.

Note that the determination on the basis of the condition 3 may be performed in a case where the distance between the front object and a building (information superimposition possible frame) behind the front object is closer than a threshold. The distance between the front object and the building is specified on the basis of, for example, the three-dimensional model of the object generated by the object detection unit 213.

Figure 24:
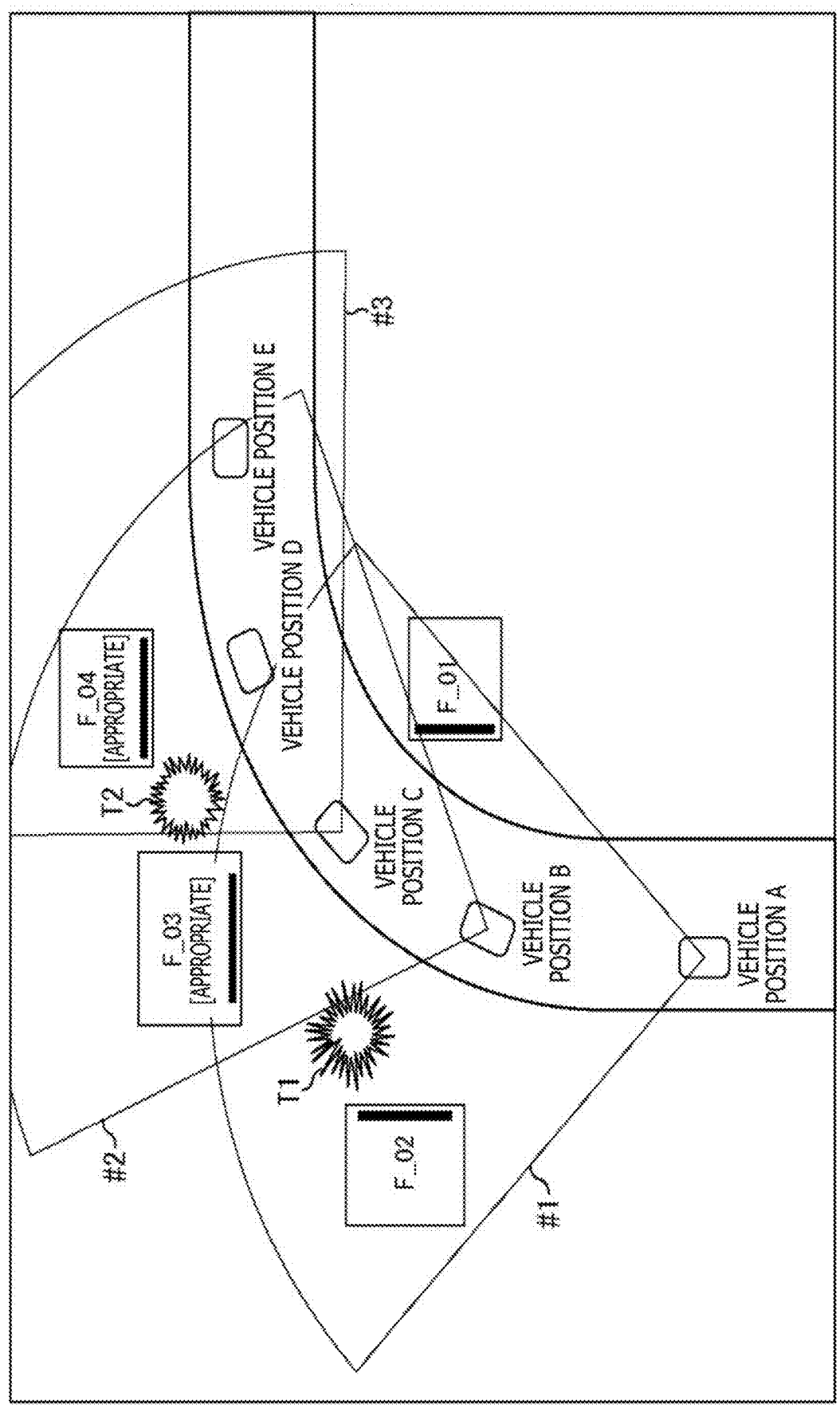
FIG. 24 is a diagram illustrating an example of an exposed area ratio.
Figure 25:
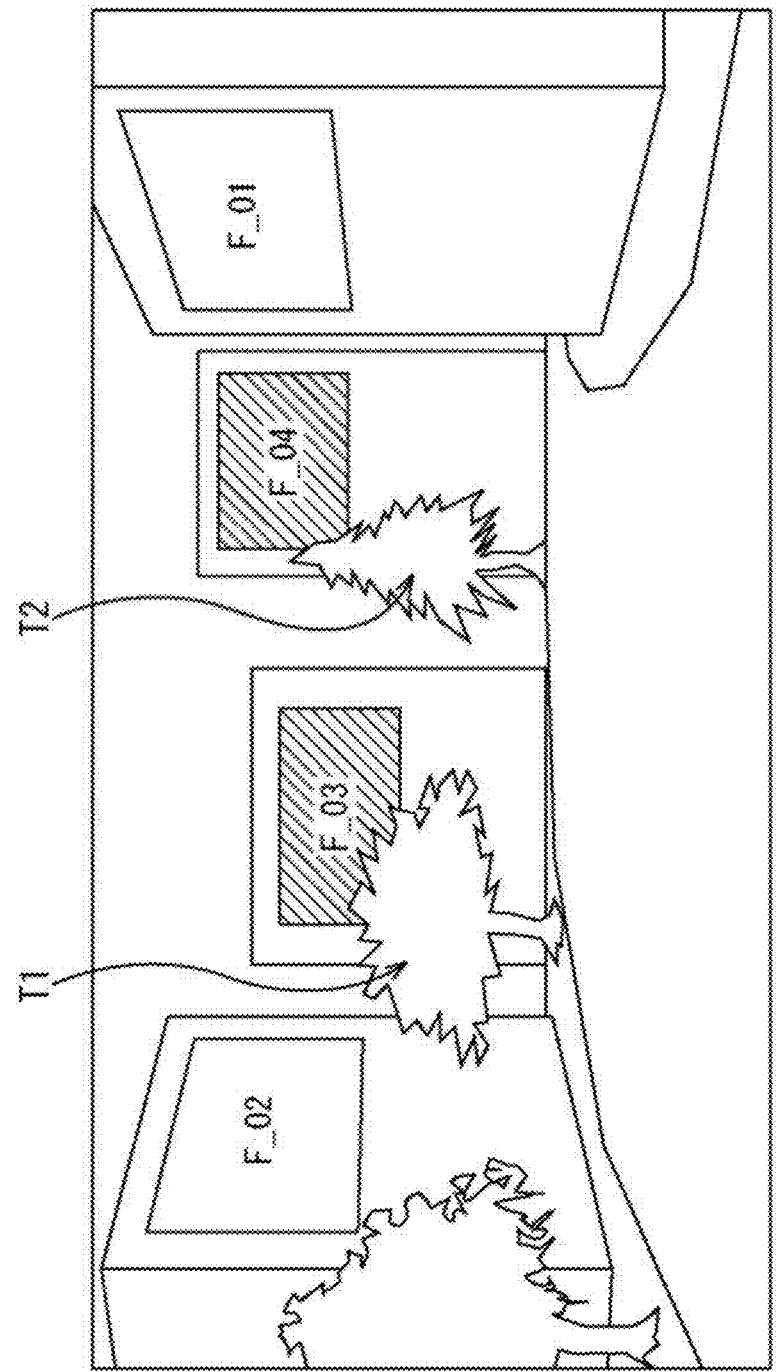
FIG. 25 is a diagram illustrating the example of the exposed area ratio.

FIGS. 24 and 25 are diagrams each illustrating an example of the exposed area ratio.

As illustrated in FIG. 24, for example, there is a tree T1 in front of the information superimposition possible frame F_03 included in the visual field of the user, and there is a tree T2 in front of the information superimposition possible frame F_04 at the timing of traveling at the vehicle position A. As illustrated in FIG. 25, the user views the information superimposition possible frames partially covered by the trees.

The exposed area ratio of the information superimposition possible frame F_03 is indicated as a ratio of the area of the part (diagonal line part in FIG. 25) not hidden by the tree T1 to the area of the entire information superimposition possible frame F_03. The areas are obtained by, for example, the appropriate visual field setting unit 215 on the basis of the analysis results of the scene image. In this example, the exposed area ratio of the information superimposition possible frame F_03 is 80%.

Similarly, the exposed area ratio of the information superimposition possible frame F_04 is indicated as a ratio of the area of the part not hidden by the tree T2 to the area of the entire information superimposition possible frame F_04. In this example, the exposed area ratio of the information superimposition possible frame F_04 is 95%.

For example, in a case where the minimum reference value of the exposed area ratio is 60%, both of the exposed area ratios of the information superimposition possible frame F_03 and the information superimposition possible frame F_04 exceed the reference value at the timing of traveling at the vehicle position A. The information superimposition possible frame F_03 and the information superimposition possible frame F_04 satisfy the condition 3, and it is determined that the frames are appropriate for the frames to be provided with the content.

An information superimposition possible frame in which the exposed area ratio exceeds the reference value not only at one timing, but also at a plurality of timings may be determined to satisfy the condition 3.

The fact that the exposed area ratio is equal to or greater than the reference value indicates that a wide range of the information superimposition possible frame can be viewed from the user even in a case where there is an object on the near side.

In this way, whether or not the frame is appropriate for the frame to be provided with the content can be determined on the basis of the condition 3 to select a frame that can be easily viewed when the content is superimposed.

Determination of Condition 4

The appropriate visual field setting unit 215 determines that the condition 4 is satisfied in a case where the stay time in the user visual field is equal to or greater than a reference value.

Figure 26:
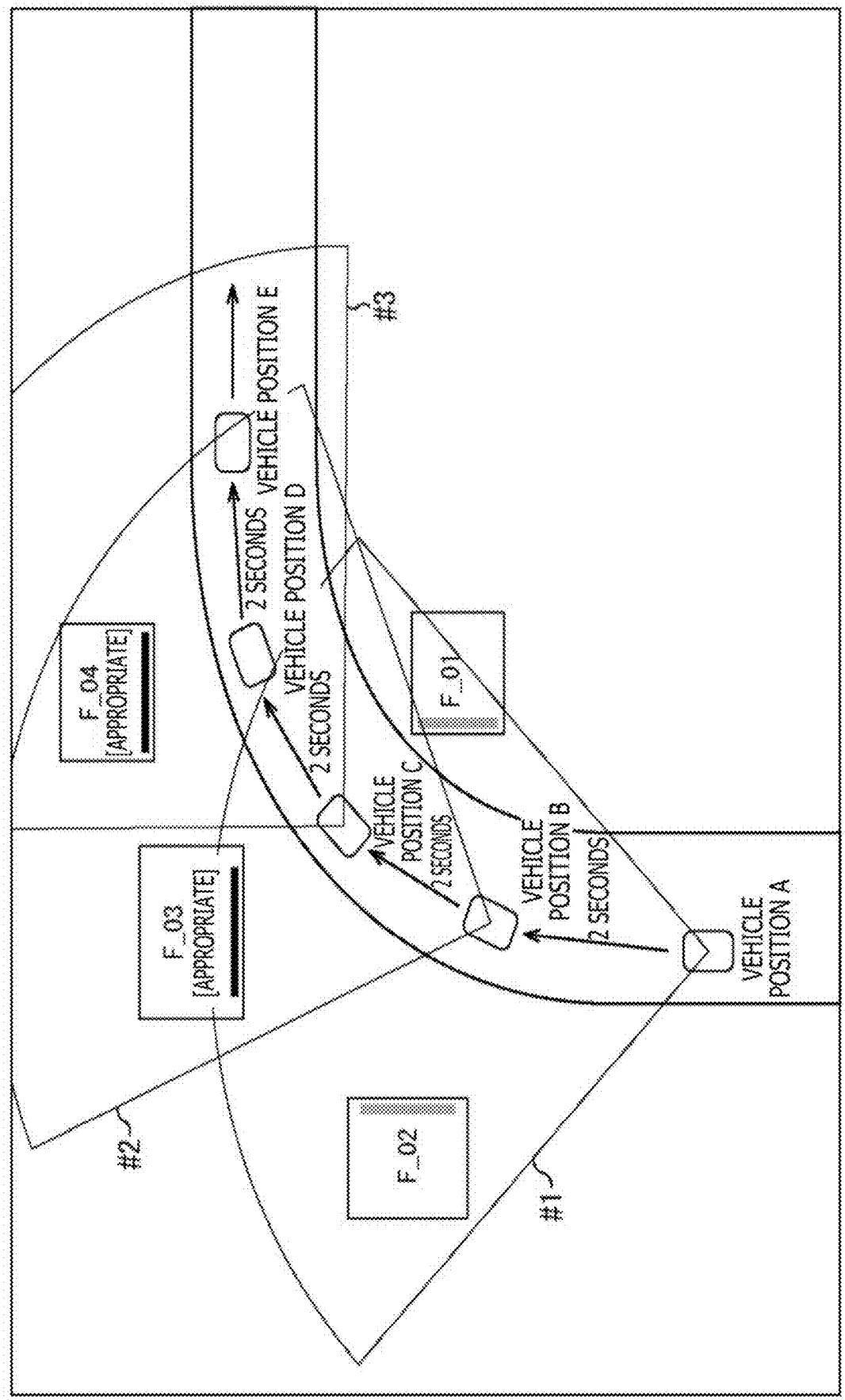
FIG. 26 is a diagram illustrating an example of stay time in the user visual field.

FIG. 26 is a diagram illustrating an example of the stay time in the user visual field.

As illustrated in FIG. 26, it is assumed that the time for traveling from the vehicle position A to the vehicle position B is two seconds. It is also assumed that the time for traveling from the vehicle position B to the vehicle position C, the time for traveling from the vehicle position C to the vehicle position D, and the time for traveling from the vehicle position D to the vehicle position E are two seconds each. These times are obtained on the basis of the distance between the vehicle positions and on the basis of the predicted traveling speed.

In a case where the timing of the vehicle passing through the vehicle position A is set as a reference, the stay time in the user visual field of the information superimposition possible frame F_03 is obtained as time from the reference timing to the timing of traveling at a position in front of the vehicle position C. Although the information superimposition possible frame F_03 is not included in the visual field of the user at the vehicle position C indicated by the sector #3, the information superimposition possible frame F_03 is continuously included in the visual field of the user up to the position in front of the vehicle position C. In this example, the stay time in the user visual field of the information superimposition possible frame F_03 is 3.5 seconds.

Similarly, the stay time in the user visual field of the information superimposition possible frame F_04 is obtained as time from the reference timing to the timing of traveling at a position in front of the vehicle position D. Although the information superimposition possible frame F_04 is hardly included in the visual field of the user at the vehicle position D, the information superimposition possible frame F_04 is continuously included in the visual field of the user up to the position in front of the vehicle position D. In the example, the stay time in the user visual field of the information superimposition possible frame F_04 is 5.5 seconds.

For example, in a case where the reference value of the minimum stay time in the user visual field is 3.0 seconds, the stay time of both of the information superimposition possible frame F_03 and the information superimposition possible frame F_04 exceeds the reference value. The information superimposition possible frame F_03 and the information superimposition possible frame F_04 satisfy the condition 4, and it is determined that the frames are appropriate for the frames to be provided with the content.

The reference value of the stay time may be set according to the traveling speed. The reference value of 3.0 seconds described above is set in a case where, for example, the traveling speed is 5 m/sec (18 km/h).

The fact that the stay time is equal to or greater than the reference value indicates that the information superimposition possible frame continues to be in the visual field of the traveling user for a certain time.

In this way, whether or not the frame is appropriate for the frame to be provided with the content can be determined on the basis of the condition 4 to select a frame that can be continuously viewed for a certain time when the content is superimposed.

Whether or not the information superimposition possible frame is suitable for the superimposition of the content is determined on the basis of the conditions 1 to 4. Another condition, such as whether or not the area of the information superimposition possible frame is equal to or greater than a reference value, may be used to determine whether or not the information superimposition possible frame is suitable for the superimposition of the content.

With reference again to FIG. 10, the appropriate visual field setting unit 215 selects the information superimposition possible frames satisfying all of the conditions 1 to 4 as information superimposition appropriate frames. The information superimposition possible frames satisfying at least any one of the conditions, instead of all of the conditions 1 to 4, may be selected as information superimposition appropriate frames.

The appropriate visual field setting unit 215 sets an information superimposition appropriate visual field on the basis of the information superimposition appropriate frames. The information superimposition appropriate visual field is a region of the visual field of the user suitable for the superimposition of the content. For example, a region inside a rectangle including all of the information superimposition appropriate frames in the visual field of the user is set as the information superimposition appropriate visual field.

Figure 27:
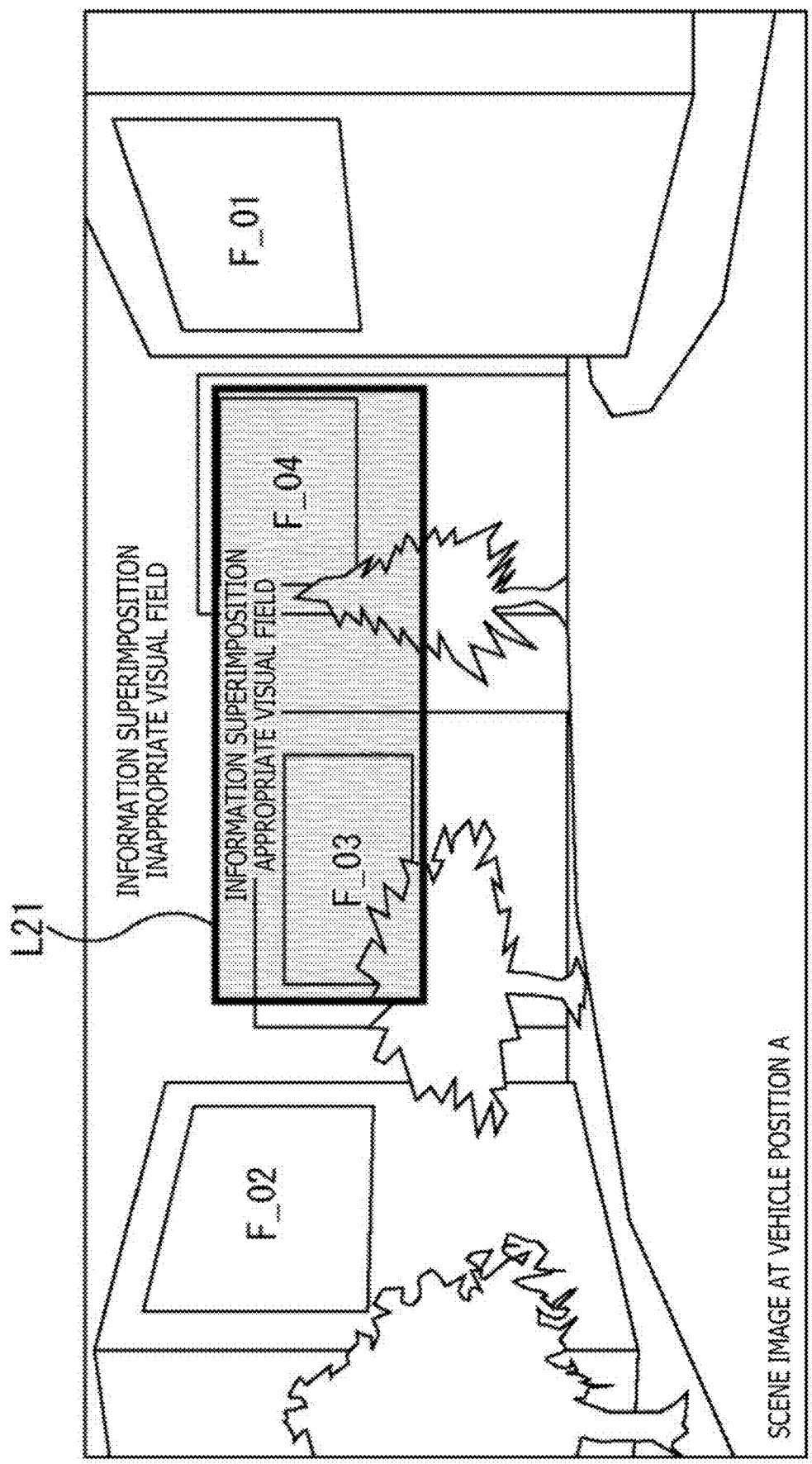
FIG. 27 is a diagram illustrating an example of setting an information superimposition appropriate visual field.

FIG. 27 is a diagram illustrating an example of setting the information superimposition appropriate visual field.

As encircled by a thick line L21, a region inside a minimum rectangle surrounding the information superimposition possible frame F_03 and the information superimposition possible frame F_04 selected as the information superimposition appropriate frames is set as the information superimposition appropriate visual field. The information superimposition possible frame F_03 and the information superimposition possible frame F_04 included in the information superimposition appropriate visual field are used as the superimposition locations of the content.

Note that, in the example of FIG. 27, the information superimposition possible frames included in the information superimposition appropriate visual field are the information superimposition possible frame F_03 and the information superimposition possible frame F_04 both determined to be the information superimposition appropriate frames. The information superimposition possible frames not determined to be the information superimposition appropriate frames in the determination on the basis of the conditions 1 to 4 may also be used as the superimposition locations of the content in a case where the frames are included in the information superimposition appropriate visual field.

In addition, the appropriate visual field setting unit 215 sets a region outside the information superimposition appropriate visual field as an information superimposition inappropriate visual field as illustrated in FIG. 27. The information superimposition inappropriate visual field is not used for the superimposition of the content and is used for display of various messages, display of information representing the traveling state such as the traveling speed, and the like. The display of the velocity on the upper left illustrated in FIG. 2 and the like is display using the information superimposition inappropriate visual field.

The appropriate visual field setting unit 215 outputs information of all of the information superimposition appropriate frames included in the information superimposition appropriate visual field to the superimposition target frame selection unit 202.

<1-2-4. Process of Second Stage (Selection of Information Superimposition Appropriate Frame as Superimposition Location)>

Next, selection of the superimposition location executed by the superimposition target frame selection unit 202 in the process of the second stage will be described.

Figure 28:
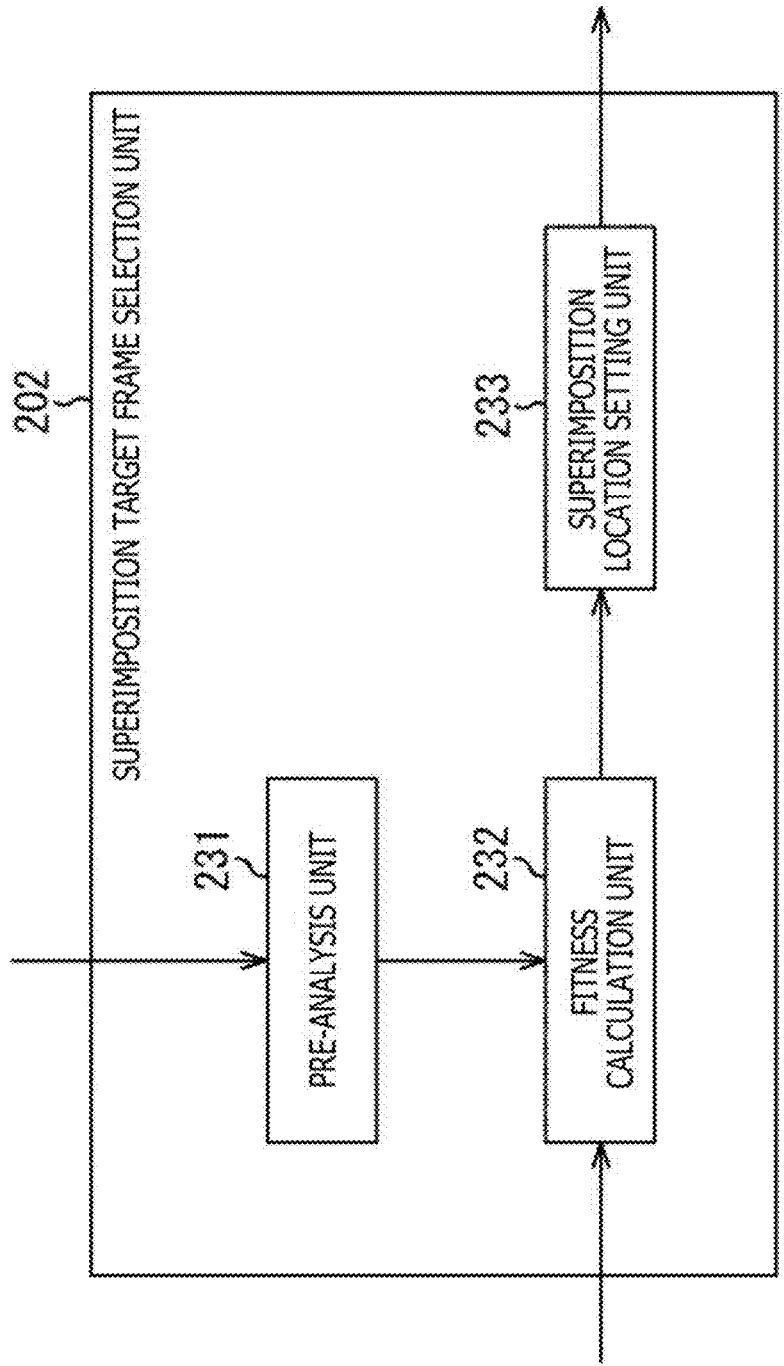
FIG. 28 is a block diagram illustrating a configuration example of a superimposition target frame selection unit of FIG. 9.

FIG. 28 is a block diagram illustrating a configuration example of the superimposition target frame selection unit 202 of FIG. 9.

The superimposition target frame selection unit 202 includes a pre-analysis unit 231, a fitness calculation unit 232, and a superimposition location setting unit 233. The content acquired by the content acquisition unit 204 is input, to the pre-analysis unit 231, as content to be displayed. In addition, the information of the information superimposition appropriate frames output from the information superimposition appropriate visual field setting unit 201 is input to the fitness calculation unit 232.

The pre-analysis unit 231 performs pre-analysis of content information items for all of the content to be displayed and sets display position determination factors (Positioning Factors).

The content information items are metadata representing features of the content, and different items are provided for each type of content. Meanwhile, the display position determination factors are information regarding specifications required for the display of the content and are used for selecting the information superimposition appropriate frame as the superimposition location.

The pre-analysis unit 231 classifies each content into any one of content types including "moving image," "still image," and "character (text)." The classification of the content type is performed on the basis of, for example, an extension of the file of the content.

FIG. 29 depicts diagrams each illustrating an example of the content information items. Overlapping description will be appropriately omitted.

A of FIG. 29 illustrates content information items of text content with a file name "File_01."

As illustrated in A of FIG. 29, the pre-analysis unit 231 sets items "Type," "Number of Letters," "Time for Reading," "Proportion," and "Time for Viewing" as the content information items of the text content.

"Type" represents the content type.

"Number of Letters" represents the number of letters included in the content.

"Time for Reading" represents the reading time. The reading time is set according to, for example, the number of letters.

"Proportion" represents the aspect ratio of the region required for displaying the content.

"Time for Viewing" represents the required time for viewing. In the case of the text content, the required time for viewing is set to the same time as the reading time.

In the example of A in FIG. 29, "Number of Letters" is set to 42. In addition, "Time for Reading" is set to 10 seconds. "Proportion" is set to 4:3. "Time for Viewing" is set to 10 seconds which is the same as "Time for Reading."

In this case, the pre-analysis unit 231 sets "Proportion" of 4:3 and "Time for Viewing" of 10 seconds as the display position determination factors of the text content of "File_01."

B of FIG. 29 illustrates content information items of moving image content with a file name "File_02."

As illustrated in B of FIG. 29, the pre-analysis unit 231 sets items "Type," "Playback Duration," "Proportion," and "Time for Viewing" as the content information items of the moving image content.

"Playback Duration" represents the reproduction time.

"Proportion" represents the aspect ratio of each frame included in the moving image content.

"Time for Viewing" represents the required time for viewing. In the case of the moving image content, the required time for viewing is set to the same time as the reproduction time.

In the example of B in FIG. 29, "Playback Duration" is set to 20 seconds. In addition, "Proportion" is set to 16:9. "Time for Viewing" is set to 20 seconds which is the same as "Playback Duration."

In this case, the pre-analysis unit 231 sets "Proportion" of 16:9 and "Time for Viewing" of 20 seconds as the display position determination factors of the moving image content of "File_02."

C of FIG. 29 illustrates content information items of still image content with a file name "File_03," and D of FIG. 29 illustrates content information items of still image content with a file name "File_04."

As illustrated in C and D of FIG. 29, the pre-analysis unit 231 sets items "Type," "Text," "Number of Letters," "Time for Reading," "Proportion," and "Time for Viewing" as the content information items of the still image content.

"Text" indicates whether or not text elements are included in the image. For the content of "still image," the pre-analysis unit 231 analyzes the image to identify whether the image is a "still image" with text elements or a "still image" without text elements. The other content information items of the still image content with text elements are the same as the content information items of the text content.

In the example of C in FIG. 29, "Text" is set as an image with text elements (Included). The still image content of "File_03" is still image content with text elements. In addition, "Number of Letters" is set to 28. "Time for Reading" is set to 7 seconds. "Proportion" is set to 3:4. "Time for Viewing" is set to 7 seconds which is the same as "Time for Reading."

In this case, the pre-analysis unit 231 sets "Proportion" of 3:4 and "Time for Viewing" of 7 seconds as the display position determination factors of the still image content of "File_03."

Meanwhile, "Text" is set as an image with text elements in the example of D in FIG. 29. The still image content of "File_04" is also still image content with text elements. In addition, "Number of Letters" is set to 18. "Time for Reading" is set to 5 seconds. "Proportion" is set to 1:1. "Time for Viewing" is set to 5 seconds which is the same as "Time for Reading."

In this case, the pre-analysis unit 231 sets "Proportion" of 1:1 and "Time for Viewing" of 5 seconds as the display position determination factors of the still image content of "File_04."

The pre-analysis unit 231 outputs the information of the display position determination factors of each content set in this way to the fitness calculation unit 232.

The fitness calculation unit 232 calculates the fitness of each combination of the content after the pre-analysis by the pre-analysis unit 231 and the information superimposition appropriate frame included in the information superimposition appropriate visual field. That is, the fitness of each of all of the contents and each of the information superimposition appropriate frames included in the information superimposition appropriate visual field is calculated.

For example, the fitness calculation unit 232 specifies the aspect ratio and the stay time in the user visual field of each information superimposition appropriate frame on the basis of, for example, the information supplied from the information superimposition appropriate visual field setting unit 201.

The fitness calculation unit 232 compares the specified aspect ratio and stay time in the user visual field with the display position determination factors of the content to calculate the fitness of the content and the information superimposition appropriate frame. As described above, the aspect ratio ("Proportion") and the required time for viewing ("Time for Viewing") are set as the display position determination factors.

FIG. 30 depicts diagrams each illustrating an example of the fitness.

Here, it is assumed that four information superimposition appropriate frames including information superimposition appropriate frames F_11 to F_14 are included in the information superimposition appropriate visual field. Frame_11 to Frame_14 illustrated in FIG. 30 represent the information superimposition appropriate frames F_11 to F_14, respectively. It is assumed that the aspect ratios of the information superimposition appropriate frames F_11 to F_14 are 1:0.9, 3:4.2, 4:3.2, and 16:8, respectively, and the stay time in the user visual field is 4 seconds, 7 seconds, 14 seconds, and 17 seconds each.

A of FIG. 30 illustrates the fitness of the text content of "File_01" and each of the information superimposition appropriate frames F_11 to F_14. The display position determination factors of the text content of "File_01" are the aspect ratio of 4:3 and the required time for viewing of 10 seconds as described above.

As illustrated in A of FIG. 30, the pre-analysis unit 231 determines that the fitness of the aspect ratio is 20 on the basis of the aspect ratio of 4:3 for the text content and the aspect ratio of 1:0.9 for the information superimposition appropriate frame F_11. For example, the closer the ratios, the higher the obtained fitness.

In addition, the pre-analysis unit 231 determines that the fitness of the required time for viewing is 10 on the basis of the required time for viewing of 10 seconds for the text content and the stay time in the user visual field of 4 seconds for the information superimposition appropriate frame F_11. For example, the closer the required time and the stay time, the higher the obtained fitness.

The pre-analysis unit 231 adds the fitness of the aspect ratio and the fitness of the required time for viewing to determine that the overall fitness of the text content of "File_01" and the information superimposition appropriate frame F_11 is 30.

Although the fitness of the aspect ratio and the fitness of the required time for viewing are added to obtain the overall fitness in this example, the method of obtaining the overall fitness is arbitrary, such as conducting the addition after weighting the fitness of one of them.

The pre-analysis unit 231 similarly calculates the fitness of each of the information superimposition appropriate frames F_12 to F_14 and the text content of "File_01."

In the example of A in FIG. 30, the overall fitness of the text content of "File_01" and the information superimposition appropriate frame F_12 is 30, and the overall fitness of the text content of "File_01" and the information superimposition appropriate frame F_13 is 90. In addition, the overall fitness of the text content of "File_01" and the information superimposition appropriate frame F_14 is 70.

The pre-analysis unit 231 similarly calculates the fitness of each of the moving image content of "File_02," the still image content of "File_03," and the still image content of "File_04" and each of the information superimposition appropriate frames F_11 to F_14.

B of FIG. 30 illustrates the fitness of the moving image content of "File_02" and each of the information superimposition appropriate frames F_11 to F_14. The display position determination factors of the moving image content of "File_02" are the aspect ratio of 16:9 and the required time for viewing of 20 seconds as described above.

In the example of B in FIG. 30, the overall fitness of the moving image content of "File_02" and the information superimposition appropriate frame F_11 is 0, and the overall fitness of the moving image content of "File_02" and the information superimposition appropriate frame F_12 is 0. In addition, the overall fitness of the moving image content of "File_02" and the information superimposition appropriate frame F_13 is 50, and the overall fitness of the moving image content of "File_02" and the information superimposition appropriate frame F_14 is 80.

C of FIG. 30 illustrates the fitness of the still image content of "File_03" and each of the information superimposition appropriate frames F_11 to F_14. The display position determination factors of the still image content of "File_03" are the aspect ratio of 3:4 and the required time for viewing of 7 seconds as described above.

In the example of C in FIG. 30, the overall fitness of the still image content of "File_03" and the information superimposition appropriate frame F_11 is 30, and the overall fitness of the still image content of "File_03" and the information superimposition appropriate frame F_12 is 90. In addition, the overall fitness of the still image content of "File_03" and the information superimposition appropriate frame F_13 is 60, and the overall fitness of the still image content of "File_03" and the information superimposition appropriate frame F_14 is 50.

D of FIG. 30 illustrates the fitness of the still image content of "File_04" and each of the information superimposition appropriate frames F_11 to F_14. The display position determination factors of the still image content of "File_04" are the aspect ratio of 1:1 and the required time for viewing of 5 seconds as described above.

In the example of D in FIG. 30, the overall fitness of the still image content of "File_04" and the information superimposition appropriate frame F_11 is 70, and the overall fitness of the still image content of "File_04" and the information superimposition appropriate frame F_12 is 70. In addition, the overall fitness of the still image content of "File_04" and the information superimposition appropriate frame F_13 is 70, and the overall fitness of the still image content of "File_04" and the information superimposition appropriate frame F_14 is 60.

The fitness calculation unit 232 outputs the information of the fitness calculated in this way to the superimposition location setting unit 233.

The superimposition location setting unit 233 sets the information superimposition appropriate frame as the superimposition location of each content according to the fitness calculated by the fitness calculation unit 232. For example, the superimposition location setting unit 233 sequentially allocates the information superimposition appropriate frames with high fitness to set the information superimposition appropriate frames as the superimposition locations.

Figure 31:
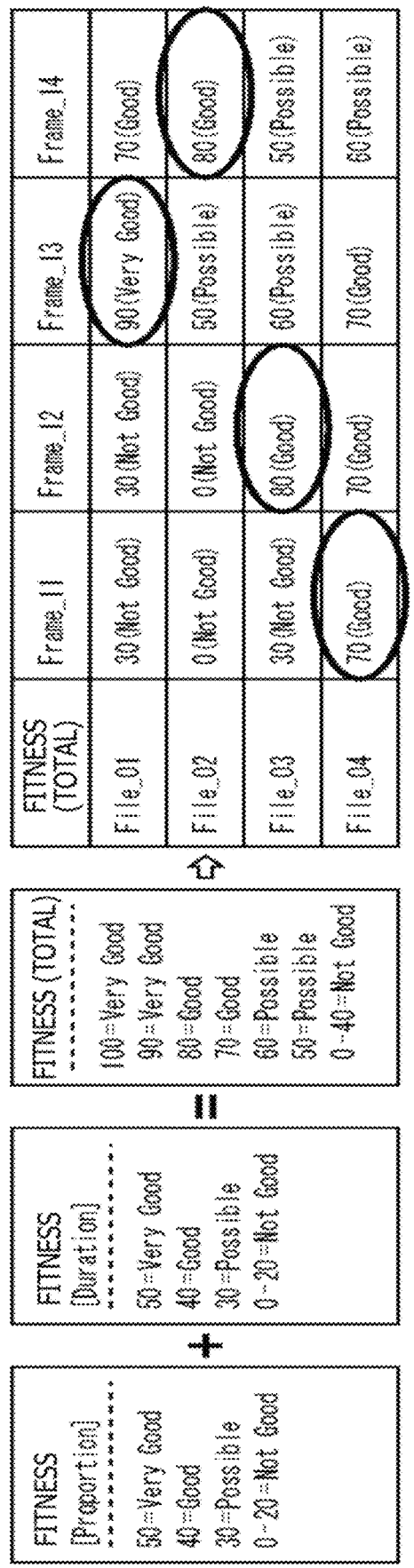
FIG. 31 is a diagram illustrating an example of setting superimposition locations.

FIG. 31 is a diagram illustrating an example of setting the superimposition locations.

The left side of FIG. 31 illustrates an example of calculating the fitness. Each fitness is appropriately ranked in a range from "Not Good" to "Very Good."

A table illustrated beyond an outline arrow is a table illustrating the overall fitness of each of the text content of "File_01," the moving image content of "File_02," the still image content of "File_03," and the still image content of "File_04" and each of the information superimposition appropriate frames F_11 to F_14.

As encircled and indicated by an ellipse, the superimposition location setting unit 233 sets the information superimposition appropriate frame F_13 with the highest fitness among the information superimposition appropriate frames F_11 to F_14 as the superimposition location of the text content of "File_01."

In addition, the superimposition location setting unit 233 sets the information superimposition appropriate frame F_14 with the highest fitness among the information superimposition appropriate frames F_11 to F_14 as the superimposition location of the moving image content of "File_02."

The superimposition location setting unit 233 sets the information superimposition appropriate frame F_12 with the highest fitness among the information superimposition appropriate frames F_11 to F_14 as the superimposition location of the still image content of "File_03."

The superimposition location setting unit 233 sets the information superimposition appropriate frame F_11 with the highest fitness among the information superimposition appropriate frames F_11 to F_14 as the superimposition location of the still image content of "File_04."

Note that, although the fitness of the still image content of "File_04" and each of the information superimposition appropriate frames F_11, F_12, and F_13 is 70, the information superimposition appropriate frame F_11 not set as the superimposition location of any content is set here. The information superimposition appropriate frame F_12 is already set as the superimposition location of the still image content of "File_03" on the basis of the fitness higher than 70, and the information superimposition appropriate frame F_13 is already set as the superimposition location of the text content of "File_01" on the basis of the fitness higher than 70.

Figure 32:
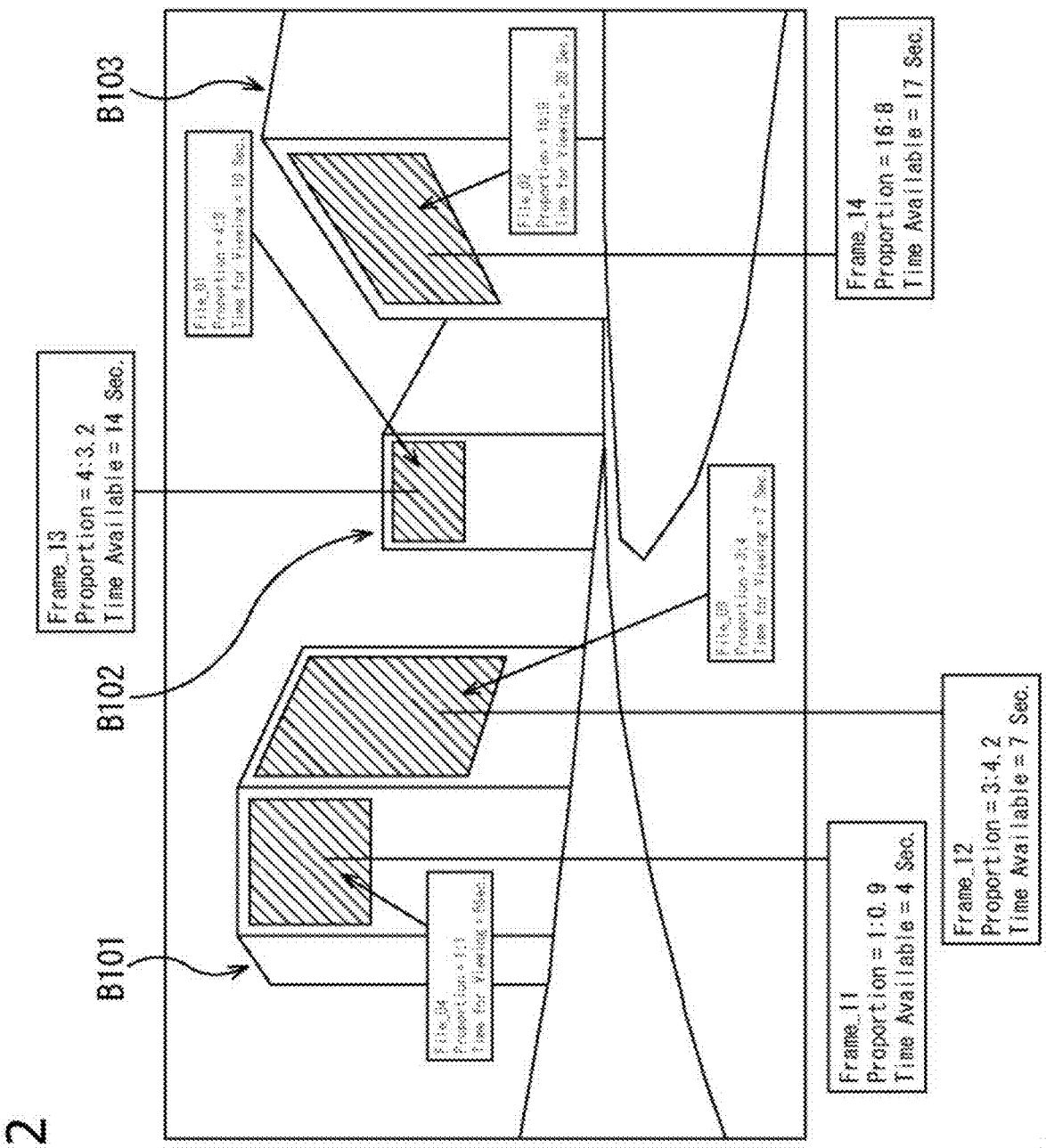
FIG. 32 is a diagram illustrating an example of the superimposition locations.

FIG. 32 is a diagram illustrating an example of the superimposition locations set in this way.

Buildings B101 to B103 are in a scene image illustrated in FIG. 32. In the example of FIG. 32, the information superimposition appropriate frame F_11 and the information superimposition appropriate frame F_12 described above are the information superimposition appropriate frames set for the building B101 on the left side. The information superimposition appropriate frame F_13 is the information superimposition appropriate frame set for the building B102 at the center. The information superimposition appropriate frame F_14 is the information superimposition appropriate frame set for the building B103 on the right side.

In the case where the information superimposition appropriate frame as the superimposition location is set in this way, the still image content of "File_04," in which the calculated fitness with the information superimposition appropriate frame F_11 is 70, is superimposed on the information superimposition appropriate frame F_11. Furthermore, the still image content of "File_03," in which the calculated fitness with the information superimposition appropriate frame F_12 is 80, is superimposed on the information superimposition appropriate frame F_12.

The text content of "File_01," in which the calculated fitness with the information superimposition appropriate frame F_13 is 90, is superimposed on the information superimposition appropriate frame F_13. The moving image content of "File_02," in which the calculated fitness with the information superimposition appropriate frame F_14 is 80, is superimposed on the information superimposition appropriate frame F_14.

The superimposition location setting unit 233 outputs the information of the superimposition location of each content set in this way, that is, information indicating which information superimposition appropriate frame is to be provided with each content, to the display control unit 203.

Although the fitness of the content and the information superimposition appropriate frame is calculated on the basis of the aspect ratio and the time of the content and the information superimposition appropriate frame in the description above, the fitness may be calculated on the basis of other elements. For example, the fitness may be calculated on the basis of only the aspect ratio or may be calculated on the basis of only the time (required time for viewing and stay time in the visual field).

That is, the fitness of the content and the information superimposition appropriate frame can be calculated on the basis of at least any one of the display position determination factors.

Furthermore, the moving image content may be superimposed on the information superimposition appropriate frame at a dark place, and the text content may be superimposed on the information superimposition appropriate frame at a bright place. In this way, the fitness may be calculated on the basis of other elements. In this case, the fitness is calculated on the basis of the luminance of the information superimposition appropriate frame and the type of content.

The fitness may be calculated so as to superimpose the moving image content on the information superimposition appropriate frame at a long distance and superimpose the text content on the information superimposition appropriate frame at a short distance. In this case, the fitness is calculated on the basis of the distance to the information superimposition appropriate frame and the type of content.

In this way, various methods can be adopted for the method of calculating the fitness of each content and the information superimposition appropriate frame.

Although the analysis of the content information items and the display position determination factors is performed by the vehicle control system 100, the server side that manages the content may perform the analysis. The server provides the vehicle control system 100 with the information regarding the content information items and the display position determination factors in association with the content.

<1-2-5. Process of Third State (Execution of Display)>

Next, a display process executed by the display control unit 203 in the process of the third stage will be described.

Figure 33:
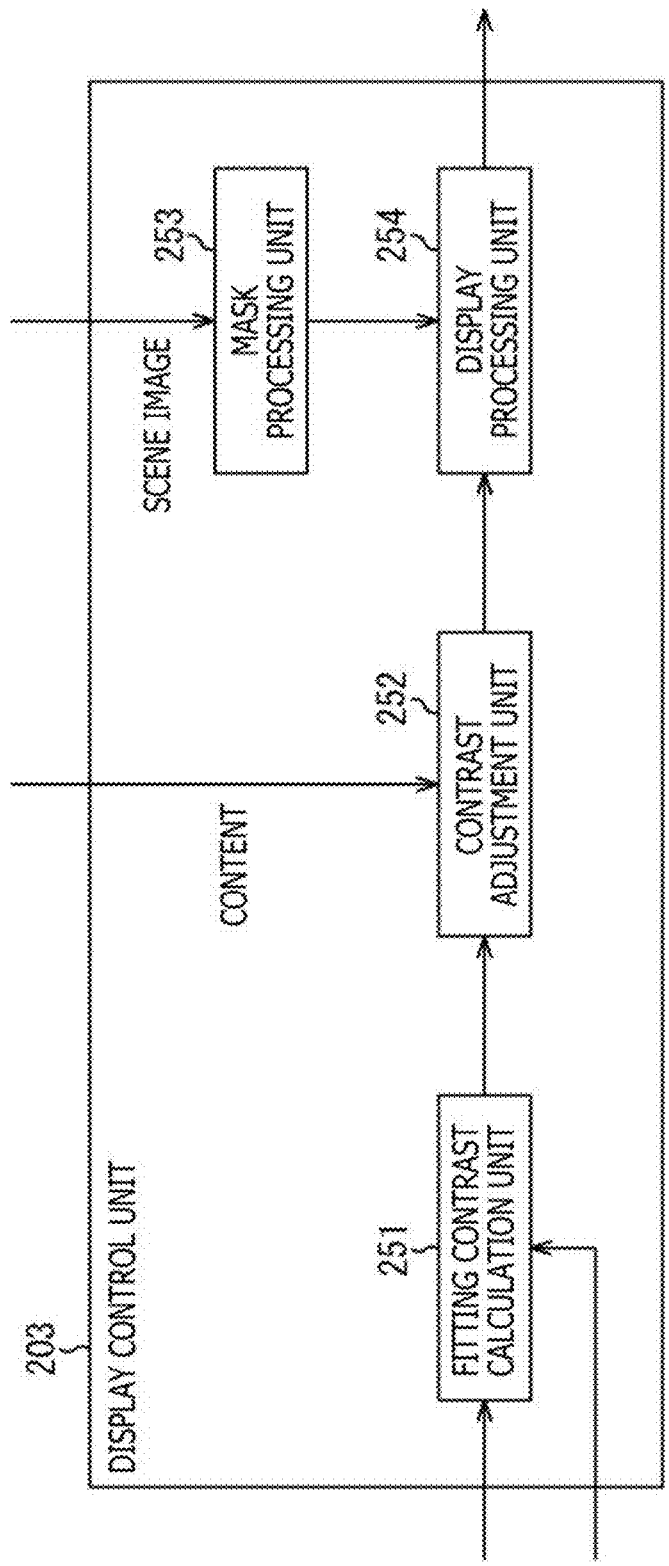
FIG. 33 is a block diagram illustrating a configuration example of a display control unit of FIG. 9.

FIG. 33 is a block diagram illustrating a configuration example of the display control unit 203 of FIG. 9.

The display control unit 203 includes a fitting contrast calculation unit 251, a contrast adjustment unit 252, a mask processing unit 253, and a display processing unit 254.

The analysis results of the scene image output from the information superimposition appropriate visual field setting unit 201 and the information regarding the information superimposition appropriate frame as the superimposition location of each content output from the superimposition target frame selection unit 202 are input to the fitting contrast calculation unit 251. The content output from the content acquisition unit 204 is input to the contrast adjustment unit 252, and the scene image is input to the mask processing unit 253.

The fitting contrast calculation unit 251 calculates fitting contrast of each information superimposition appropriate frame on the basis of the context at the location of the information superimposition appropriate frame that is set as the superimposition location of the content. The fitting contrast is used to adjust the contrast of the content such that the appearance of the content becomes the same as the actual appearance at the location of the information superimposition appropriate frame.

The fitting contrast calculation unit 251 calculates the fitting contrast on the basis of, for example at least any one of the state of the sunlight, the state of the lighting, the state of the atmosphere, and the distance from the vehicle position. Although at least any one of the state of the sunlight, the state of the lighting, the state of the atmosphere, and the distance from the vehicle position is used as the context in this example, other states, such as weather and temperature, may be used as the context.

For example, the state of the sunlight, the state of the lighting, the state of the atmosphere, and the distance from the vehicle position are included in the analysis results of the scene image. The distance from the vehicle position to the location of the information superimposition appropriate frame may be acquired on the basis of detection results of a distance sensor.

The fitting contrast calculation unit 251 outputs the information regarding the fitting contrast of each information superimposition appropriate frame to the contrast adjustment unit 252.

The contrast adjustment unit 252 adjusts the contrast of the content provided with the superimposition location according to the fitting contrast of the information superimposition appropriate frame as the superimposition location. The contrast adjustment unit 252 outputs the content after the adjustment of the contrast to the display processing unit 254.

Figure 34:
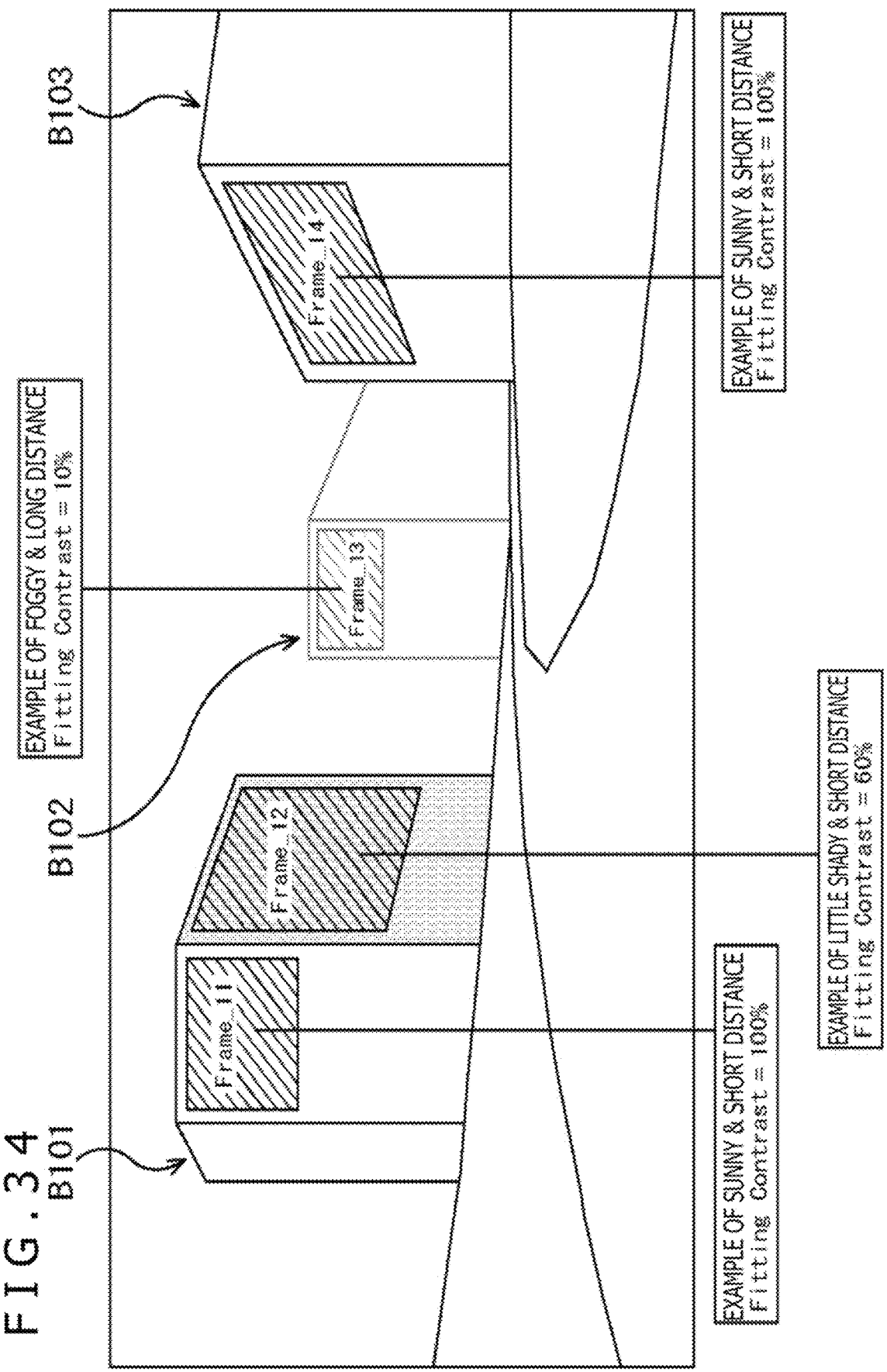
FIG. 34 is a diagram illustrating an example of adjustment of contrast on the basis of fitting contrast.

FIG. 34 is a diagram illustrating an example of the adjustment of the contrast on the basis of the fitting contrast.

The information superimposition appropriate frames F_11 to F_14 illustrated in FIG. 34 are the same as the information superimposition appropriate frames described with reference to FIG. 32.

In the example of FIG. 34, the information superimposition appropriate frame F_11 is set on the wall surface of the building B101 at a short distance. The sunlight shines on the wall surface provided with the information superimposition appropriate frame F_11, and the state of the sunlight of the information superimposition appropriate frame F_11 is a sunny state. The state of the sunlight is specified on the basis of, for example, the luminance of the wall surface provided with the information superimposition appropriate frame F_11.

In this case, as illustrated at the tip of an extension line in FIG. 34, the fitting contrast calculation unit 251 determines that the fitting contrast of the information superimposition appropriate frame F_11 is 100% on the basis of the fact that the information superimposition appropriate frame F_11 is at a short distance and the state of the sunlight is a sunny state.

Since the fitting contrast is 100%, the still image content of "File_04" with the superimposition location at the information superimposition appropriate frame F_11 is superimposed on the information superimposition appropriate frame F_11 at the original contrast without the adjustment of the contrast.

Meanwhile, the state of the sunlight of the information superimposition appropriate frame F_12 set on the wall surface of the building B101 at a short distance is a little shady state.

In this case, the fitting contrast calculation unit 251 determines that the fitting contrast of the information superimposition appropriate frame F_12 is 60% on the basis of the fact that the information superimposition appropriate frame F_12 is at a short distance and the state of the sunlight is a little shady state.

Since the fitting contrast is 60%, the contrast of the still image content of "File_03" with the superimposition location at the information superimposition appropriate frame F_12 is reduced to 60%, and the content is superimposed on the information superimposition appropriate frame F_12 in this state.

In a case where the actual appearance of the wall surface provided with the information superimposition appropriate frame F_11 and the actual appearance of the wall surface provided with the information superimposition appropriate frame F_12 are compared, the wall surface provided with the information superimposition appropriate frame F_12 is shady, so that the wall surface looks darker with lower contrast. The contrast can be reduced according to the actual appearance of the wall surface to display the still image content of "File_03" in a state that the content is fit into the appearance of the wall surface provided with the content.

The information superimposition appropriate frame F_13 is set on the wall surface of the building B102 at a long distance. The state of the atmosphere of the information superimposition appropriate frame F_13 is in a foggy state. The foggy state of the atmosphere is specified on the basis of, for example, the luminance and the contrast of the wall surface provided with the information superimposition appropriate frame F_13.

In this case, the fitting contrast calculation unit 251 determines that the fitting contrast of the information superimposition appropriate frame F_13 is 10% on the basis of the fact that the information superimposition appropriate frame F_13 is at a long distance and the state of the atmosphere is a foggy state.

Since the fitting contrast is 10%, the contrast of the text content of "File_01" with the superimposition location at the information superimposition appropriate frame F_13 is reduced to 10%, and the content is superimposed on the information superimposition appropriate frame F_13 in this state.

In a case where the actual appearance of the wall surface provided with the information superimposition appropriate frame F_11 and the actual appearance of the wall surface provided with the information superimposition appropriate frame F_13 are compared, the contrast of the wall surface provided with the information superimposition appropriate frame F_13 looks lower because the wall surface is at a long distance and looks blurry due to the fog. The contrast can be reduced according to the actual appearance of the wall surface to display the text content of "File_01" in a state that the content is fit into the appearance of the wall surface provided with the content.

The information superimposition appropriate frame F_14 is set on the wall surface of the building B103 at a short distance. The state of the sunlight of the information superimposition appropriate frame F_14 is a sunny state.

In this case, the fitting contrast calculation unit 251 determines that the fitting contrast of the information superimposition appropriate frame F_14 is 100% on the basis of the fact that the information superimposition appropriate frame F_14 is at a short distance and the state of the sunlight is a sunny state as in the case of the information superimposition appropriate frame F_11.

Since the fitting contrast is 100%, the moving image content of "File_02" with the superimposition location at the information superimposition appropriate frame F_14 is superimposed on the information superimposition appropriate frame F_14 at the original contrast without the adjustment of the contrast.

In this way, the contrast of each content is adjusted on the basis of the fitting contrast calculated according to the actual appearance of the location of the information superimposition appropriate frame as the superimposition location. This allows the user to view the content as if the content is displayed on the wall surface of the actual building.

With reference again to FIG. 33, in the case where the front object, such as a tree and a telephone pole, covers the information superimposition appropriate frame, the mask processing unit 253 executes a masking process to cut out the image of the front object from the scene image.

The masking process of the mask processing unit 253 is executed in a case where there is a front object overlapping the information superimposition appropriate frame. The mask processing unit 253 outputs, to the display processing unit 254, a part image that is the image of the front object cut out by executing the masking process.

The display processing unit 254 controls the projection unit 106A to superimpose each content on the information superimposition appropriate frame that is set as the superimposition location of each content.

In addition, the display processing unit 254 displays the part image supplied from the mask processing unit 253 on top of the content. The part image is displayed on top of the position where the front object is actually viewed. The display of the content and the like of the display processing unit 254 is repeated during the traveling of the vehicle.

Figure 35:
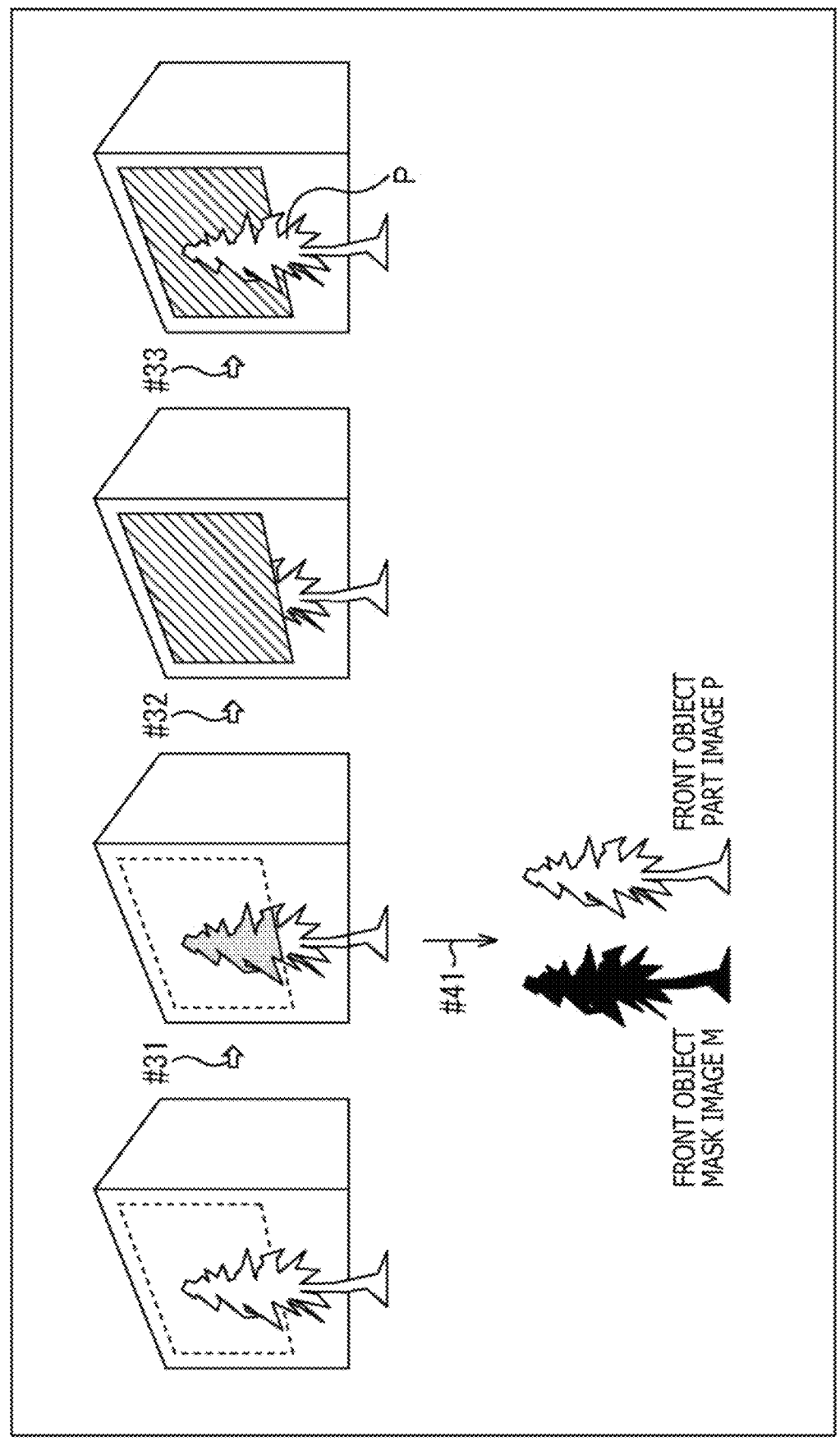
FIG. 35 is a diagram illustrating an example of display of a front object.

FIG. 35 is a diagram illustrating an example of the display of the front object.

As illustrated on the left end of FIG. 35, it is assumed that a tree in front of a building is covering the information superimposition appropriate frame set on the wall surface of the building at a timing of traveling at a certain position. A range indicated by a broken line on the left end of FIG. 35 is a range of the information superimposition appropriate frame. In this case, a colored range illustrated beyond an outline arrow #31 is a range where the front object and the information superimposition appropriate frame overlap.

The mask processing unit 253 detects an external form of the front object and generates a mask image M as illustrated beyond an arrow #41. In addition, the mask processing unit 253 uses the mask image M to apply a masking process to the scene image to cut out a part image P of the front object.

As illustrated beyond an outline arrow #32, the display processing unit 254 superimposes the content on the information superimposition appropriate frame.

As described above, the display of content is performed by displaying the content on the windshield G, and as for the appearance viewed by the user, the user views the content on top of the front object as indicated beyond the outline arrow #32. Diagonal lines provided over the entire information superimposition appropriate frame illustrated beyond the outline arrow #32 indicate that the entire content can be viewed without being covered by the front object.

The display processing unit 254 displays the part image P on top of the position of the front object to realize the display as if the content is displayed on the wall surface of the building behind the front object as illustrated beyond an outline arrow #33.

If the part image P is not displayed on top of the content, the content is viewed in front of the front object as illustrated beyond the outline arrow #32, and the content cannot be viewed as if the content is displayed on the wall surface of the building. The part image P can be displayed on top of the content to realize the appearance as if the content is displayed on the wall surface of the actual building without a sense of discomfort.

<<1-3. Motion of Vehicle Control System>>

Here, the motion of the vehicle control system 100 configured in this way will be described.

<1-3-1. Information Display Process>

First, an information display process as an overall process will be described with reference to a flow chart of FIG. 36.

In step S1, the automatic drive control unit 112 controls the camera included in the data acquisition unit 102 to cause the camera to start imaging the scene in the traveling direction of the vehicle. The scene image obtained by imaging is supplied to the output control unit 105.

In step S2, the automatic drive control unit 112 controls the sensors included in the data acquisition unit 102 to cause various sensors to start the measurement. The prediction or the like of the state of the vehicle is performed on the basis of the measurement results and the like of the sensors. The information regarding the state of the vehicle is supplied as progress state prediction information to the output control unit 105.

In step S3, the information superimposition appropriate visual field setting unit 201 executes the information superimposition appropriate visual field setting process that is the process of the first stage. As a result of the information superimposition appropriate visual field setting process, the information superimposition appropriate frames suitable for the superimposition of the content are selected. Details of the information superimposition appropriate visual field setting process will be described later with reference to flow charts of FIGS. 37 and 38.

In step S4, the superimposition target frame selection unit 202 executes the superimposition target frame selection process that is the process of the second stage. As a result of the superimposition target frame selection process, the information superimposition appropriate frame as the superimposition location is set from among the information superimposition appropriate frames included in the information superimposition appropriate visual field. Details of the superimposition target frame selection process will be described later with reference to a flow chart of FIG. 39.

In step S5, the display control unit 203 executes the display process that is the process of the third stage. As a result of the display process, the content is displayed. Details of the display process will be described later with reference to a flow chart of FIG. 40.

The processes of steps S3 to S5 are repeated during the traveling of the vehicle.

<1-3-2. Information Superimposition Appropriate Visual Field Setting Process>

Figure 37:
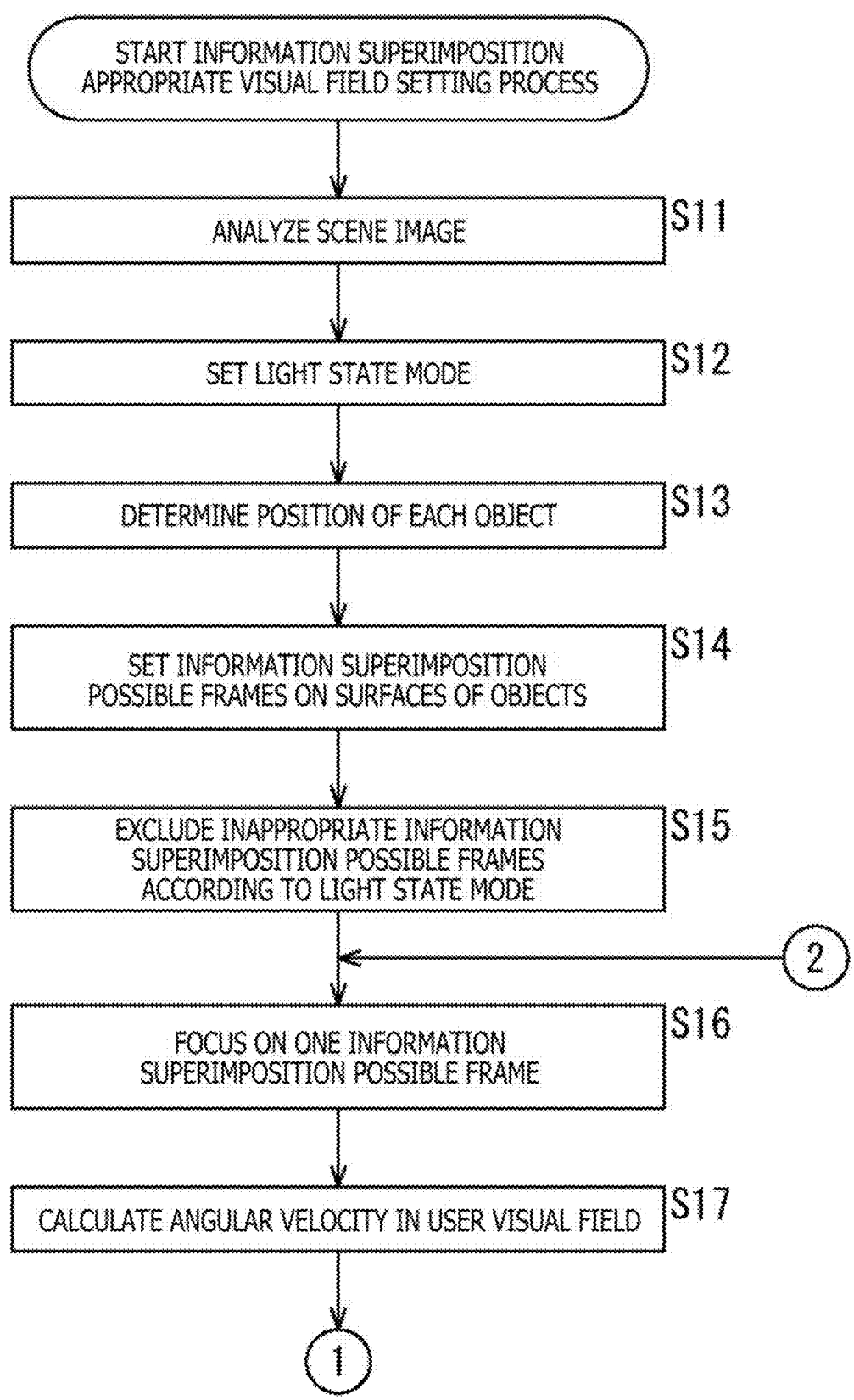
FIG. 37 is a flow chart describing an information superimposition appropriate visual field setting process executed in step S3 of FIG. 36.
Figure 38:
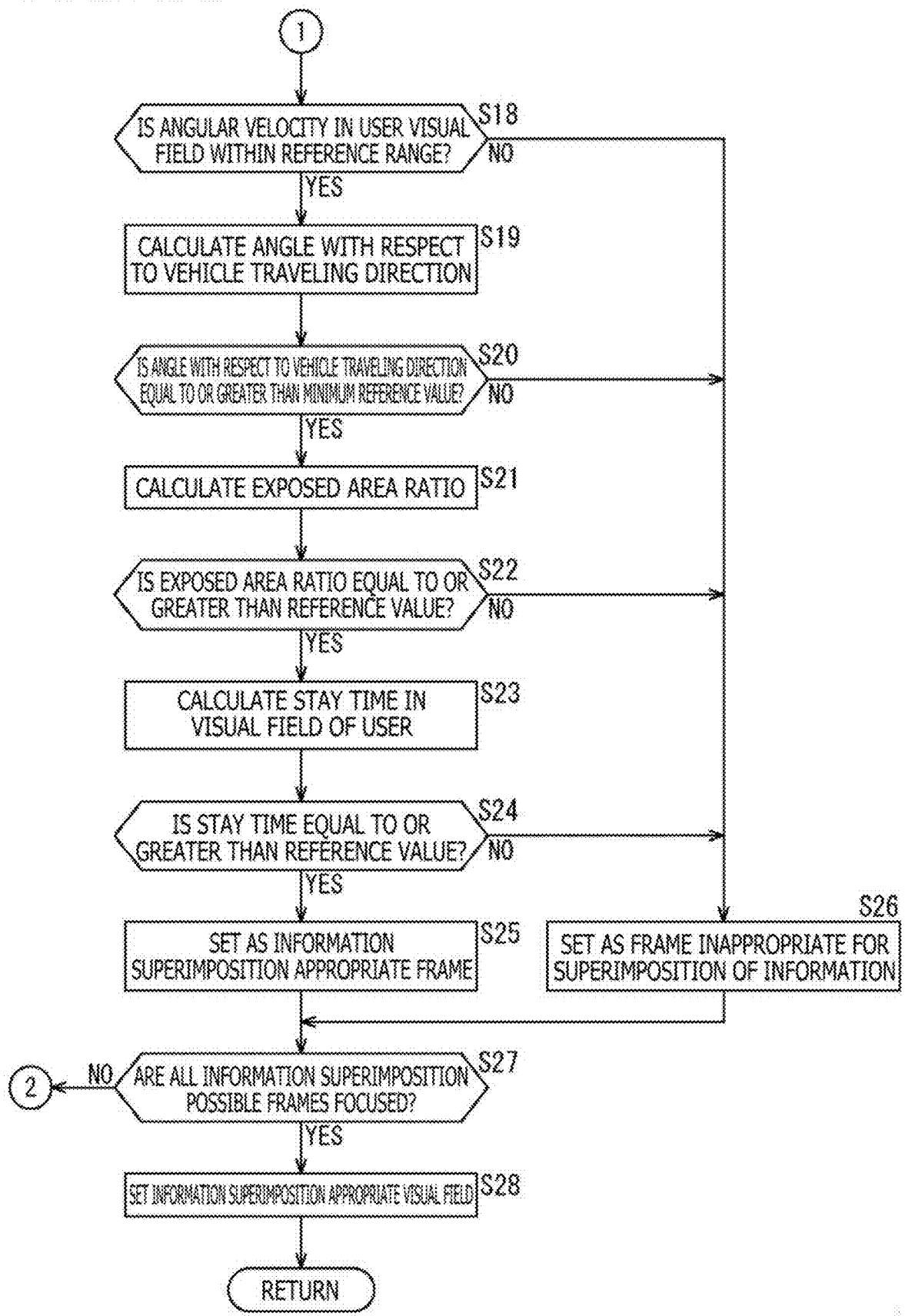
FIG. 38 is a flow chart following FIG. 37, describing the information superimposition appropriate visual field setting process executed in step S3 of FIG. 36.

The information superimposition appropriate visual field setting process executed in step S3 of FIG. 36 will be described with reference to the flow charts of FIGS. 37 and 38.

In step S11, the image analysis unit 211 of the information superimposition appropriate visual field setting unit 201 analyzes the scene image. For example, the outlines of the buildings in the scene image are detected, and the brightness of the surroundings is detected.

In step S12, the light state mode setting unit 212 sets any one of the light state modes including the "daytime mode," the "dusk mode," and the "night mode" on the basis of the brightness of the surroundings.

In step S13, the object detection unit 213 determines the position of each object. That is, the object detection unit 213 plots the buildings, for which the outlines are detected, on the map and determines the positions of the buildings in the scene image. In addition, the object detection unit 213 determines the positions of the objects, such as trees, in addition to the buildings. The object detection unit 213 generates a three-dimensional mode of the objects for which the positions are determined.

In step S14, the frame setting unit 214 sets the information superimposition possible frames on the surfaces of the objects.

In step S15, the frame setting unit 214 excludes the inappropriate information superimposition possible frames according to the light state mode. Here, the information superimposition possible frames that look unnatural in the case where the content is superimposed are excluded in a manner as described above on the basis of the exclusion rules 1 to 4. The information of the information superimposition possible frames that are not excluded is supplied to the appropriate visual field setting unit 215.

In step S16, the appropriate visual field setting unit 215 focuses on one information superimposition possible frame.

In step S17, the appropriate visual field setting unit 215 calculates the angular velocity in the user visual field of the focused information superimposition possible frame.

In step S18, the appropriate visual field setting unit 215 determines whether or not the calculated angular velocity in the user visual field is in the reference range.

In a case where the appropriate visual field setting unit 215 determines that the angular velocity in the user visual field is in the reference range in step S18, the appropriate visual field setting unit 215 calculates the angle of the focused information superimposition possible frame with respect to the vehicle traveling direction in step S19.

In step S20, the appropriate visual field setting unit 215 determines whether or not the calculated angle with respect to the vehicle traveling direction is equal to or greater than the minimum reference value.

In a case where the appropriate visual field setting unit 215 determines that the angle with respect to the vehicle traveling direction is equal to or greater than the minimum reference value in step S20, the appropriate visual field setting unit 215 calculates the exposed area ratio of the focused information superimposition possible frame in step S21.

In step S22, the appropriate visual field setting unit 215 determines whether or not the calculated exposed area ratio is equal to or greater than the reference value.

In a case where the appropriate visual field setting unit 215 determines that the exposed area ratio is equal to or greater than the reference value in step S22, the appropriate visual field setting unit 215 calculates the stay time in the user's visual field of the focused information superimposition possible frame in step S23.

In step S24, the appropriate visual field setting unit 215 determines whether or not the calculated stay time in the user's visual field is equal to or greater than the reference value.

In a case where the appropriate visual field setting unit 215 determines that the stay time is equal to or greater than the reference value in step S24, the appropriate visual field setting unit 215 sets the focused information superimposition possible frame as the information superimposition appropriate frame in step S25.

Conversely, in a case where the appropriate visual field setting unit 215 determines that the angular velocity in the user visual field is not in the reference range in step S18, the appropriate visual field setting unit 215 sets the focused information superimposition possible frame as a frame inappropriate for the superimposition of information in step S26. This is similar in a case where the appropriate visual field setting unit 215 determines that the angle with respect to the vehicle traveling direction is not equal to or greater than the minimum reference value in step S20, in a case where the appropriate visual field setting unit 215 determines that the exposed area ratio is not equal to or greater than the reference value in step S22, or in a case where the appropriate visual field setting unit 215 determines that the stay time in the user's visual field is not equal to or greater than the reference value in step S24.

After the process of step S25 or step S26, the appropriate visual field setting unit 215 determines whether or not all of the information superimposition possible frames are focused in step S27.

In a case where the appropriate visual field setting unit 215 determines that there are information superimposition possible frames not focused yet in step S27, the appropriate visual field setting unit 215 returns to step S16 and focuses on another information superimposition possible frame to repeat the process. In a case where the appropriate visual field setting unit 215 determines that all of the information superimposition possible frames are focused in step S27, the process proceeds to step S28.

In step S28, the appropriate visual field setting unit 215 sets, as the information superimposition appropriate visual field, the region inside the rectangle including all of the information superimposition appropriate frames. The process then returns to step S3 of FIG. 36, and the subsequent process is executed.

<1-3-3. Superimposition Target Frame Selection Process>

Figure 39:
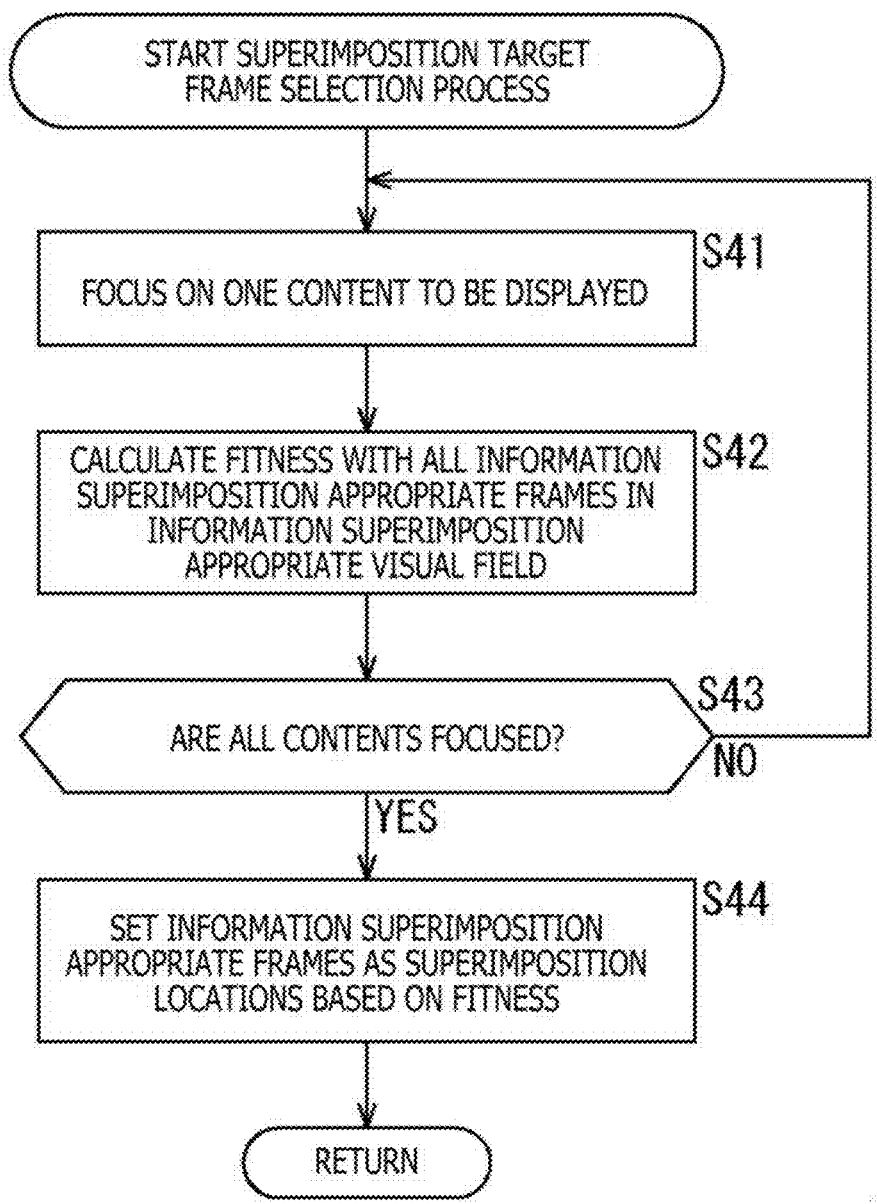
FIG. 39 is a flow chart describing a superimposition target frame selection process executed in step S4 of FIG. 36.

The superimposition target frame selection process executed in step S4 of FIG. 36 will be described with reference to the flow chart of FIG. 39.

Figure 36:
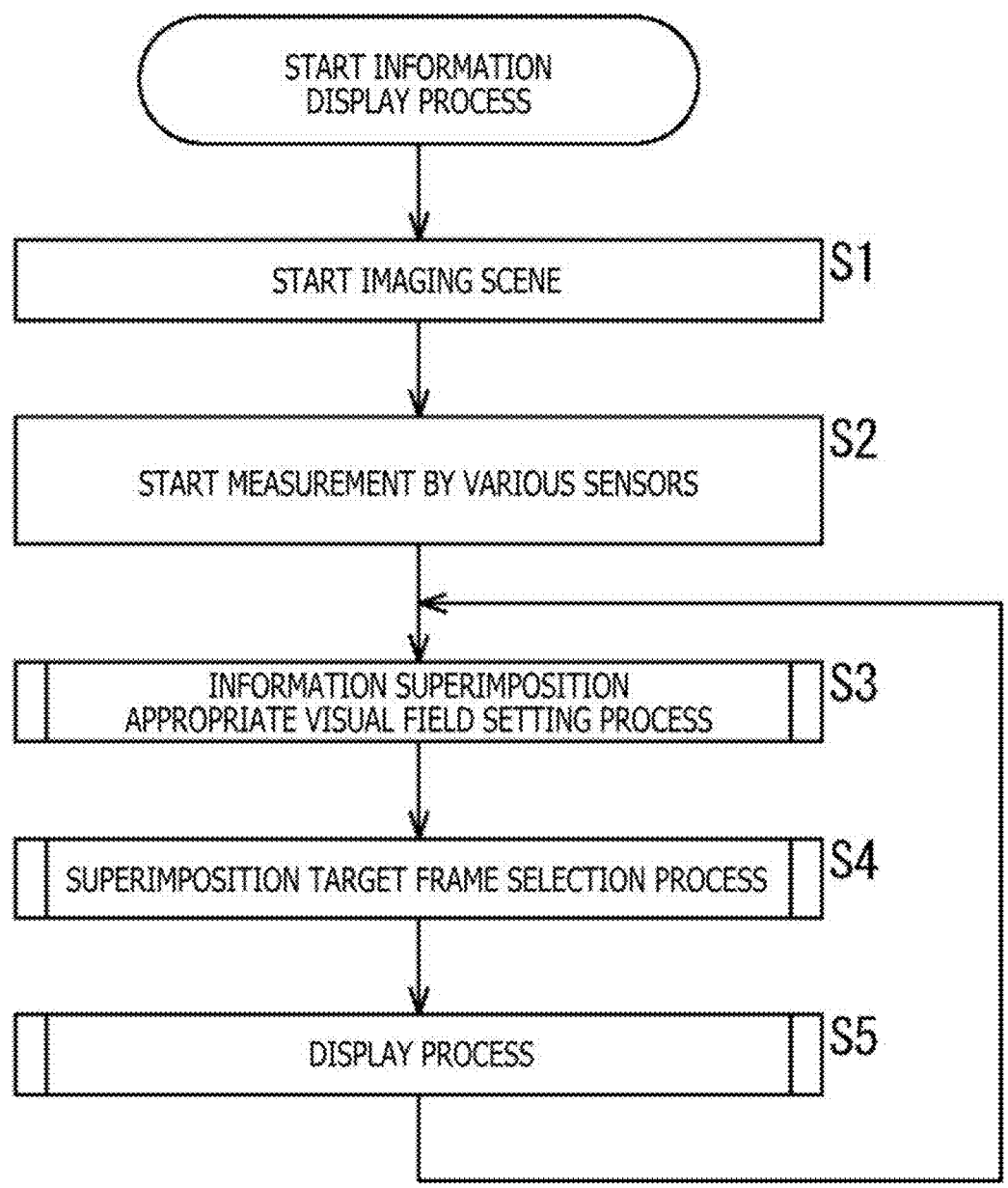
FIG. 36 is a flow chart describing an information display process.

Note that the pre-analysis of the content is performed by the pre-analysis unit 231 in parallel with the process of FIG. 36. The display position determination factors obtained in the pre-analysis process are supplied from the pre-analysis unit 231 to the fitness calculation unit 232.

In step S41, the fitness calculation unit 232 of the superimposition target frame selection unit 202 focuses on one content to be displayed.

In step S42, the fitness calculation unit 232 calculates the fitness of the focused content and each of all of the information superimposition appropriate frames in the information superimposition appropriate visual field. The fitness is calculated with reference to, for example, the aspect ratio, the required time for viewing, and the like included in the display position determination factors as described above.

In step S43, the fitness calculation unit 232 determines whether or not all of the contents are focused.

In a case where the fitness calculation unit 232 determines that there are contents not focused yet in step S43, the fitness calculation unit 232 returns to step S41 and focuses on another content to repeat the process. As a result, the fitness of each content and each of all of the information superimposition appropriate frames is calculated.

In a case where the fitness calculation unit 232 determines that all of the contents are focused in step S43, the superimposition location setting unit 233 sets the information superimposition appropriate frame as the superimposition location of each content on the basis of the fitness in step S44. The process then returns to step S4 of FIG. 36, and the subsequent process is executed.

<1-3-4. Display Process>

Figure 40:
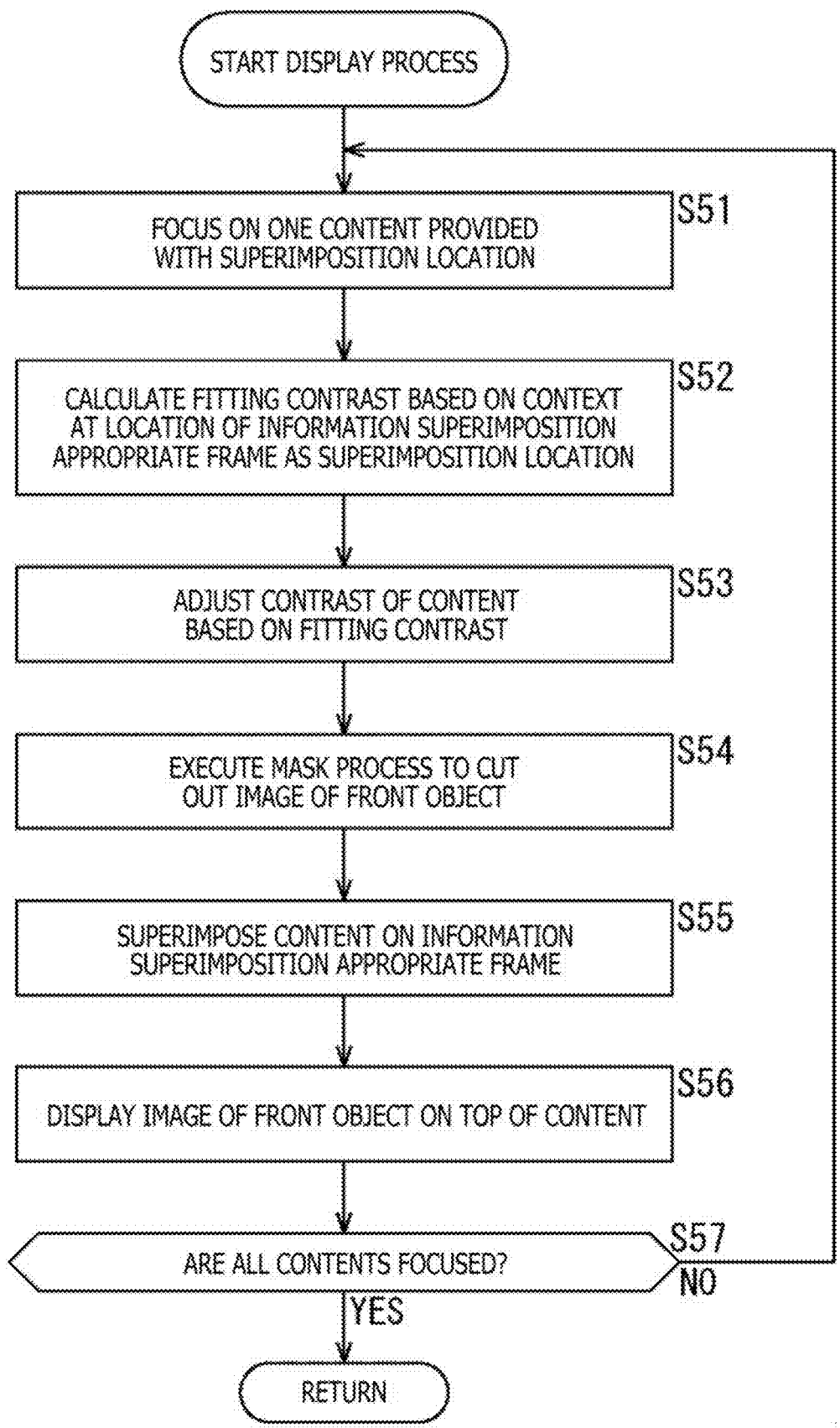
FIG. 40 is a flow chart describing a display process executed in step S5 of FIG. 36.

The display process executed in step S5 of FIG. 36 will be described with reference to the flow chart of FIG. 40.

In step S51, the fitting contrast calculation unit 251 of the display control unit 203 focuses on one content provided with the superimposition location.

In step S52, the fitting contrast calculation unit 251 calculates the fitting contrast on the basis of the context at the location of the information superimposition appropriate frame as the superimposition location.

In step S53, the contrast adjustment unit 252 adjusts the contrast of the focused content on the basis of the fitting contrast.

In step S54, the mask processing unit 253 executes the masking process to cut out the image of the front object in a case where there is an object in front of the information superimposition appropriate frame as the superimposition location of the focused content.

In step S55, the display processing unit 254 superimposes the content on the information superimposition appropriate frame.

In step S56, the display processing unit 254 appropriately displays the image of the front object on top of the content.

In step S57, the display control unit 203 determines whether or not all of the contents are focused.

In a case where the display control unit 203 determines that there are contents not focused yet in step S57, the display control unit 203 returns to step S51 and focuses on another content to repeat the process.

In a case where the display control unit 203 determines that all of the contents are focused in step S57, the display control unit 203 returns to step S5 of FIG. 36 and executes the subsequent process. As a result, all of the contents are superimposed on the information superimposition appropriate frames set as the superimposition locations.

As a result of the series of processes described above, the content can be displayed at optimal places in the scene, in a form that the content is fit into the scene. The user can view the content in a way similar to viewing a normal scene.

<1-3-5. Pre-Analysis Process>

Figure 41:
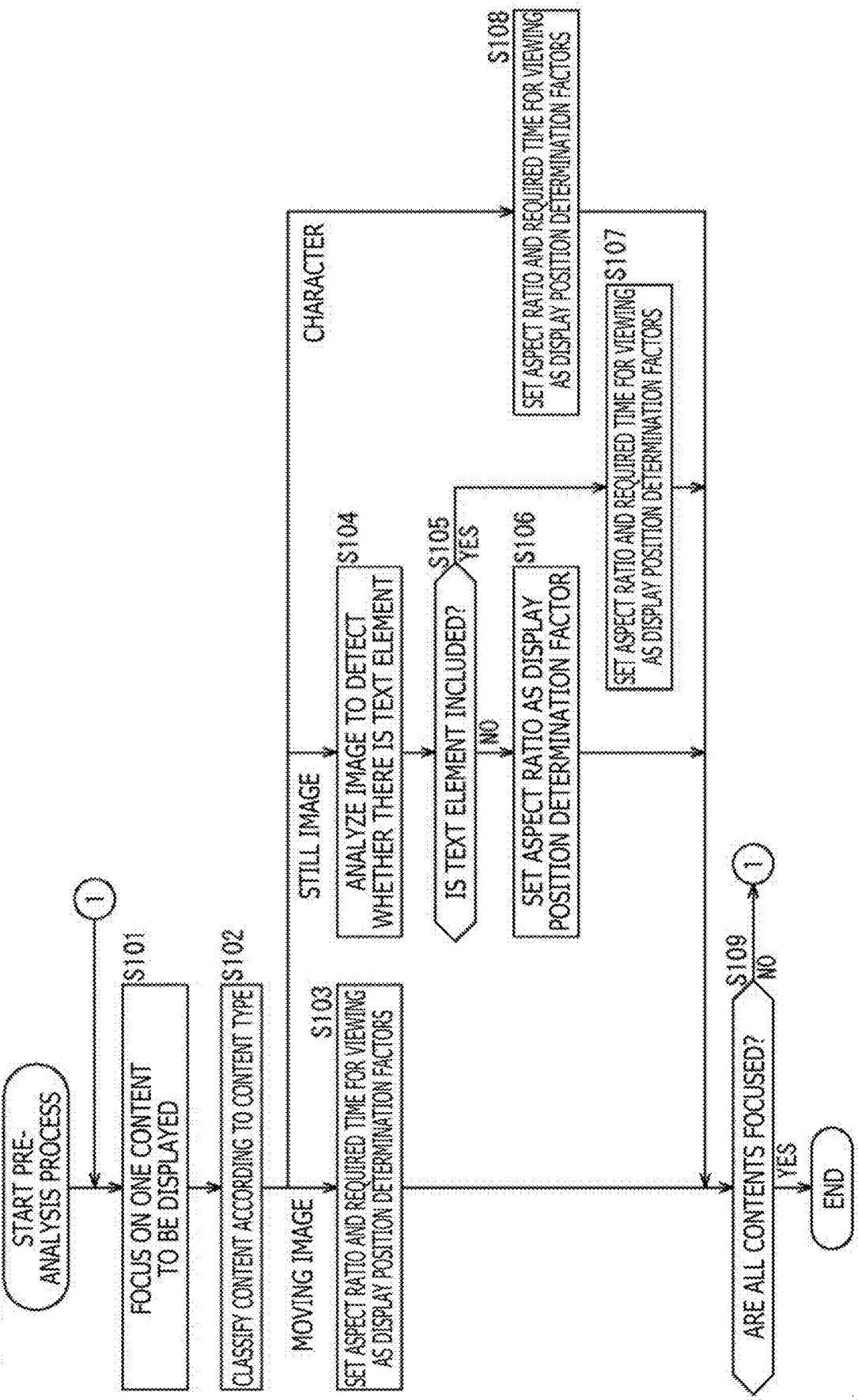
FIG. 41 is a flow chart describing a pre-analysis process of content.

The pre-analysis process of the content will be described with reference to a flow chart of FIG. 41. The pre-analysis process is appropriately executed in parallel with the process of FIG. 36.

In step S101, the pre-analysis unit 231 of the superimposition target frame selection unit 202 focuses on one content to be displayed among the contents supplied from the content acquisition unit 204.

In step S102, the pre-analysis unit 231 classifies the focused content according to the content type on the basis of the extension of the file.

In a case where the content type of the focused content is "moving image," the pre-analysis unit 231 sets the aspect ratio and the required time for viewing as the display position determination factors in step S103.

In a case where the content type of the focused content is "still image," the pre-analysis unit 231 analyzes the focused still image content to determine whether or not there is a text element in step S104.

In step S105, the pre-analysis unit 231 determines whether or not a text element is included, and in a case where the pre-analysis unit 231 determines that a text element is not included, the pre-analysis unit 231 sets the aspect ratio as the display position determination factor in step S106.

Conversely, in a case where the pre-analysis unit 231 determines that a text element is included in step S105, the pre-analysis unit 231 sets the aspect ratio and the required time for viewing as the display position determination factors in step S107.

In a case where the content type of the focused content is "character," the pre-analysis unit 231 sets the aspect ratio and the required time for viewing as the display position determination factors in step S108.

After setting the display position determination factors in steps S103, S106, and S107 or in step S108, the pre-analysis unit 231 determines whether or not all of the contents are focused in step S109.

In a case where the pre-analysis unit 231 determines that there are contents not focused yet in step S109, the pre-analysis unit 231 returns to step S101 and focuses on another content to repeat the process.

In a case where the pre-analysis unit 231 determines that all of the contents are focused in step S109, the pre-analysis process is finished. The information regarding the display position determination factors of each content is supplied from the pre-analysis unit 231 to the fitness calculation unit 232 and used for calculating the fitness.

Note that the process of each step described above may be appropriately executed in parallel with another process, or the process may be executed before or after another process by changing an order.

<<1-4. Modification>>

Although the moving body that the user is riding is a car in the description above, the moving body may be other moving bodies, such as a bicycle, a motorcycle, a train, and an airplane. The technique described above can be applied to the display of content in various moving bodies as long as a device serving as a display surface of the content is prepared for the moving body between the object and the user.

In addition, the technique can also be applied to the display of content in a case where the user wears a transmissive HMD and moves on foot. In this case, the HMD displays the content on top of the scene in the traveling direction.

Although different contents are superimposed in a case where there is a plurality of contents to be superimposed on the scene at a certain timing, one type of content may be superimposed on a plurality of information superimposition appropriate frames.

Although the image processing applied to the content on the basis of the context at the location of the information superimposition appropriate frame is the adjustment of the contrast, other processing, such as adjustment of luminance and adjustment of color, may be executed.

2. Second Embodiment

<<2-1. Summary of Second Embodiment>>

In the example described above, the information superimposition appropriate frames are set on the basis of the scene image in the traveling direction of the vehicle imaged by the camera included in the data acquisition unit 102, and the content is superimposed and displayed on the set information superimposition appropriate frames.

However, the example is on the basis of the scene image captured by the camera, and the visual point of the user is not taken into account. Therefore, the appearance may become unnatural.

That is, the content existing in the visual line direction of the user should be in focus and clearly viewed, and the content out of the visual line direction should be defocused and viewed in a blurred state. However, this is not considered in the method described above. All of the contents are displayed such that the entire contents are clearly viewed regardless of the visual line direction, and the appearance may become unnatural.

Therefore, the user riding on the vehicle may be imaged to detect the visual point position of the user, and the content superimposed on the information superimposition appropriate frame according to the visual point position may be displayed by applying a defocusing process to the content such that the farther the position of the content from the visual point position, the more obscure the view of the content.

Figure 42:
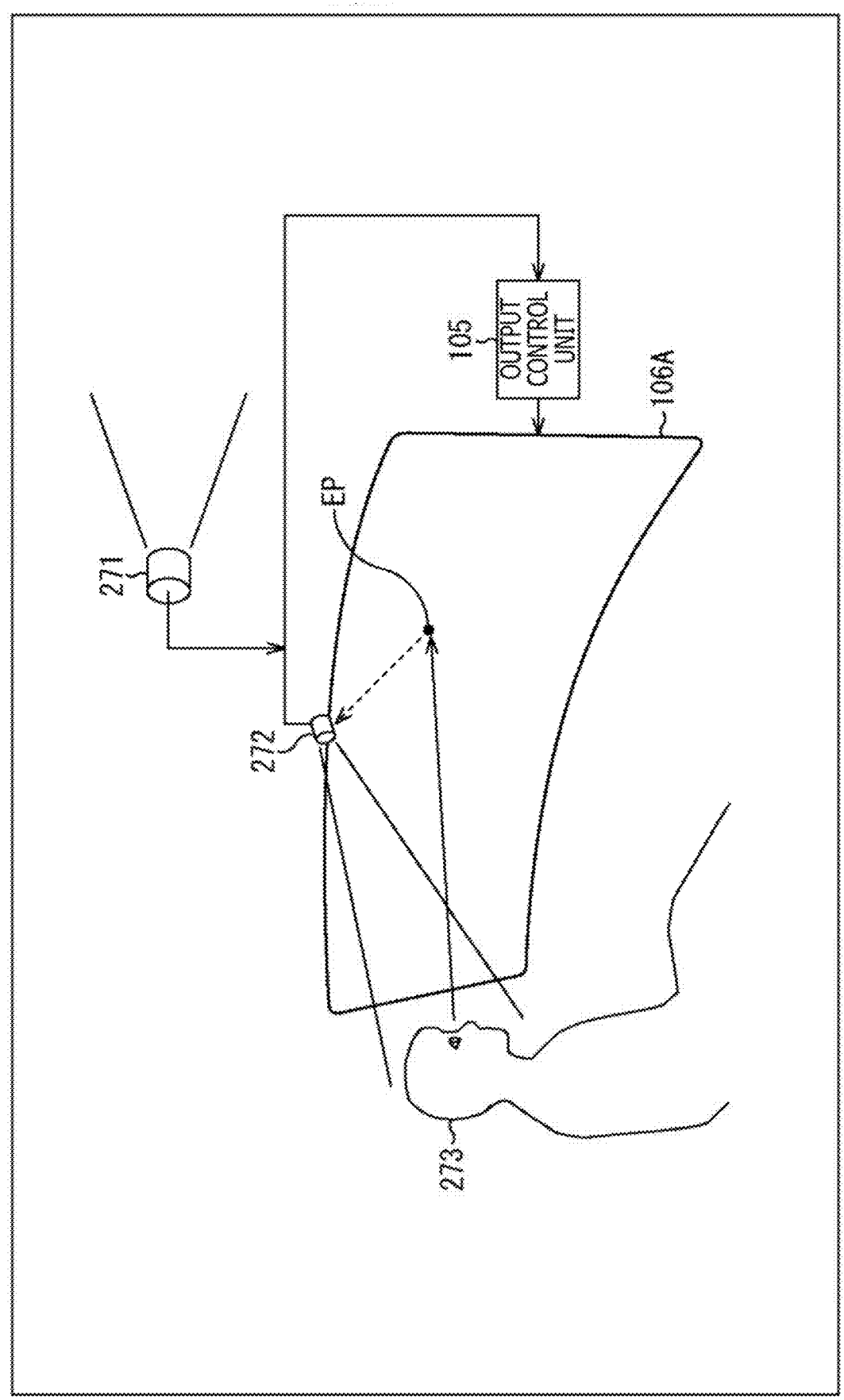
FIG. 42 is a diagram describing a summary of an example of superimposing, defocusing, and displaying the content on information superimposition appropriate frames according to a visual point position of the user when there is one user according to a second embodiment of the present technique.

FIG. 42 depicts diagrams each describing a summary of a second embodiment of the vehicle control system 100 that displays the content by applying a defocusing process to the content to be superimposed on the information superimposition appropriate frame according to a visual point position EP of the user riding on the vehicle.

That is, the vehicle control system 100 of FIG. 42 is provided with a camera 271 that images a scene image in the traveling direction of the vehicle and a camera 272 that images a user 273 as an occupant inside the vehicle.

Furthermore, the output control unit 105 executes the series of processes described above to superimpose the content on the information superimposition appropriate frame on the basis of the scene image captured by the camera 271 and applies a defocusing process to the content to be displayed on the projection unit 106A according to the distance from the visual point position EP on the projection unit 106A of the user 273 inside the vehicle imaged by the camera 272.

Here, the defocusing denotes processing executed in displaying the image, in which the image is processed into a state that the image is out of focus such that the image is obscurely displayed to the user.

That is, in the second embodiment of the present disclosure, a defocus range (Deforcus_Range) is set according to the distance from the user visual point position of the user 273, and the content is displayed after processing the content into a state that the content is defocused in a degree corresponding to the defocus range.

As a result, even when the user moves the visual line, the content at a position close to the visual point position EP is displayed in a focused state with a small degree of defocus according to the motion of the visual line. The content at a position away from the visual point position EP is displayed in a defocused state according to the size of the distance from the visual point position EP. This can realize a natural view according to the visual line direction of the user.

<<2-2. Setting Example of Defocus Range>>

Next, a setting example of the defocus range will be described with reference to FIG. 43.

The user 273 focuses on the visual point position to watch an object, with the visual point position at the object in the visual line direction. Therefore, an object existing at a position away from the visual point position is in a defocused state.

Therefore, the defocus range is set according to a distance difference value that is a difference value of the distance between the position on the content and the visual point position of the user 273.

Figure 43:
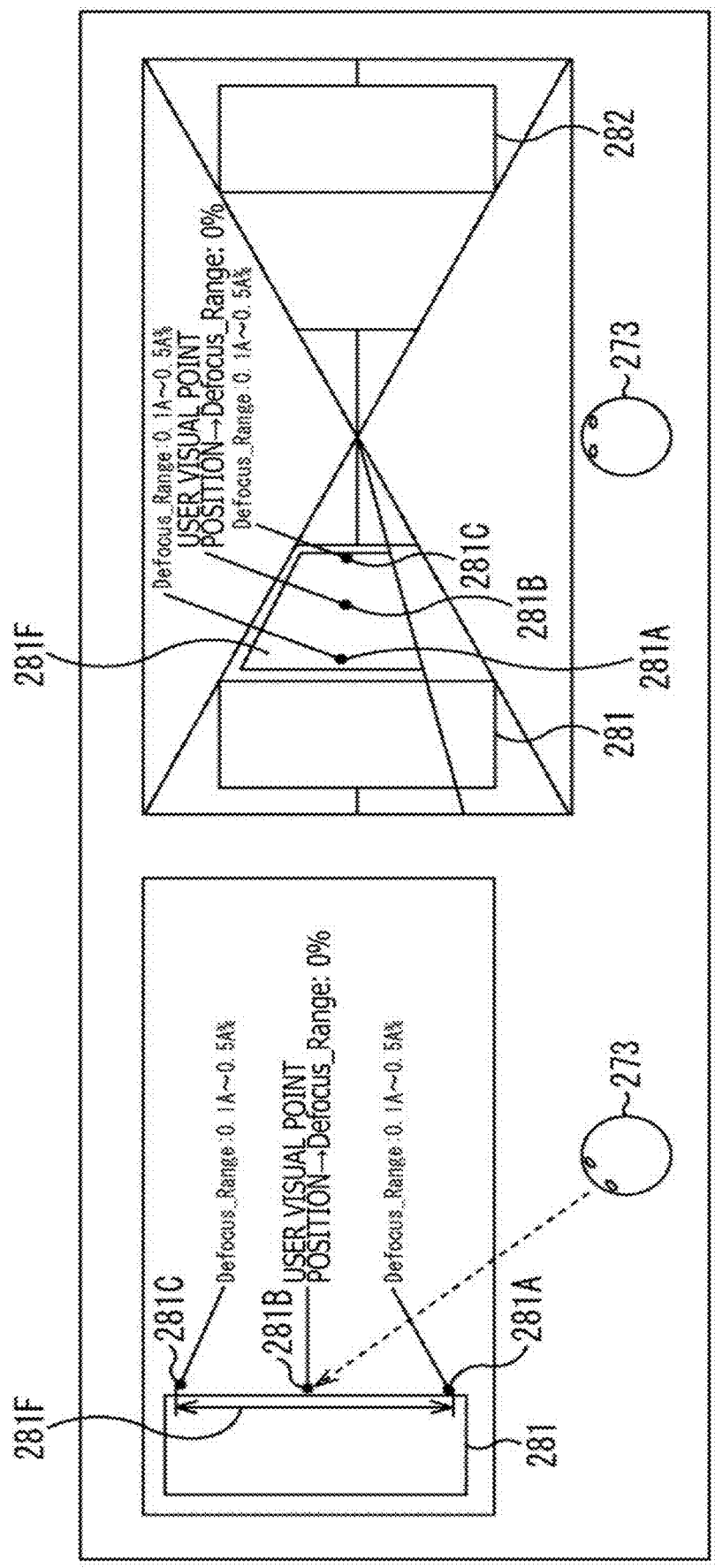
FIG. 43 is a diagram describing a setting example of a defocus range in a case where there is one information superimposition appropriate frame.

For example, in a case considered here illustrated on the right side of FIG. 43, an information superimposition appropriate frame 281F is set on a side surface of a building 281, and positions 281A, 281B, and 281C are set in ascending order according to the distance from the visual point position of the user 273 on the information superimposition appropriate frame 281F.

Here, FIG. 43 illustrates a setting example of the defocus range, and the right side of FIG. 43 illustrates an example of a scene in a case where there are buildings 281 and 282 on the left and right on the near side in the traveling direction of the user 273 riding on the vehicle. In addition, the left side of FIG. 43 illustrates a positional relationship between the user 273 and buildings 281 and 283 as viewed from above in the case where the scene on the right side of FIG. 43 is viewed.

In a case considered here illustrated on the left side of FIG. 43, the visual line of the user 273 is toward the position 281B. Hereinafter, the visual point position in the direction of the visual line of the user 273 will be referred to as a user visual point position. Therefore, as illustrated on the left side of FIG. 43, the position 281B is the user visual point position in a case where an arrow of a dotted line indicates the visual line of the user 273.

In this case, the position 281B on the information superimposition appropriate frame 281F is the user visual point position, and therefore, it can be considered that the user 273 is watching and focusing on the position 281B that is the user visual point position.

In other words, it can be considered that the user 273 is watching the scene in the defocused state at the positions 281A and 281C that are not the user visual point position on the information superimposition appropriate frame 281F. It can be considered that the farther the distance from the user visual point position, the more defocused the content.

Therefore, as illustrated in FIG. 43, the defocus range (Deforcus_Range) is set to 0% at the position 281B that is the user visual point position. In addition, at the positions 281A and 281C away from the user visual point position, the defocus range (Deforcus_Range) is set to 0.1 A % to 0.5 A % according to the distance difference values that are values of the distances from the user visual point positions to the positions 281A and 281C.

That is, the larger the distance difference value between the user visual point position of the user 273 and the position, the larger the value set for the defocus range. The smaller the distance difference value, the smaller the value set for the defocus range. Therefore, the distance difference value is 0 at the position 281B that is the user visual point position, and the defocus range is also set to 0.

In other words, the closer the position from the user visual point position, the smaller the value set for the defocus range. The farther the position from the user visual point position, the larger the value set for the defocus range.

Here, A in the setting example of the defocus range in FIG. 43 is a predetermined coefficient which can be arbitrarily set as a weight according to the defocus range and the distance difference value. That is, in a case where the coefficient A is small, a change in the distance difference value between the user visual point position and the position does not significantly change the defocus range, and the defocusing process for significantly obscurely displaying the scene is not executed at a position near the user visual point position. In contrast, in a case where the coefficient A is large, even a slight change in the distance difference value significantly changes the defocus range, and the defocusing process for obscurely displaying the content is executed even at a position near the user visual point position.

<<2-3. Setting Example of Defocus Ranges in Case where there is Plurality of Information Superimposition Appropriate Frames>>

Although there is one information superimposition appropriate frame in the setting example of the defocus range described above, the defocus ranges can be similarly set in a case where there is a plurality of information superimposition appropriate frames.

Figure 44:
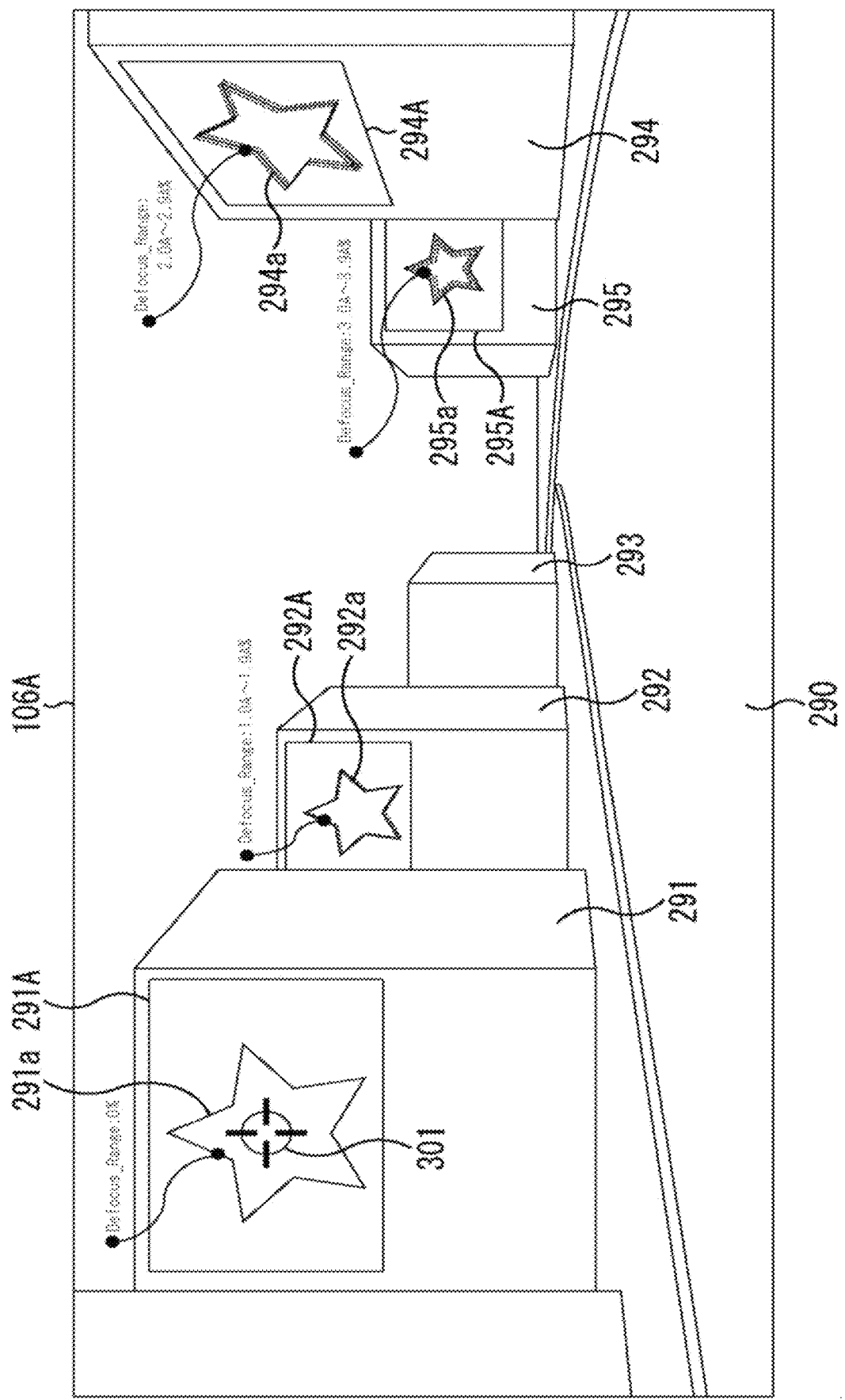
FIG. 44 is a diagram describing a setting example of defocus ranges in a case where there is a plurality of information superimposition appropriate frames and describing a display example when a projection unit is a transmissive display.

For example, in a case considered here illustrated in FIG. 44, there is a plurality of buildings in the projection unit 106A, and the information superimposition appropriate frames are set for the plurality of buildings.

FIG. 44 illustrates a scene including a road 290 on the front in the traveling direction of the vehicle. Buildings 291 to 293 are arranged in ascending order of a distance from the left side of the road 290, and buildings 294 and 295 exist in ascending order of a distance from the right side of the road 290.

Furthermore, in FIG. 44, an information superimposition appropriate frame 291A is set on a surface of the building 291 facing the traveling direction of the user, and star-shaped content 291a is superimposed and displayed. Here, it is assumed that a user visual point position 301 of the user 273 is substantially at the center of the content 291a. Therefore, the defocus range (Deforcus_Range) is set to 0% for the content 291a of the information superimposition appropriate frame 291A.

Here, the distances from the user visual point position 301 to the images on the information superimposition appropriate frames projected by the projection unit 106A and to the buildings 291 to 295 directly viewed in front in the traveling direction through the projection unit 106A are in order of the buildings 291, 292, 293, 294, and 295 in ascending order.

In addition, an information superimposition appropriate frame 292A is set on a surface of the building 292 facing the traveling direction of the user, and star-shaped content 292a is superimposed and displayed. The distance from the user visual point position 301 to the building 292 is farther than to the building 291, and the defocus range (Deforcus_Range) is set to, for example, 1.0 A % to 1.9 A % for the content 292a of the information superimposition appropriate frame 292A.

Furthermore, an information superimposition appropriate frame 294A is set on a surface of the building 294 facing the road 290, and star-shaped content 294a is superimposed and displayed. The distance from the user visual point position 301 to the building 294 is farther than to the building 292, and the defocus range (Deforcus_Range) is set to, for example, 2.0 A to 2.9 A %, which are values larger than the values for the content 292a, for the content 294a of the information superimposition appropriate frames 294A.

In addition, an information superimposition appropriate frame 295A is set on a surface of the building 295 facing the traveling direction of the user, and star-shaped content 295a is superimposed and displayed. The distance from the user visual point position 301 to the building 295 is farther than to the building 294, and the defocus range (Deforcus_Range) is set to, for example, 3.0 A % to 3.9 A %, which are values larger than the values for the content 294a, for the content 295a of the information superimposition appropriate frame 295A.

That is, the defocus range of the content 291a at the user visual point position 301 is set to the minimum value of 0%.

In addition, the defocus range of the content 292a in the information superimposition appropriate frame 292A at the closest distance to the information superimposition appropriate frame 291A as the user visual point position 301 is set to, for example, 1.0% to 1.9%.

Furthermore, the defocus range of the content 294a in the information superimposition appropriate frame 294A at the second closest distance to the information superimposition appropriate frame 291A as the user visual point position 301 is set to, for example, 2.0% to 2.9%.

In addition, the defocus range of the content 295a in the information superimposition appropriate frame 295A at the third closest distance to the information superimposition appropriate frame 291A as the user visual point position 301 is set to, for example, 3.0% to 3.9%.

Therefore, the content 291a is displayed in a focused state. The content 292a is displayed in a defocused state such that the defocus range corresponds to 1.0% to 1.9%, and the content 292a is displayed more obscurely for the user 273 compared to the content 291a.

In addition, the content 294a is displayed in a defocused state such that the defocus range corresponds to 2.0% to 2.9%, and the content 294a is displayed more obscurely for the user 273 compared to the content 292a.

Furthermore, the content 295a is displayed in a defocused state such that the defocus range corresponds to 3.0% to 3.9%, and the content 295a is displayed more obscurely for the user 273 compared to the content 294a.

That is, the degree of defocus increases in the order of the contents 292a, 294a, and 295a, and the contents are more obscurely displayed. In FIG. 44, star shapes indicated by dotted lines express the defocused state. Note that, in FIG. 44, the content 291a is displayed in a star shape with only solid lines, and this indicates that there is no deviation of focus. In addition, the content 292a is displayed in a star shape indicated by one solid line and one dotted line, and this expresses that the content 292a is more defocused and more obscurely displayed than the content 291a.

Furthermore, the content 294a is displayed in a star shape indicated by one solid line and two dotted lines, and this expresses that the content 294a is more defocused and more obscurely displayed than the content 292a.

Furthermore, the content 295a is displayed in a star shape indicated by one solid line and three dotted lines, and this expresses that the content 295a is more defocused and more obscurely displayed than the content 294a.

As a result of the display, the content 291a at the user visual point position 301 is displayed in the focused state, and the contents 292a, 294a, and 295a are displayed in the defocused, obscure, and blurred states according to the distance difference values between the user visual point position 301 of the user 273 and the respective positions. This can realize natural display corresponding to the visual line.

<<2-4. Configuration Example of Second Embodiment of Display Control Unit>>

<2-4-1. Configuration Example of Display Control Unit>

Next, a configuration example of the second embodiment of the output control unit 105 will be described with reference to FIG. 45. However, in the configuration example of the second embodiment of the output control unit 105, the difference from the configuration example of the first embodiment is the configuration of the display control unit 203, and only the configuration of the display control unit 203 will be described.

Furthermore, in the display control unit 203 of FIG. 45, the process of the display processing unit 254 is different from the process of the display control unit 203 in FIG. 33, and the process of the display processing unit 254 will be described.

Figure 45:
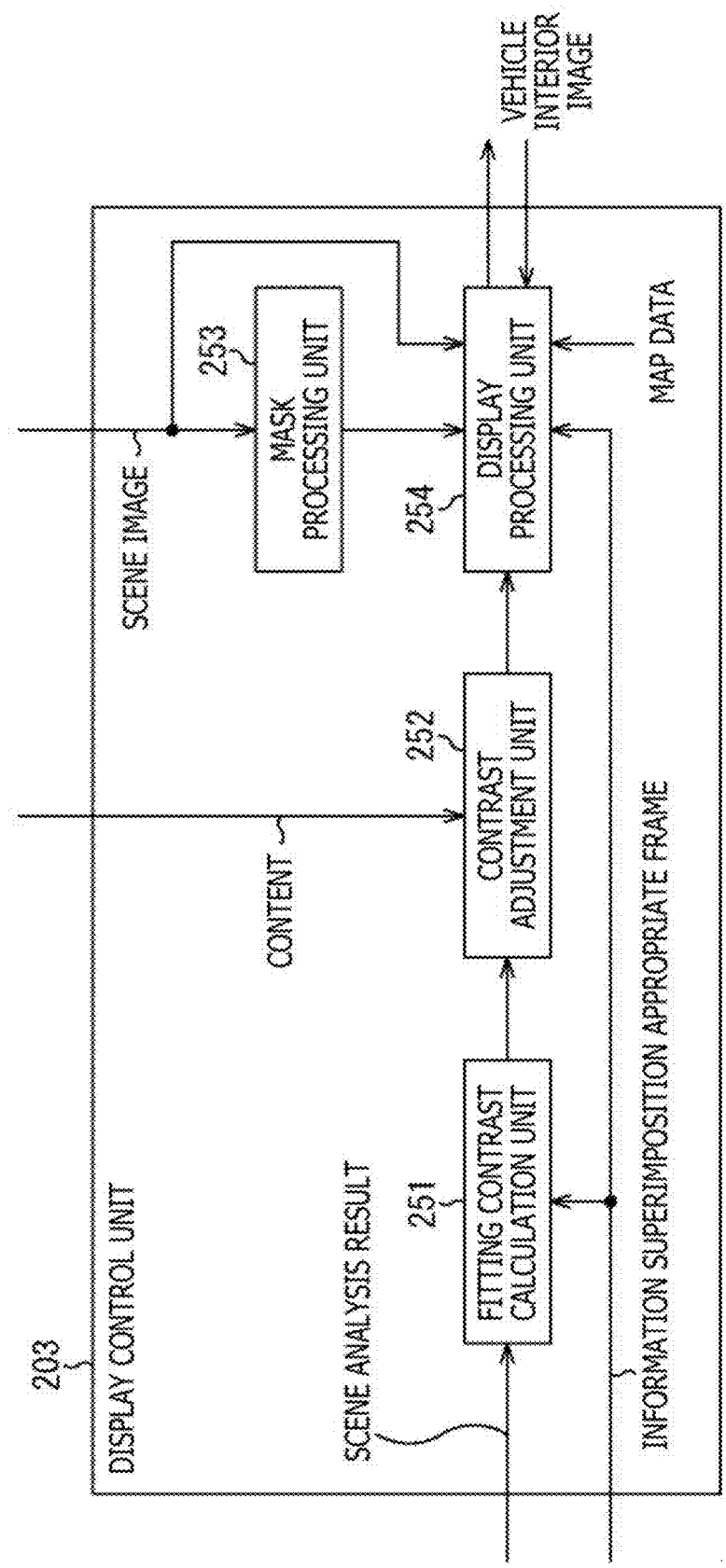
FIG. 45 is a diagram describing a configuration example of the display control unit according to the second embodiment of the present technique.

The display control unit 203 of FIG. 45 uses the scene image captured by the camera 271 that images the vehicle exterior, the map data stored in the storage unit 111 or map data acquired from a server not illustrated, and the information of the information superimposition appropriate frames to construct a pseudo-3D model on the memory space and generates, in the pseudo-3D model, wireframes corresponding to the information superimposition appropriate frames.

In addition, the display control unit 203 uses information of a coordinate system of the pseudo-3D model and the vehicle interior image captured by the camera 272 to obtain the defocus range at each position on the information superimposition appropriate frames superimposed on the wireframes in the pseudo-3D model and generates a defocus range map.

Furthermore, the display control unit 203 superimposes the content with adjusted contrast and the part images on the wireframes in the pseudo-3D model and reads the defocus range of each position from the defocus range map to execute a corresponding defocusing process. The display control unit 203 outputs the pseudo-3D model to the projection unit 106A and causes the projection unit 106A to display the pseudo-3D model.

<2-4-2. Configuration Example of Display Processing Unit of FIG. 45>

Next, a detailed configuration example of the display processing unit 254 of FIG. 45 will be described with reference to FIG. 46.

The display processing unit 254 of FIG. 45 includes a pseudo-3D model wireframe generation unit 321, a content superimposition unit 322, a defocus processing unit 323, a visual point position detection unit 324, a defocus range setting unit 325, and a defocus range map storage unit 326.

The pseudo-3D model wireframe generation unit 321 uses the road, the building, and the like corresponding to the space in the traveling direction of the vehicle to construct a pseudo-3D model in the memory space on the basis of the scene image, the map data, and the information of the information superimposition appropriate frames. Furthermore, the pseudo-3D model wireframe generation unit 321 generates, in the constructed pseudo-3D model, corresponding wireframes on the basis of the information of the positions provided with the information superimposition appropriate frames and outputs the wireframes as pseudo-3D model wireframe information to the content superimposition unit 322, the visual point position detection unit 324, and the defocus range setting unit 325.

The content superimposition unit 322 superimposes the content with adjusted contrast and the part images on the wireframes corresponding to the information superimposition appropriate frames in the pseudo-3D model and outputs the wireframes to the defocus processing unit 323.

The defocus processing unit 323 accesses the defocus range map storage unit 326 and reads the set defocus range group for each wireframe corresponding to the information superimposition appropriate frame in the pseudo-3D model provided with the content with adjusted contrast and the part images. The defocus processing unit 323 applies the defocusing process to the image in the corresponding defocus range and outputs the image.

The visual point position detection unit 324 searches for the user visual point position from the vehicle interior image captured by the camera 272 and obtains the coordinate position on the 3D model wireframe. The visual point position detection unit 324 outputs the coordinate position to the defocus range setting unit 325. More specifically, the visual point position detection unit 324 detects the face image of the user from the vehicle interior image captured by the camera 272. Furthermore, the visual point position detection unit 324 specifies the iris positions of the eyes from the detected face image and detects, as the user visual point position, the visual point position on the projection surface of the projection unit 106A on the basis of the positions of the irises.

The defocus range setting unit 325 sets the defocus range at each position in the wireframes corresponding to the information superimposition appropriate frames in the pseudo-3D model on the basis of the pseudo-3D model wireframe information and the information of the user visual point position to form a defocus range group for each wireframe and causes the defocus range map storage unit 326 to store the defocus range groups as a defocus range map regarding the plurality of information superimposition appropriate frames. Furthermore, in this case, the defocus range setting unit 325 also sets the defocus ranges for regions other than the wireframes. That is, the defocus range setting unit 325 sets the defocus ranges for all of the positions in the pseudo-3D model space and causes the defocus range map storage unit 326 to store the defocus ranges as a defocus range map.

The defocus range map storage unit 326 stores the defocus range map. The defocus processing unit 323 applies the defocusing process corresponding to the defocus ranges to the content supplied from the content superimposition unit 322, in which the content with adjusted contrast and the part images are superimposed on the wireframes corresponding to the information superimposition appropriate frames in the pseudo-3D model space. The defocus processing unit 323 outputs the content.

<2-4-3. Display Process of Display Control Unit in FIG. 45>

Next, the display process of the display control unit 203 in FIG. 45 will be described with reference to a flow chart of FIG. 47.

In step S201, the pseudo-3D model wireframe generation unit 321 constructs the pseudo-3D model of the road, the buildings, and the like in the memory space on the basis of the scene image, the map data, and the information regarding the information superimposition appropriate frames. Furthermore, the pseudo-3D model wireframe generation unit 321 sets, in the pseudo-3D model, the wireframes corresponding to the information superimposition appropriate frames on the basis of the information of the positions provided with the information superimposition appropriate frames and outputs the wireframes as the pseudo-3D model wireframe information to the content superimposition unit 322, the visual point position detection unit 324, and the defocus range setting unit 325.

In step S202, the visual point position detection unit 324 and the defocus range setting unit 325 execute the defocus range map generation process to generate the defocus range map and cause the defocus range map storage unit 326 to store the defocus range map.

<2-4-4. Defocus Range Map Generation Process of Display Control Unit in FIG. 45>

Figure 48:
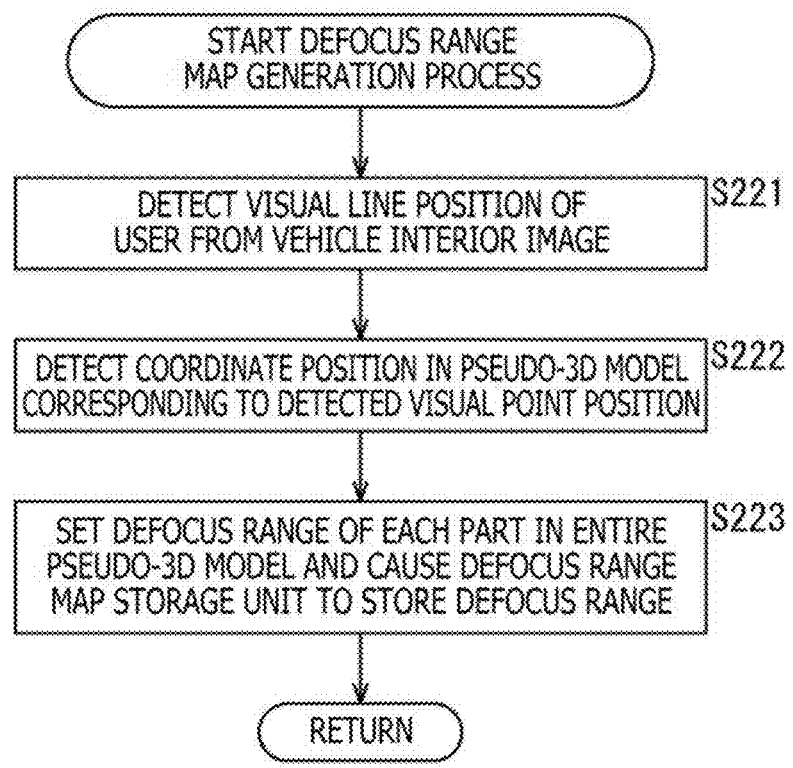
FIG. 48 is a flow chart describing a defocus range map generation process of step S202 in FIG. 47.

Here, the defocus range map generation process of the display control unit 203 in FIG. 45 will be described with reference to a flow chart of FIG. 48.

In step S221, the visual point position detection unit 324 acquires the vehicle interior image captured by the camera 272 and detects the face image of the user as an occupant. The visual point position detection unit 324 further detects the iris positions to estimate the visual line direction on the basis of the iris positions and specifies the user visual line position on the display surface of the projection unit 106A.

In step S222, the visual point position detection unit 324 specifies the coordinate position of the user visual point position on the projection unit 106A in the pseudo-3D model and outputs the coordinate position of the user visual point position to the defocus range setting unit 325.

In step S223, the defocus range setting unit 325 sets, for each point in the pseudo-3D model, the defocus range corresponding to the difference value of a distance from the user visual point position to generate the defocus range map and causes the defocus range map storage unit 326 to store the defocus range map.

As a result of the process described above, the defocus range at each point of the 3D model is set, and the defocus ranges are stored as the defocus range map in the defocus range map storage unit 326. In this case, continuous defocus ranges are set in the wireframes of the 3D model in the defocus range map, and the defocus range groups are formed on the basis of wireframes. The defocus ranges are stored in the defocus range map in this state.

Figure 47:
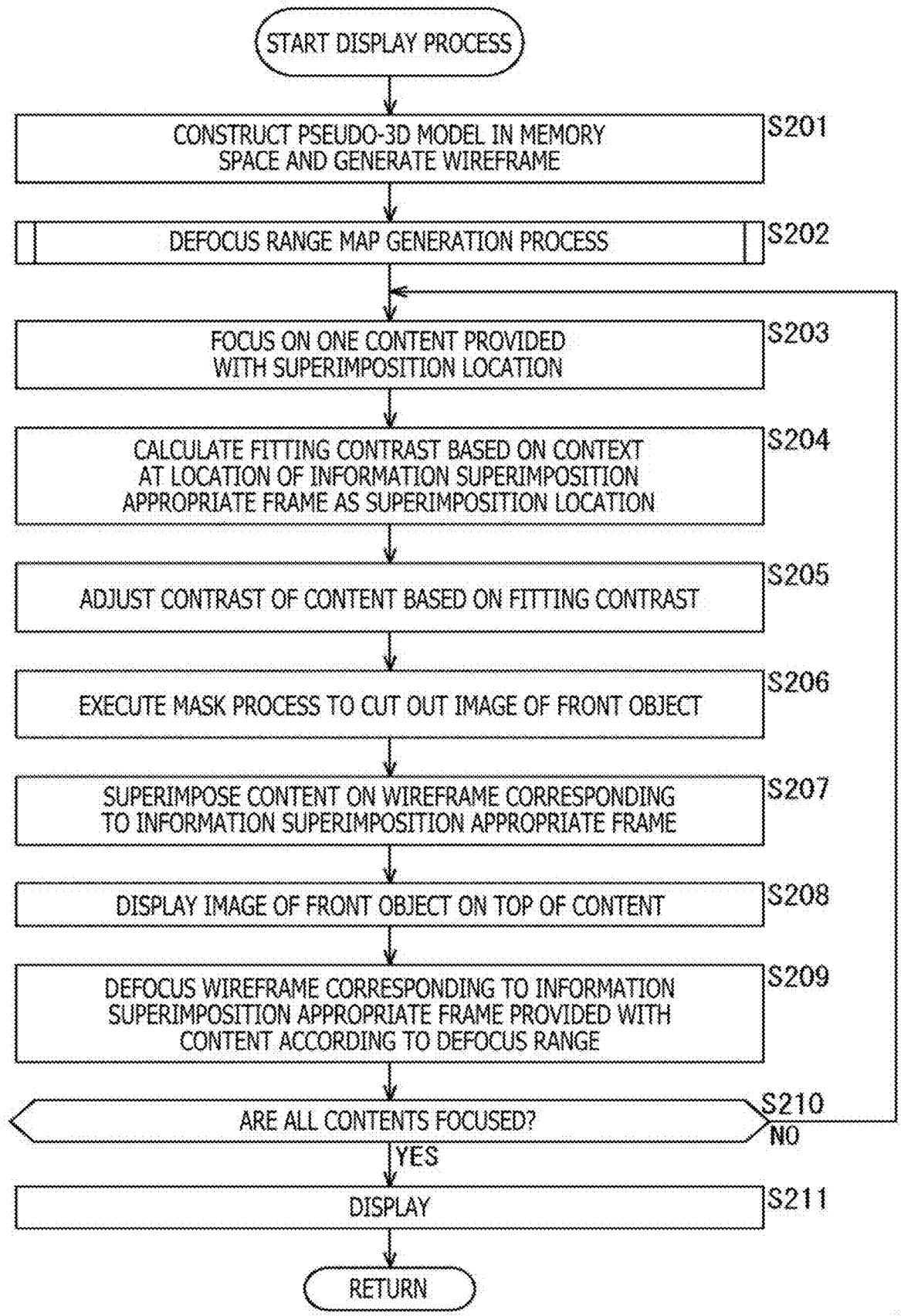
FIG. 47 is a flow chart describing a display process of the display control unit of FIG. 45.

Here, the flow chart of FIG. 47 will be further described.

In step S202, once the defocus range map is generated in the defocus range map generation process, the fitting contrast calculation unit 251 of the display control unit 203 focuses on one content provided with the superimposition location in step S203.

In step S204, the fitting contrast calculation unit 251 calculates the fitting contrast on the basis of the context at the location of the information superimposition appropriate frame as the superimposition location.

In step S205, the contrast adjustment unit 252 adjusts the contrast of the focused content on the basis of the fitting contrast.

In step S206, the mask processing unit 253 executes the masking process to cut out the image of the front object in a case where there is a front object in the information superimposition appropriate frame as the superimposition location of the focused content.

In step S207, the content superimposition unit 322 of the display processing unit 254 superimposes the content with adjusted contrast on the wireframe in the pseudo-3D model space corresponding to the information superimposition appropriate frame.

In step S208, the content superimposition unit 322 appropriately displays the image of the front object on top of the content and outputs the content to the defocus processing unit 323.

In step S209, the defocus processing unit 323 accesses the defocus range map storage unit 326 and reads, from the defocus range map, the defocus range group corresponding to the frame provided with the focused content. In accordance with the focus range at each point on the frame, the defocus processing unit 323 applies the defocusing process to each point on the wireframe of the pseudo-3D model corresponding to the information superimposition appropriate frame provided with the content and outputs the frame.

In step S210, the display control unit 203 determines whether or not all of the contents are focused.

In a case where the display control unit 203 determines that there are contents not focused yet in step S210, the display control unit 203 returns to step S203 to focus on another content and repeats the process described above.

In a case where the display control unit 203 determines that all of the contents are focused in step S210, all of the contents are superimposed on the wireframes of the pseudo-3D model corresponding to the information superimposition appropriate frames set as the superimposition locations. Once the defocusing process is executed, the process proceeds to step S211.

In step S211, the defocus processing unit 323 outputs the image subjected to the defocusing process according to the distances from the user visual point position in the state that all of the contents are superimposed on the information superimposition appropriate frames set as the superimposition locations. The defocus processing unit 323 outputs the image to the projection unit 106A and causes the projection unit 106A to display the image. The process returns to step S5 of FIG. 36, and the subsequent process is executed.

As a result of the series of processes described above, on the projection unit 106A including the transmissive display, the contents are superimposed and displayed on the information superimposition appropriate frames such that the contents are fit into the scene. In this case, the closer the position of the content of the information superimposition appropriate frame to the user visual point position, the smaller the degree of defocus in the displayed image (more focused, sharp, and clear image). The farther the position of the content of the information superimposition appropriate frame from the user visual point position, the larger the degree of defocus in the displayed image (more defocused and obscure image).

As a result, the content can be displayed at optimal places in the scene in a form that the content is more fit into the scene. The user can watch the content in a way similar to viewing a normal scene.

Note that, although the defocus range of each point in the 3D model corresponding to the entire scene image is obtained to generate the defocus range map in the defocus range map generation process in the example described above, the defocusing process is actually applied only to the regions of the information superimposition appropriate frames provided with the content. Therefore, for the defocus range map, only the defocus range groups of the regions of the wireframes in the pseudo-3D model corresponding to the regions of the information superimposition appropriate frames may be obtained to form the defocus range map.

<<2-5. Modification>>
<2-5-1. Configuration Example of Display Processing Unit in Case where Projection Unit is Non-Transmissive Display>

Although the projection unit 106A in FIG. 42 includes the transmissive display in the example of the case described above, the projection unit 106A may include a non-transmissive display.

That is, the projection unit 106A is the transmissive display in the description above, and the content is superimposed on the regions assumed to be the information superimposition appropriate frames described above. Therefore, the content is projected after applying the defocusing process only to the regions provided with the content that are assumed to be the information superimposition appropriate frames. Thus, the user watches the projected images in the regions assumed to be the information superimposition appropriate frames and directly views and watches the objects existing on the front side in the regions other than the regions assumed to be the information superimposition appropriate frames. In this way, the user watches the content displayed to naturally fit into the scene.

However, in a case of a non-transmissive display, the entire display displays, for example, the scene image captured by the camera 271, and the content is superimposed and displayed in the regions of the information superimposition appropriate frames in the displayed scene image. That is, in the case where the content is displayed in the non-transmissive display, the user watches the images in the state in which the content is displayed on part of the images displayed on the entire display. Therefore, in the case of the non-transmissive display, the defocusing process corresponding to the user visual point position is necessary in the entire display region of the display.

Here, a configuration example of the display processing unit in the case where the projection unit is a non-transmissive display will be described with reference to FIG. 49.

Figure 46:
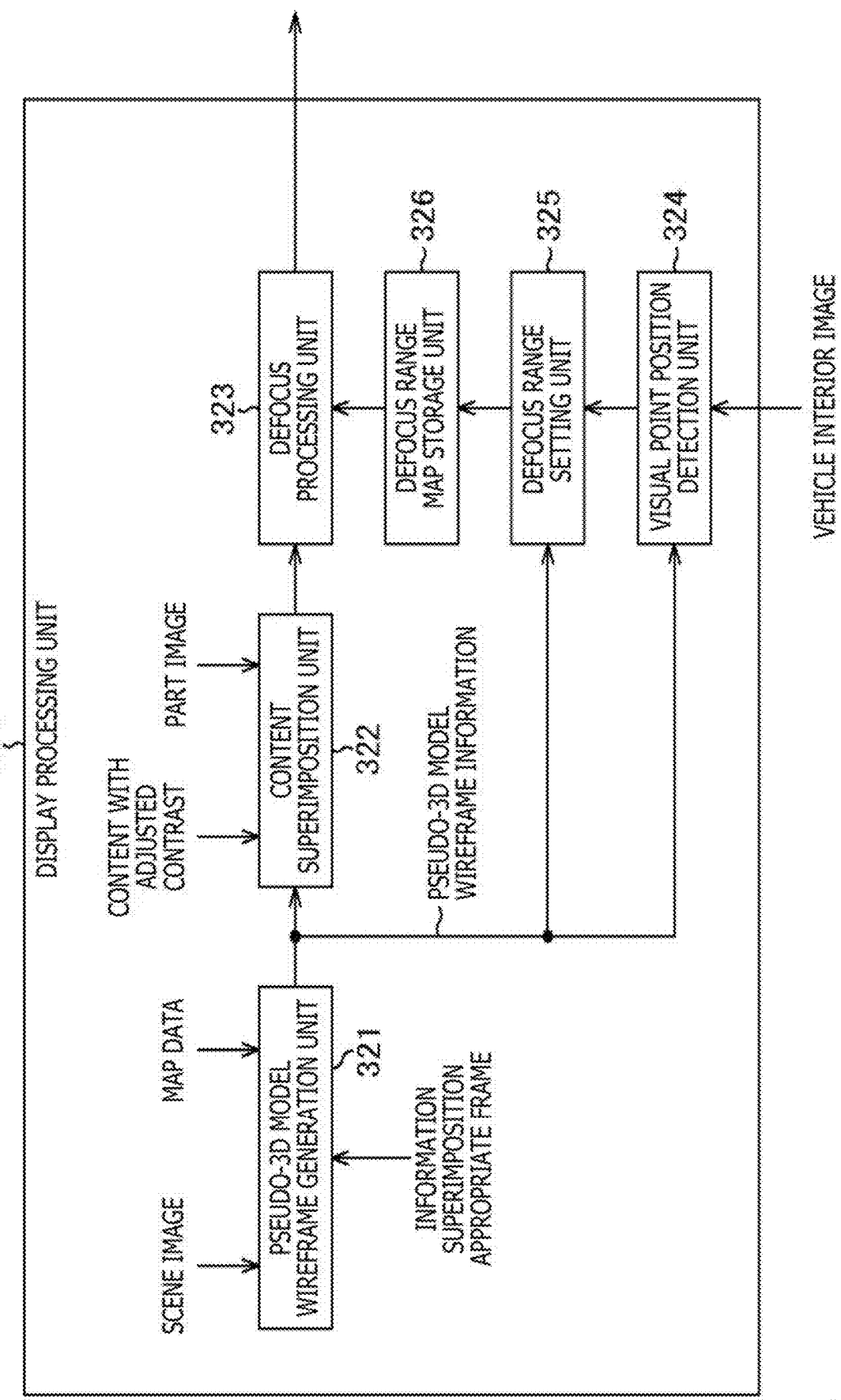
FIG. 46 is a diagram describing a configuration example of a display processing unit of FIG. 45.
Figure 49:
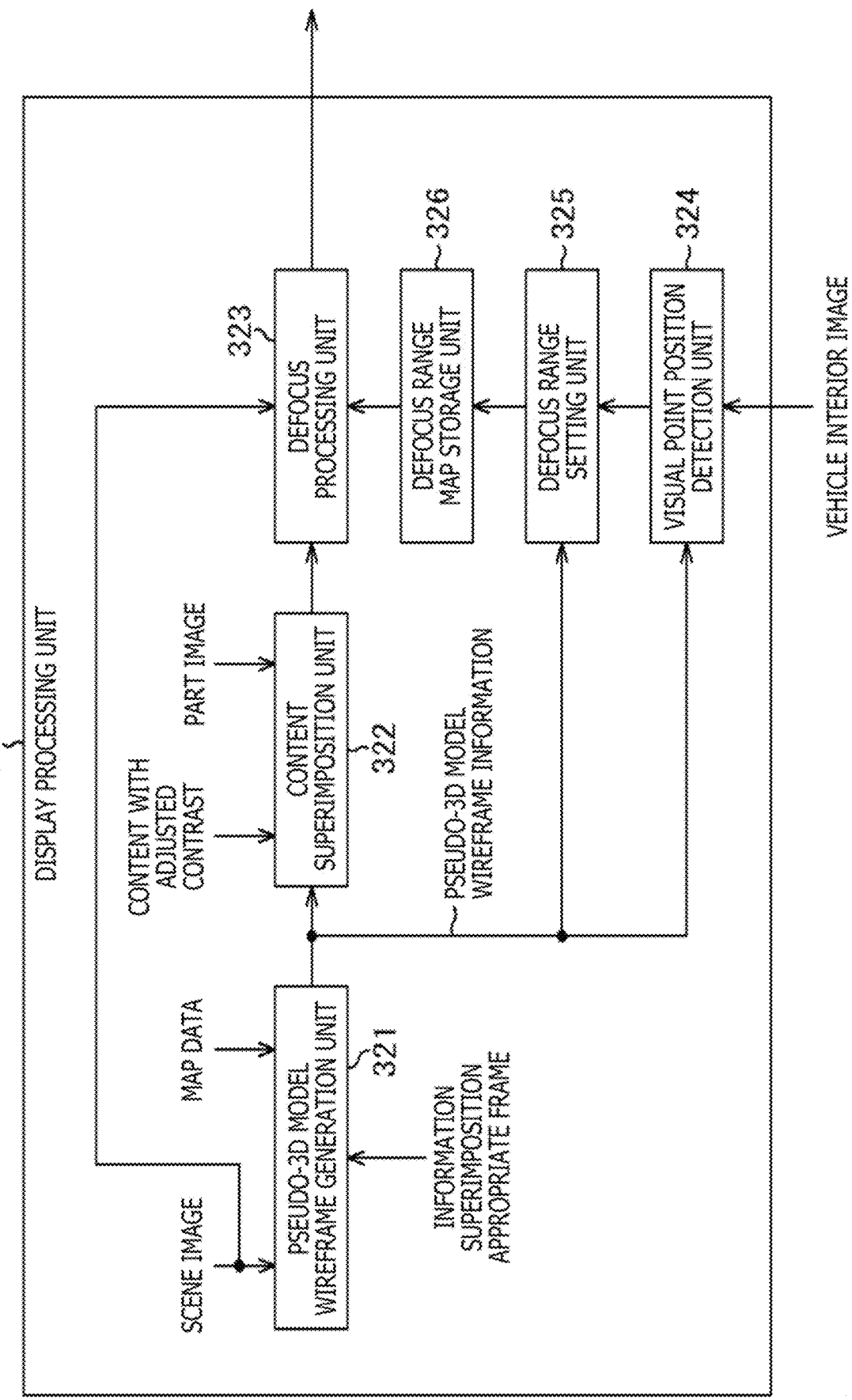
FIG. 49 is a diagram describing a configuration example of the display processing unit when the projection unit is a non-transmissive display according to a modification of the second embodiment of the present technique.

In the display processing unit 254 of FIG. 49, the configuration different from the display processing unit 254 of FIG. 46 is that the information of the scene image is supplied to the defocus processing unit 323, and the defocus processing unit 323 executes the defocusing process in the state in which the information of the information superimposition appropriate frames is superimposed.

That is, in the case where the projection unit 106A is a non-transmissive display, the defocus processing unit 323 applies the defocusing process to the entire scene image in the state in which the information superimposition appropriate frames provided with the content are superimposed on the scene image captured by the camera 271.

In this case, the defocus processing unit 323 uses all of the information of the defocus ranges set in the entire scene image stored in the defocus range map storage unit 326 and applies the defocusing process to the entire scene image in the state in which the information superimposition appropriate frames provided with the content are superimposed.

<2-5-2. Display Process in Case where Projection Unit is Non-Transmissive Display>

Figure 50:
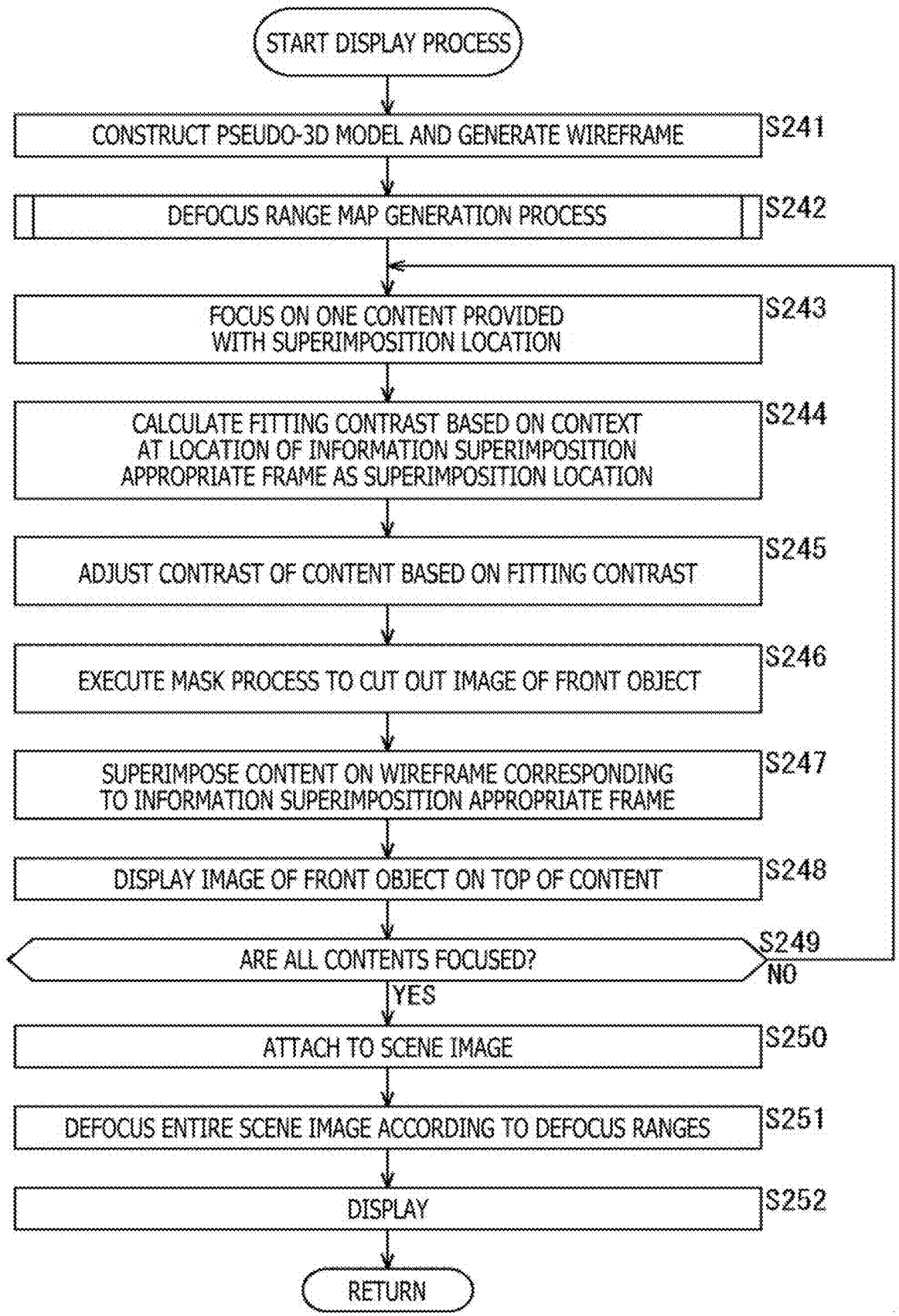
FIG. 50 is a flow chart describing a display process of the display control unit of FIG. 45 in which the display processing unit of FIG. 49 is applied.

Next, a display process in the case where the projection unit 106A is a non-transmissive display will be described with reference to a flow chart of FIG. 50. Note that the process of steps S241 to S249 in FIG. 49 is similar to the process of steps S201 to S208 and S210 in FIG. 47, and the description will not be repeated.

That is, once the content is superimposed on all of the wireframes corresponding to the information superimposition appropriate frames in the pseudo-3D model in the process of steps S241 to S249, the process proceeds to step S250.

In step S250, the defocus processing unit 323 attaches and superimposes the wireframes on the scene image captured by the camera 271 in the state in which the content is superimposed on all of the wireframes corresponding to the information superimposition appropriate frames in the pseudo-3D model.

In step S251, the defocus processing unit 323 applies the defocusing process to the entire scene image according to the defocus ranges. That is, here, the defocusing process with the defocus ranges corresponding to the difference values of distances from the user watching position is applied not only to the regions provided with the content on the wireframes corresponding to the information superimposition appropriate frames, but also to each position of the entire scene image in the pseudo-3D model.

In step S252, the defocus processing unit 323 outputs the scene image subjected to the defocusing process to the projection unit 106A including the non-transmissive display and causes the projection unit 106A to display the scene image. The process returns to step S5 of FIG. 36, and the subsequent process is executed.

Figure 51:
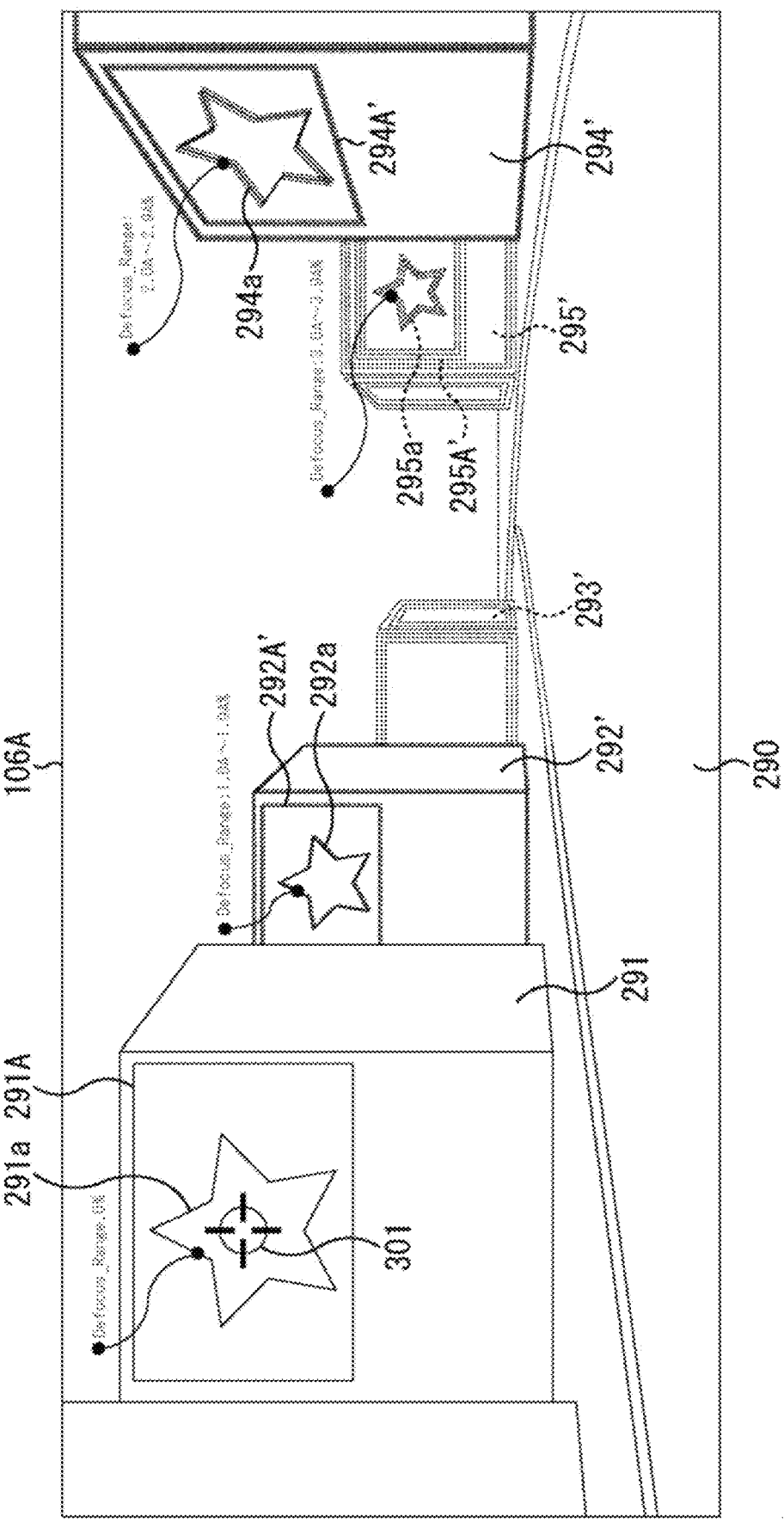
FIG. 51 is a diagram describing a setting example of the defocus ranges in a case where there is a plurality of information superimposition appropriate frames and describing a display example when the projection unit is a non-transmissive display.

That is, a display example of FIG. 51 illustrates an example in which the scene displayed on the projection unit 106A on the basis of the transmissive display described with reference to FIG. 44 is displayed by a projection unit 106A including a non-transmissive display.

That is, the scene is displayed by the projection unit 106A including the transmissive display in the example of FIG. 44, and therefore, the defocusing process is applied to only the respective star-shaped contents 292a, 294a, and 295a in the information superimposition appropriate frames 292A, 294A, and 295A according to the distance from the user visual point position 301.

In contrast, the scene is displayed by the projection unit 106A including the non-transmissive display in the example of FIG. 51, and the defocusing process is applied to the entire scene image including buildings 292' to 295' corresponding to the buildings 292 to 295 according to the distance from the user visual point position 301. Therefore, the defocusing process is also applied to each of the information superimposition appropriate frames 292A, 294A, and 295A similarly to the star-shaped contents 292a, 294a, and 295a. The defocusing process is also applied to other configurations. Note that, as for the defocusing process in the star-shaped contents 292a, 294a, and 295a, a similar defocusing process is executed regardless of whether the projection unit 106A is a transmissive display or a non-transmissive display.

As a result, the content can be displayed at optimal places in the scene in a form that the content is more fit into the scene, and the user can watch the content in a way similar to viewing a normal scene.

3. Third Embodiment

<<3-1. Summary of Third Embodiment>>

Although the defocusing process is applied to the content on the information superimposition appropriate frames according to the difference values of distances from the user visual point position in the case where there is one user as an occupant in the example described above, defocusing processes may be executed according to respective user watching positions to allow respective users to watch images subjected to optimal defocusing processes in a case where there is a plurality of users as occupants.

Figure 52:
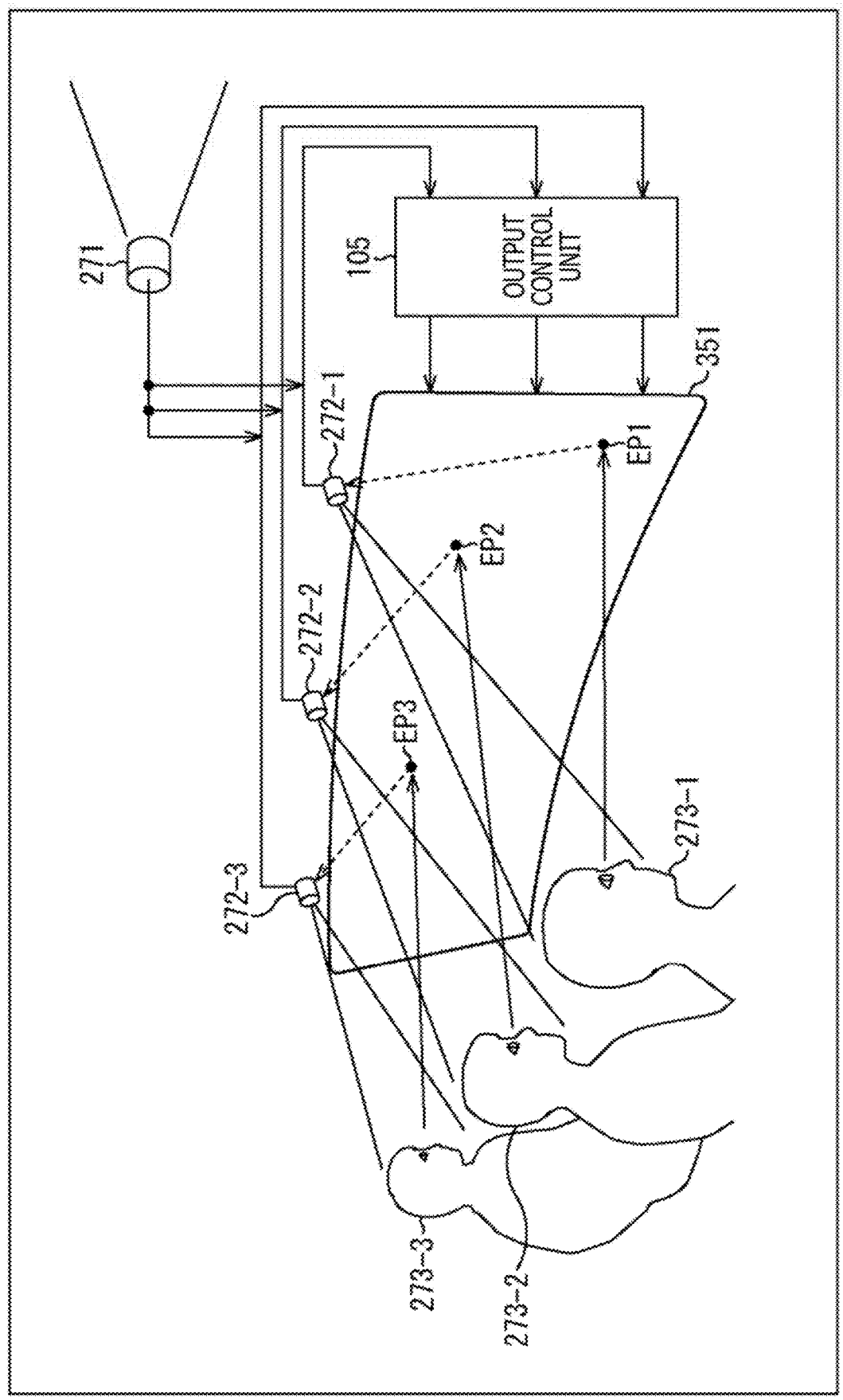
FIG. 52 is a diagram describing a summary of an example of superimposing, defocusing, and displaying the content on the information superimposition appropriate frames according to the visual point positions of a plurality of users when there is a plurality of users according to a third embodiment of the present technique.

FIG. 52 is a diagram describing a summary of a third embodiment of the vehicle control system 100 that defocuses the content superimposed on the information superimposition appropriate frames according to respective visual point positions (visual line directions) of a plurality of users riding on a vehicle and that displays the content to allow respective users to appropriately watch the content. Note that, in FIG. 52, the description of the components with the same functions as the components in FIG. 42 will be appropriately omitted.

That is, FIG. 51 is different from FIG. 42 in that the users as occupants include three users 273-1 to 273-3, cameras 272 include three cameras 272-1 to 272-3 accordingly, and a display unit 351 is provided in place of the projection unit 106A.

The cameras 272-1 to 272-3 image the vehicle interior to image the users 273-1 to 273-3 as occupants, respectively, and supply the captured vehicle interior images to the output control unit 105. In this case, as in the case where there is one occupant, the output control unit 105 specifies a user visual point position EP1 of the user 273-1 from the image captured by the camera 272-1, specifies a user visual point position EP2 of the user 273-2 from the image captured by the camera 272-2, and specifies a user visual point position EP3 of the user 273-3 from the image captured by the camera 272-3. Note that only one camera 272 may be included, and the camera 272 may be able to image the entire vehicle interior. In this way, a plurality of users may be detected from one image, and the respective user visual point positions EP1 to EP3 may be detected.

In addition, on the basis of the information of the respective user visual point positions EP1 to EP3 of the users 273-1 to 273-3, the output control unit 105 generates scene images that allow the respective users 273-1 to 273-3 to watch the content in a state in which the content is naturally superimposed on the information superimposition appropriate frames. The output control unit 105 integrates the scene images into one image in chronological order.

Furthermore, the output control unit 105 outputs the scene images integrated into one image in chronological order to the display unit 351 while changing the scene images in chronological order.

The display unit 351 is provided with a liquid crystal polarization shutter 361 in addition to the projection unit 106A described above, and in displaying the images integrated into one scene image in chronological order, the output control unit 105 switches the polarization direction of the light transmitted by the liquid crystal polarization shutter 361 according to the timing of the display of the image to be watched by each of the users 273-1 to 273-3. In this way, the scene image is displayed in the state that allows each of the users 273-1 to 273-3 to watch only the images appropriate for each user.

Figure 53:
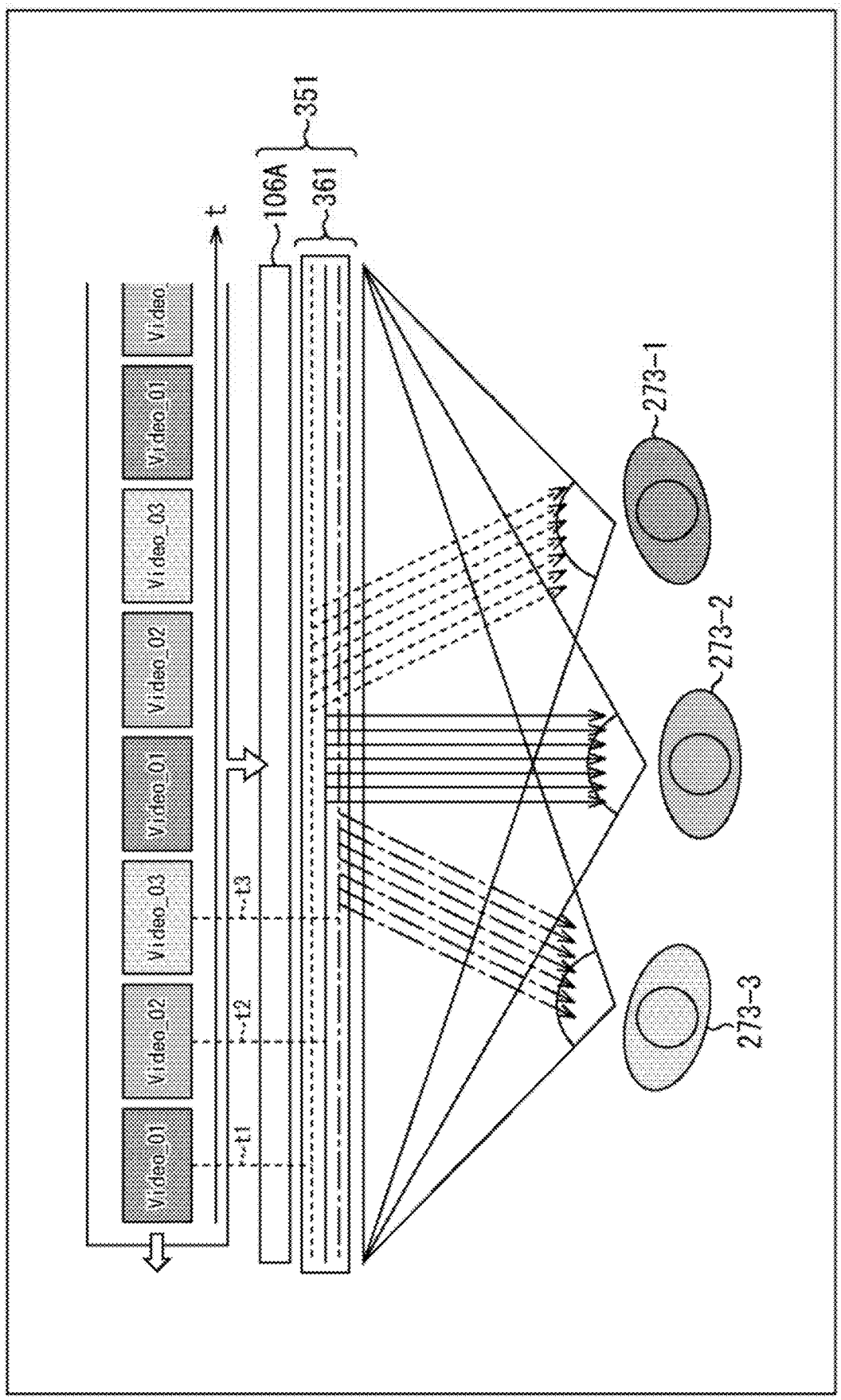
FIG. 53 is a diagram describing a configuration example of a display unit using a liquid crystal polarization shutter in the case of superimposing, defocusing, and displaying the content on the information superimposition appropriate frames according to the visual point positions of a plurality of users when there is a plurality of users.

Here, the configuration of the display unit 351 will be described with reference to FIG. 53. FIG. 53 illustrates the configuration in the case where the projection unit 106A included in the display unit 351 includes, for example, the transmissive display, and FIG. 53 is a top view from vertically above the display surface of the display unit 351.

In the case of FIG. 53, the users 273-1 to 273-3 on the lower side of FIG. 53 view, through the projection unit 106A, the scene on the upper side of FIG. 53 that is forward in the traveling direction. Therefore, the users 273-1 to 273-3 can watch forward in the traveling direction in the state in which the content is superimposed on the information superimposition appropriate frames on the projection unit 106A. In this way, the users 273-1 to 273-3 can watch content such that the content is naturally fit into the scene.

Meanwhile, when the images including the content that is suitable for each of a plurality of persons and that is superimposed on the information superimposition appropriate frames generated for each of the plurality of persons are integrated into one image in chronological order, the image is displayed as illustrated on the upper side of FIG. 53. That is, for example, an image for the user 273-1 indicated by Video_01 is displayed at time t1, and an image for the user 273-2 indicated by Video_02 is displayed at time t2. An image for the user 273-3 indicated by Video_03 is displayed at time t3, and such display is repeated.

Therefore, when one image integrated in chronological order is displayed in a state without the liquid crystal polarization shutter 361, each of the users 273-1 to 273-3 watches images not suitable for watching, two out of three times.

Therefore, the liquid crystal polarization shutter 361 is provided in a previous stage of the projection unit 106A, and the output control unit 105 controls the integrated image according to the timing of display to switch the polarization direction.

That is, the output control unit 105 causes the projection unit 106A to display the image for the user 273-1 at the timing of time t1 and controls the liquid crystal polarization shutter 361 as indicated by a dotted line to polarize the light in a direction that allows only the user 273-1 to watch the image as indicated by arrows of dotted lines.

In addition, the output control unit 105 causes the projection unit 106A to display the image for the user 273-2 at the timing of time t2 and controls the liquid crystal polarization shutter 361 as indicated by a solid line to polarize the light in a direction that allows only the user 273-2 to watch the image as indicated by arrows of solid lines.

Furthermore, the output control unit 105 causes the projection unit 106A to display the image for the user 273-3 at the timing of time t3 and controls the liquid crystal polarization shutter 361 as indicated by a chain line to polarize the light in a direction that allows only the user 273-3 to watch the image as indicated by arrows of chain lines.

Subsequently, the output control unit 105 repeats similar control to control the display unit 351 to allow each of the users 273-1 to 273-3 to watch only the images suitable for the user to watch. Note that the dotted line, the solid line, and the chain line in the liquid crystal polarization shutter 361 in FIG. 53 express control states of the liquid crystal polarization shutter 361, and the lines are not indicative of different shutters or the like.

According to the configuration described above, even when there is a plurality of users riding on the vehicle, the content can be displayed at optimal places in the scene in a state suitable for each user, in a form that the content is more fit into the scene. Each user can watch the content at each position in a way similar to viewing a normal scene.

<<3-2. Configuration Example of Vehicle Control System>>
<3-2-1. Overall Configuration of Vehicle Control System>

Figure 54:
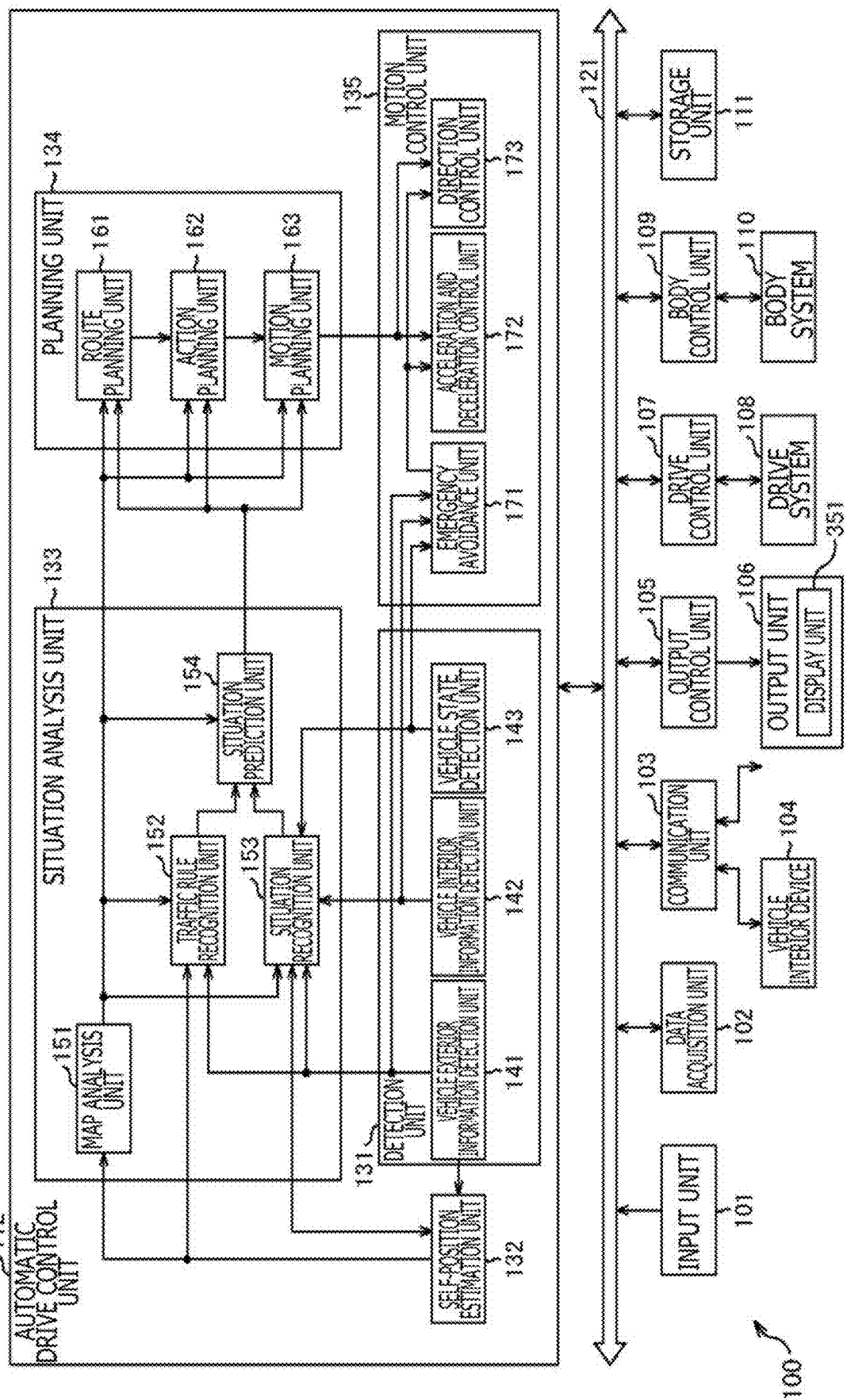
FIG. 54 is a block diagram illustrating a configuration example of the vehicle control system of the third embodiment.

FIG. 54 is a block diagram illustrating a configuration example of the vehicle control system 100 according to the third embodiment. Note that, in the vehicle control system 100 of FIG. 54, the same reference signs are provided to the components with the same functions as in the vehicle control system 100 of FIG. 8, and the description thereof will be appropriately omitted.

That is, the vehicle control system 100 of FIG. 54 is different from the vehicle control system 100 of FIG. 8 in that the display unit 351 is provided in place of the projection unit 106A.

The display unit 351 includes the projection unit 106A and the liquid crystal polarization shutter 361 as described with reference to FIG. 53.

The liquid crystal polarization shutter 361 switches the polarization direction to allow only the user 273 suitable for watching the image to watch the image according to the timing of display of the image when the images provided with the content on the information superimposition appropriate frames in the states respectively suitable for the plurality of users 273 are displayed as one image in chronological order.

Note that, although the projection unit 106A may be a transmissive display or a non-transmissive display, the configuration and the process suitable for each display are necessary as described in the second embodiment. That is, in the case where the projection unit 106A is a transmissive display, the display process as illustrated in the flow chart of FIG. 47 needs to be executed in the configuration of the display processing unit 254 as illustrated in FIG. 46. Furthermore, in the case where the projection unit 106A is a non-transmissive display, the display process as illustrated in the flow chart of FIG. 50 needs to be executed in the configuration of the display processing unit 254 as illustrated in FIG. 49.

<3-2-2. Configuration of Display Processing Unit>

Next, the configuration of the display processing unit 254 in the output control unit 105 of the vehicle control system 100 of FIG. 54 will be described with reference to FIG. 55. Note that, in the display processing unit 254 of FIG. 54, the same reference signs are provided to the components with the same functions as in the display processing unit 254 of FIG. 46, and the description thereof will be appropriately omitted.

Figure 55:
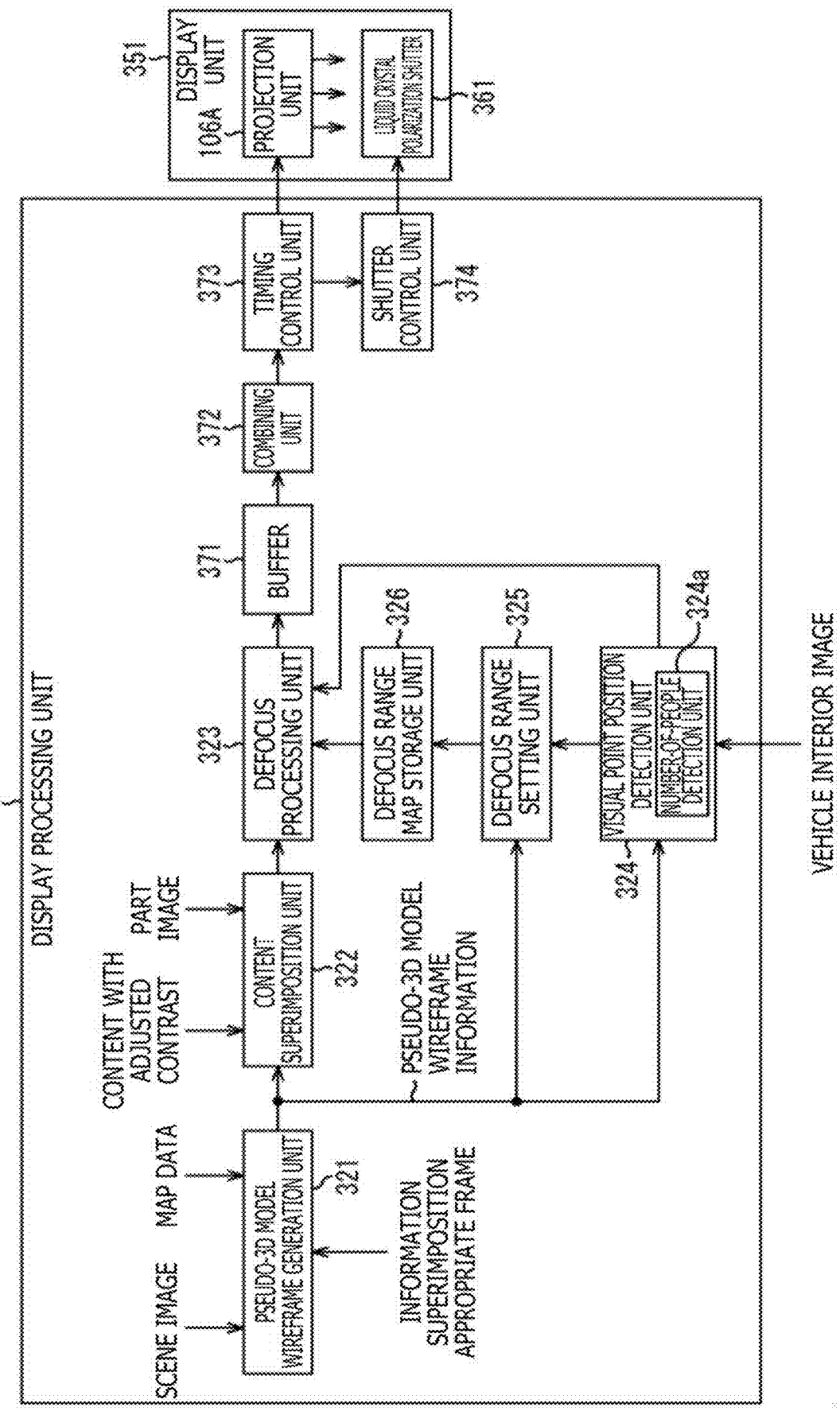
FIG. 55 is a block diagram illustrating a configuration example of the display processing unit when the liquid crystal polarization shutter is used for the display unit in the display control unit of the output control unit in the vehicle control system of FIG. 54.

That is, the difference from the display processing unit 254 of FIG. 46 is that the display processing unit 254 of FIG. 55 newly includes a buffer 371, a combining unit 372, a timing control unit 373, a shutter control unit 374, and a number-of-people detection unit 324a that detects the number of users in the visual point position detection unit 324.

The buffer 371 buffers the images, which are generated by using the components from the pseudo-3D model wireframe generation unit 321 to the defocus range map storage unit 326, generated according to each of the plurality of users 273 watching the images, provided with the content in the information superimposition appropriate frames, and subjected to the defocusing process according to the user watching position.

The combining unit 372 integrates and combines, in chronological order, the images, which are buffered by the buffer 371, suitable for each of the plurality of users watching the images, provided with the content in the information superimposition appropriate frames, and subjected to the defocusing process according to the user watching position, and outputs the images to the timing control unit 373. Note that the combining unit 372 integrates the images into one image in chronological order by including information for identifying the timing of the image to be displayed and the user 273 suitable for watching the image.

When the images integrated in chronological order are sequentially supplied, the timing control unit 373 recognizes any of the users 273 suitable for watching the images and causes the projection unit 106A to sequentially display the images. The timing control unit 373 also controls the shutter control unit 374 to control the polarization direction of the liquid crystal polarization shutter 361 to the direction facing the corresponding user 273.

The number-of-people detection unit 324a uses the vehicle interior image to detect the number of users on the basis of, for example, the number of face images detected by face detection or the like and notifies the defocus processing unit 323 of the number of users. Therefore, the defocus processing unit 323 applies the defocusing process to the images according to the supplied number of users.

Note that, although FIG. 55 illustrates the configuration of the case where the projection unit 106A is a transmissive display, the scene image is input to the defocus processing unit 323 as in the display processing unit 254 of FIG. 49 in the case where the projection unit 106A is a non-transmissive display. Furthermore, the defocus processing unit 323 attaches, to the scene image, the images provided with the content in the information superimposition appropriate frames and then applies the defocusing process to the entire scene image. Here, the configuration diagram of the display processing unit 254 corresponding to the non-transmissive display will not be illustrated.

<<3-3. Display Process of Display Processing Unit in FIG. 55>>

Next, the display process of the display processing unit 254 of FIG. 55 will be described with reference to a flow chart of FIG. 56.

In step S291, the defocus processing unit 323 initializes a counter m of an identifier for identifying the user to 1.

In step S292, the number-of-people detection unit 324a detects the number of users M as occupants from the images captured by the cameras 272-1 to 272-3, sets the identifier m for each user, and supplies the detection result to the defocus processing unit 323.

In step S293, the display process of the user identified by the identifier m among the users 273 is executed.

Here, the display process of the user m is, for example, the process of steps S201 to 210 in FIG. 47 corresponding to a user 273-m watching the image in the case where the projection unit 106A is the transmissive display. The display process of the user m is a process of steps S241 to 251 in FIG. 50 corresponding to a user m watching the image in the case where the projection unit 106A is the non-transmissive display. That is, in the process, the defocusing process corresponding to the user visual point position of the user 273-m is applied to generate the image in the state in which the content is superimposed on the information superimposition appropriate frames corresponding to the user 273-m watching the image.

In step S294, the defocus processing unit 323 associates the image generated in the display process of the user m with the identifier m and causes the buffer 371 to buffer the image.

In step S295, the defocus processing unit 323 determines whether or not the counter m matches the number of people M, that is, whether or not the images corresponding to all of the users are generated.

In a case where the counter m does not match M in step S295, that is, in a case where the images corresponding to all of the users are not generated, the process proceeds to step S296.

In step S296, the defocus processing unit 323 increments the counter m by 1, and the process returns to step S293.

That is, the process of steps S293 to S296 is repeated until the images are buffered by the buffer 371 after generating the images by executing the display process for all of the users.

Furthermore, in a case where the counter m matches M after generating the images corresponding to all of the users in step S295, that is, in a case where it is assumed that the display process is executed for all of the users, the process proceeds to step S297.

In step S297, the combining unit 372 integrates the images, which are buffered by the buffer 371, provided with the content on the information superimposition appropriate frames corresponding to all of the users, and subjected to the defocusing process according to the defocus range corresponding to the user watching position, into one image in chronological order.

In step S298, the timing control unit 373 sequentially supplies the integrated images to the projection unit 106A to cause the projection unit 106A to display the images and controls the shutter control unit 374 at a corresponding timing to control the liquid crystal polarization shutter 361 to polarize the light in the direction that allows the target user 273 to watch the displayed image.

As a result of the process described above, even when a plurality of users is riding on the vehicle, the content can be displayed at optimal places in the scene in the state suitable for each user, in a form that the content is more fit into the scene. Each user can watch the content at each position in a way similar to viewing a normal scene.

<<3-4. Modification>>

In the description above, the liquid crystal polarization shutter 361 switches the polarization directions of the images projected on the projection unit 106A to realize the plurality of users watching the images. Instead of using the liquid crystal polarization shutter 361, the images suitable for the plurality of users watching the images, respectively, may be vertically divided in pixel order in the frame to combine the images into one image, and the images may be displayed through lenticular lenses to allow each of the plurality of users to watch the image.

Figure 57:
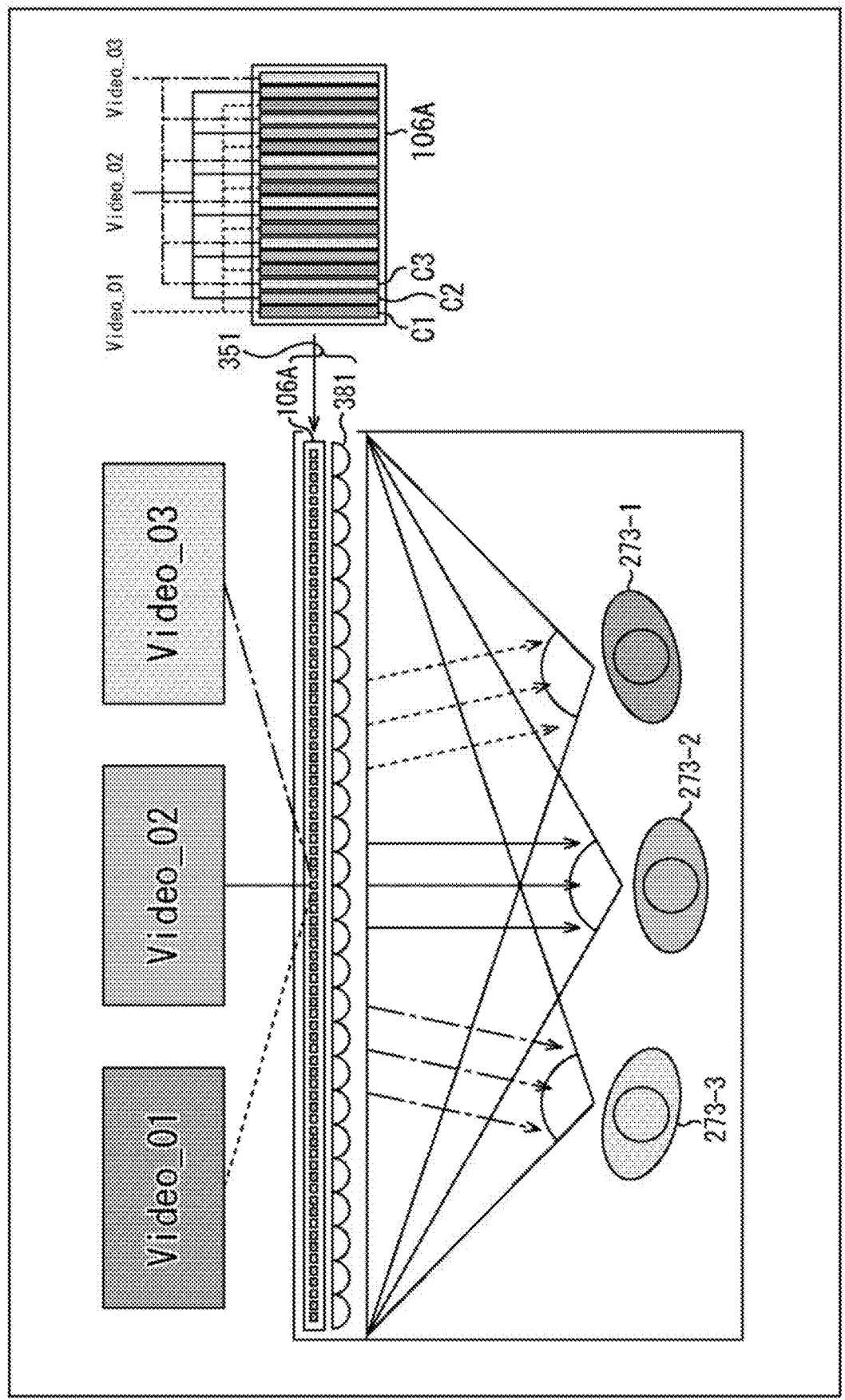
FIG. 57 is a diagram describing a configuration example of the display unit using lenticular lenses in the case of superimposing, defocusing, and displaying the content on the information superimposition appropriate frames according to the visual point positions of a plurality of users when there is a plurality of users.

FIG. 57 is a diagram illustrating a configuration example of the display unit 351 according to a modification. Note that the same reference signs are provided to the components with the same functions as in the display unit 351 of FIG. 53, and the description thereof will be appropriately omitted.

That is, the display unit 351 of FIG. 57 is different from the display unit 351 of FIG. 53 in that lenticular lenses 381 are provided in place of the liquid crystal polarization shutter 361.

Furthermore, as illustrated on the upper right in FIG. 57, the image Video_01 for the user 273-1, the image Video_02 for the user 273-2, and the image Video_03 for the user 273-3 are repeatedly arranged in a state in which the images are divided into regions C1, C2, and C3 divided on the basis of columns formed in pixel order to thereby display the images combined into one image in the projection unit 106A.

The lenticular lenses 381 selectively transmit the image Video_01 in the direction that allows the user 273-1 to watch, selectively transmit the image Video_02 in the direction that allows the user 273-2 to watch, and selectively transmit the image Video_03 in the direction that allows the user 273-3 to watch, among the images displayed on the projection unit 106A.

According to the configuration described above, even when a plurality of users is riding on the vehicle, the content can be displayed at optimal places in the scene in the state suitable for each user, in a form that the content is more fit into the scene. Each user can watch the content at each position in a way similar to viewing a normal scene.

<3-4-1. Configuration of Display Processing Unit>

Next, the configuration of the display processing unit 254 in the output control unit 105 of the vehicle control system 100 of FIG. 52 will be described with reference to FIG. 58. Note that, in the display processing unit 254 of FIG. 57, the same reference signs are provided to the components with the same functions as in the display processing unit 254 of FIG. 55, and the description will be appropriately omitted.

Figure 58:
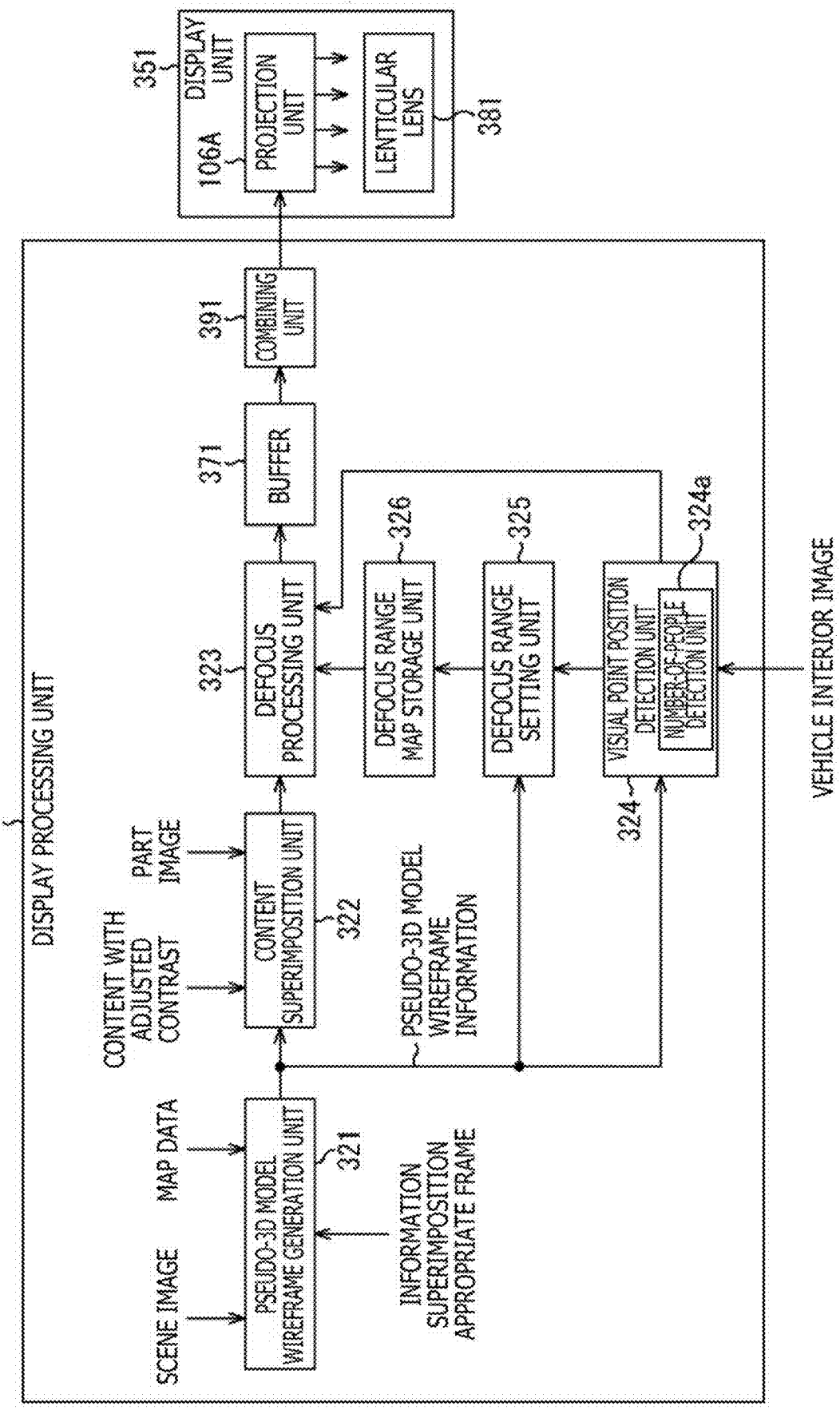
FIG. 58 is a block diagram illustrating a configuration example of the display processing unit when the lenticular lenses are used for the display unit in the display control unit of the output control unit in the vehicle control system of FIG. 54.

That is, the display processing unit 254 of FIG. 58 is different from the display processing unit 254 of FIG. 55 in that a combining unit 391 is provided in place of the combining unit 372, the timing control unit 373, and the shutter control unit 374.

The combining unit 391 divides the images that are buffered by the buffer 371 and that are respectively suitable for a plurality of users watching the images into regions on the basis of columns in pixel order and combines the images into one image. The combining unit 391 outputs the image to the projection unit 106A of the display unit 351.

The projection unit 106A projects the image obtained by integrating, into one image, the images that are divided into regions on the basis of columns in pixel order and that are respectively suitable for the plurality of users watching the images. In this way, the projection unit 106A projects the images through the lenticular lenses 381 in the state that allows each of the users 273 to appropriately watch the images.

Note that, although the projection unit 106A may be a transmissive display or a non-transmissive display, the configuration and the process suitable for each display are necessary as described in the second embodiment. That is, in the case where the projection unit 106A is a transmissive display, the display process as illustrated in the flow chart of FIG. 47 needs to be executed in the configuration of the display processing unit 254 as illustrated in FIG. 46. Furthermore, in the case where the projection unit 106A is a non-transmissive display, the display process as illustrated in the flow chart of FIG. 50 needs to be executed in the configuration of the display processing unit 254 as illustrated in FIG. 49.

<3-4-2. Display Process of Display Processing Unit in FIG. 57>

Next, the display process of the display processing unit 254 in FIG. 58 will be described with reference to a flow chart of FIG. 59.

Figure 56:
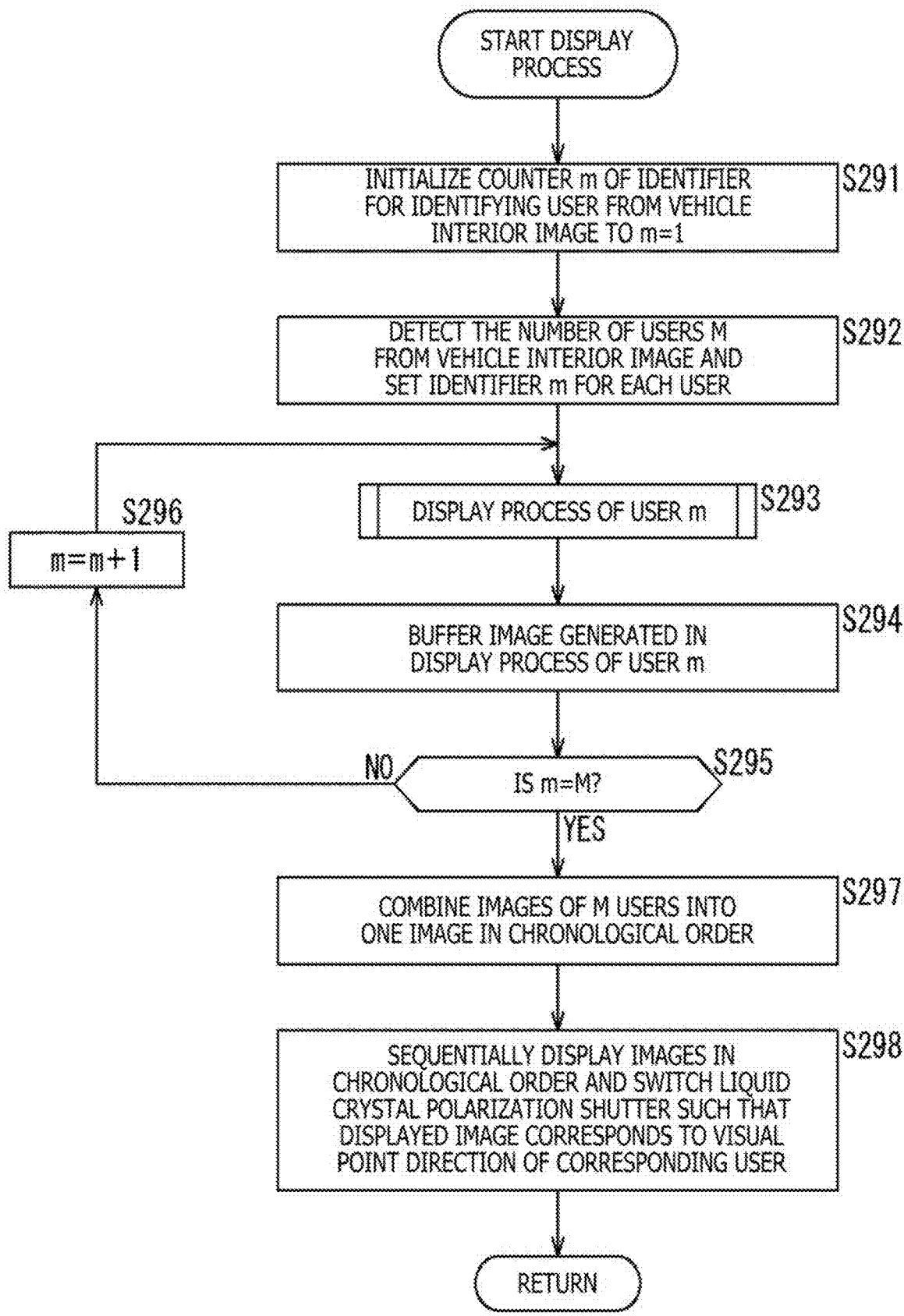
FIG. 56 is a flow chart describing a display process of the display control unit of FIG. 45 in which the display processing unit of FIG. 55 is applied.
Figure 59:
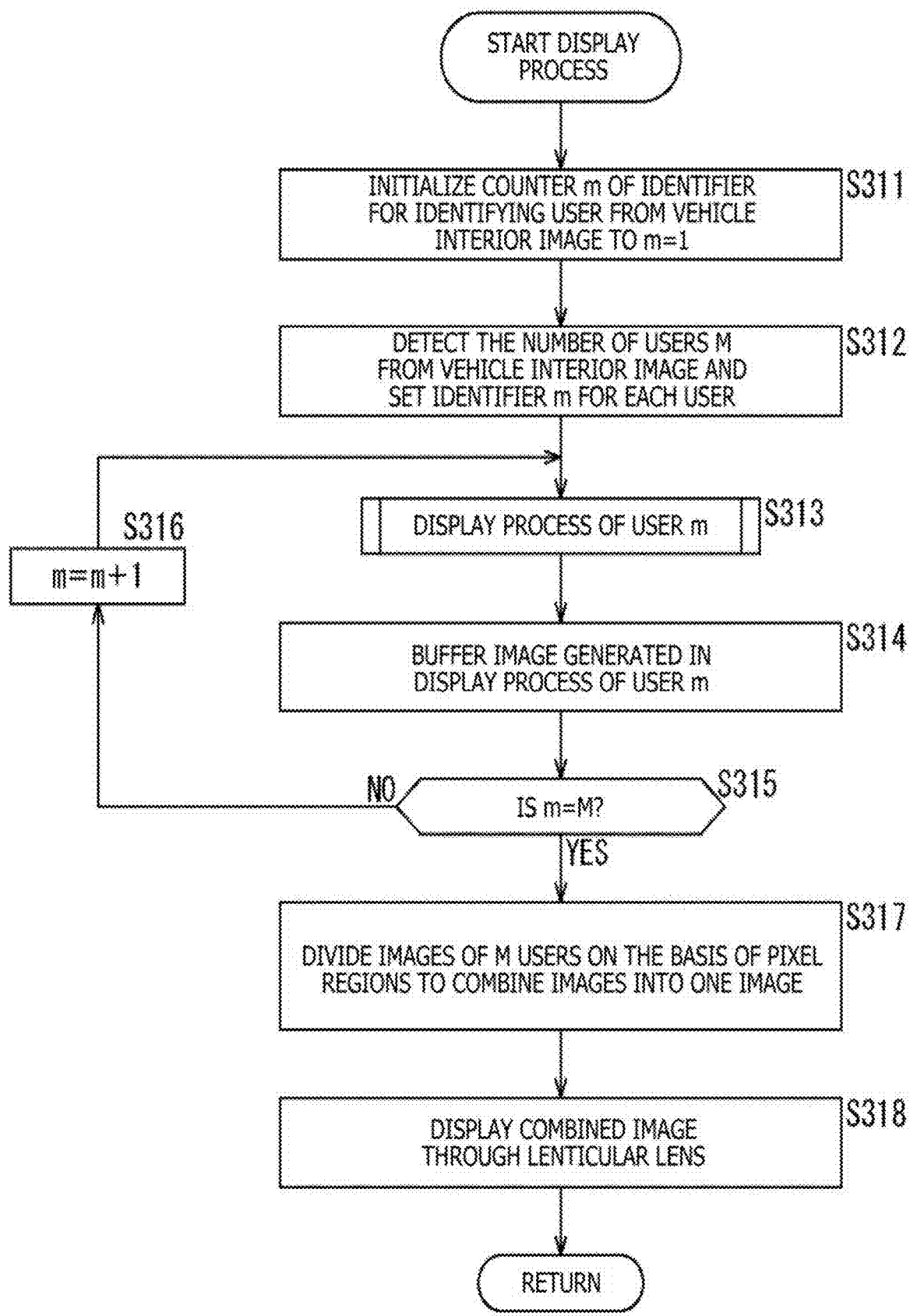
FIG. 59 is a flow chart describing a display process of the display control unit of FIG. 45 in which the display processing unit of FIG. 58 is applied.

The process of steps S311 to S316 in the flow chart of FIG. 59 is similar to the process of steps S291 to S296 in the flow chart of FIG. 56, and the description thereof will not be repeated.

That is, in the process of steps S311 to S316, the display process corresponding to all of the users is executed, the content is superimposed on the information superimposition appropriate frames corresponding to all of the users, images are generated by executing the defocusing process according to the distances from the respective user visual point positions, and the images are buffered by the buffer 371. The process then proceeds to step S317.

In step S317, the combining unit 391 divides the images, which are buffered by the buffer 371, provided with the content on the information superimposition appropriate frames corresponding to all of the users, and subjected to the defocusing process in the defocusing ranges corresponding to the distances from the user watching positions, into regions on the basis of columns in predetermined pixel order. The combining unit 391 combines and integrates the images into one image as described with reference to FIG. 57.

In step S318, the combining unit 391 causes the projection unit 106A to project the image obtained by integrating, into one image, the images subjected to the defocusing process corresponding to the plurality of users and causes the projection unit 106A to selectively polarize the light through the lenticular lenses 381 and project the image. In this way, the plurality of users watches the images suitable for the respective users.

As a result of the process described above, even when a plurality of users is riding on the vehicle, the content can be displayed at optimal places in the scene image in the state suitable for each user, in a form that the content is more fit into the scene. Each user can watch the content at each position in a way similar to viewing a normal scene.

Note that, hereinafter, the process of the case where there is one user as in the second embodiment will be referred to as a single mode process, and the process of the case where there is a plurality of users as in the third embodiment will be referred to as a multi-mode process.

As described above, even just one camera 272 that captures the vehicle interior image can realize the multi-mode. Therefore, the single mode process and the multi-mode process may be switched and used by using one camera 272.

In addition, although the process of displaying the image naturally fit into the scene in the traveling direction is mainly described above, the technique may also be used in a performance for prompting to watch a specific object.

That is, even in a state in which there is a plurality of users and the multi-mode process is executed, the control may be performed to allow all of the users to watch the same image according to the visual point position of a specific user.

For example, in a situation where a bus guide of a tourist bus or the like introduces a specific historical or famous spot, the defocusing process may be applied to the content superimposed on the information superimposition appropriate frames according to the user visual point position of the bus guide as a specific user, and all of the passengers of the bus that are users other than the specific user may be able to watch the image.

This allows a performance for naturally directing the visual line toward the historical or famous spot introduced by the bus guide now, and the guidance by the bus guide can be easily understood.

Furthermore, in stage production or the like, when the visual line is toward a thing that the stage director particularly wants the user to view, the image is defocused to allow the user to sharply watch the thing at the user visual point position that the stage director particularly wants the user to view. For other things, the images are more defocused to obscurely display the images, and the entire audience of the stage can watch the images. In this way, the technique can also be used for stage production and the like.

That is, in this case, the defocus range is set small for the thing that the stage director wants the user to watch, and a more focused sharp image can be recognized. In contrast, the defocus range is set large for a thing that the stage director does not want the user to watch, and the image can be watched more obscurely. As a result, the effect of the stage production can be increased.

Note that, although the number of users is three in the case described above, the number of users may be other numbers.

<Configuration Example of Computer>

The series of processes described above can be executed by hardware or can be executed by software. In a case where the series of processes are executed by software, a program included in the software is installed from a program recording medium to a computer incorporated into dedicated hardware, a general-purpose computer, or the like.

FIG. 60 is a block diagram illustrating a configuration example of hardware of a computer that uses a program to execute the series of processes. The computer illustrated in FIG. 60 executes a predetermined program to realize the functions of the components including the automatic drive control unit 112 illustrated in FIGS. 8 and 54.

A CPU (Central Processing Unit) 1001, a ROM (Read Only Memory) 1002, and a RAM (Random Access Memory) 1003 are connected to each other through a bus 1004.

An input-output interface 1005 is further connected to the bus 1004. An input unit 1006 including a keyboard, a mouse, or the like and an output unit 1007 including a display, a speaker, or the like are connected to the input-output interface 1005. In addition, a storage unit 1008 including a hard disk, a non-volatile memory, or the like, a communication unit 1009 including a network interface or the like, and a drive 1010 that drives a removable recording medium 1011 are connected to the input-output interface 1005.

In the computer configured in this way, the CPU 1001 loads the program stored in, for example, the storage unit 1008 to the RAM 1003 through the input-output interface 1005 and the bus 1004 to execute the program to thereby execute the series of processes described above.

The program executed by the CPU 1001 is provided by, for example, recording the program in the removable recording medium 1011 or is provided through a wired or wireless transmission medium, such as a local area network, the Internet, and digital broadcasting, and the program is installed on the storage unit 1008.

Note that the program executed by the computer may be a program for executing the processes in chronological order described in the present specification or may be a program for executing the processes in parallel or at a necessary timing such as when the processes are invoked.

The system in the present specification denotes a set of a plurality of constituent elements (apparatuses, modules (components), and the like), and whether or not all of the constituent elements are in the same housing does not matter. Therefore, a plurality of apparatuses stored in separate housings and connected through a network and one apparatus storing a plurality of modules in one housing are both systems.

Note that the advantageous effects described in the present specification are illustrative only, and the advantageous effects are not limited. There may also be other advantageous effects.

The embodiments of the present technique are not limited to the embodiments described above, and various changes can be made without departing from the scope of the present technique.

For example, the present technique can be provided as cloud computing in which a plurality of apparatuses shares one function and cooperates to execute a process through a network.

In addition, one apparatus can execute each step described in the flow charts, or a plurality of apparatuses can take charge and execute each step.

Furthermore, in the case where one step includes a plurality of processes, one apparatus can execute the plurality of processes included in one step, or a plurality of apparatuses can take charge and execute the processes.

<Example of Combination of Configurations>

The present technique can also be configured as follows.

(1)

An information processing apparatus including:
a setting unit that sets a frame as a superimposition location of content in a region corresponding to a surface of an object on the basis of a movement state of a user; and
a display control unit that generates visual information for displaying the content in the region corresponding to the set frame.

(2)

The information processing apparatus according to (1), further including:
a prediction unit that predicts the movement state including a traveling route and a traveling speed of a moving body on which the user rides.

(3)

The information processing apparatus according to (1) or (2), further including:
a detection unit that detects the object by analyzing an image obtained by imaging a scene in a traveling direction.

(4)

The information processing apparatus according to any one of (1) to (3), in which
the setting unit sets the frame on the basis of angles toward the surface of the object from respective positions including a first position on a movement route and a second position after a lapse of predetermined time.

(5)

The information processing apparatus according to any one of (1) to (4), in which
the setting unit sets the frame on the basis of an angle of the surface of the object with respect to a traveling direction.

(6)

The information processing apparatus according to any one of (1) to (5), in which
the setting unit sets the frame on the basis of an exposed area of the surface of the object in a case where the surface of the object is blocked by another object in front.

(7)

The information processing apparatus according to any one of (1) to (6), in which
the setting unit sets the frame on the basis of time that the surface of the object is included in a visual field of the user obtained on the basis of the movement state.

(8)

The information processing apparatus according to any one of (1) to (7), further including:
a light state detection unit that detects a state of light on the surface of the object, in which
the setting unit sets the frame on the basis of the state of light.

(9)

The information processing apparatus according to any one of (1) to (8), further including:
a calculation unit that calculates fitness of each content and each frame on the basis of information regarding specifications required for displaying the content, in which
the display control unit generates the visual information for displaying each content in the region corresponding to the frame selected on the basis of the fitness.

(10)

The information processing apparatus according to (9), in which
the calculation unit calculates the fitness on the basis of an element that varies according to a type of the content.

(11)

The information processing apparatus according to (10), in which in a case where the content is an image, the calculation unit calculates the fitness on the basis of a relationship between an aspect ratio of the image and an aspect ratio of the frame.

(12)

The information processing apparatus according to (11), in which in a case where the content is a moving image, the calculation unit calculates the fitness also on the basis of a relationship between reproduction time of the moving image and time that the frame is included in a visual field of the user.

(13)

The information processing apparatus according to (10), in which in a case where the content includes characters, the calculation unit calculates the fitness on the basis of at least any one of a relationship between an aspect ratio of a display range of the characters and an aspect ratio of the frame and a relationship between viewing time defined by the number of characters and the time that the frame is included in a visual field of the user.

(14)

The information processing apparatus according to any one of (1) to (13), in which the display control unit applies a defocusing process to the visual information that is generated in the region corresponding to the set frame and is for displaying the content on the basis of a visual point position of the user riding on a moving body.

(15)

The information processing apparatus according to (14), further including:

an imaging unit that images the user riding on the moving body; and a defocus range setting unit that sets a defocus range according to a distance between the specified visual point position of the user and each position of the region corresponding to the frame on the basis of an image taken by the imaging unit, in which the display control unit applies, according to the defocus range, the defocusing process to the visual information that is generated in the region corresponding to the set frame and is for displaying the content on the basis of the visual point position of the user riding on the moving body.

(16)

The information processing apparatus according to (15), in which the closer the distance between each position of the region corresponding to the frame and the visual point position of the user is, the smaller the defocus range set by the defocus range setting unit is, the farther the distance between each position of the region corresponding to the frame and the visual point position of the user is, the larger the defocus range set by the defocus range setting unit is, and the smaller the defocus range is, the higher a degree of focus in the defocusing process of the display control unit applied to the visual information that is generated in the region corresponding to the set frame and is for displaying the content on the basis of the visual point position of the user riding on the moving body is, the larger the defocus range is, the higher a degree of defocus in the defocusing process of the display control unit is.

(17)

The information processing apparatus according to any one of (14) to (16), in which the setting unit sets, for each of a plurality of the users, the frame as the superimposition location of the content in the region corresponding to the surface of the object on the basis of the movement state of the user, and the display control unit applies the defocusing process to the visual information that is generated in the region corresponding to the frame set for each of the plurality of the users and is for displaying the content.

(18)

An information processing method executed by an information processing apparatus, the method including:

setting a frame as a superimposition location of content in a region corresponding to a surface of an object on the basis of a movement state of a user; and generating visual information for displaying the content in the region corresponding to the set frame.

(19)

A program for causing a computer to execute a process including:

setting a frame as a superimposition location of content in a region corresponding to a surface of an object on the basis of a movement state of a user; and generating visual information for displaying the content in the region corresponding to the set frame.

(20)

A moving body including:

a setting unit that sets a frame as a superimposition location of content in a region corresponding to a surface of an object on the basis of a movement state of a user;

a display control unit that generates visual information for displaying the content in the region corresponding to the set frame; and an output unit that displays the visual information.

(21)

The information processing apparatus according to any one of (1) to (13), further including:

an adjustment unit that adjusts contrast of the content on the basis of context of the frame, in which the display control unit generates, in the region corresponding to the frame, the visual information for displaying the content with adjusted contrast.

(22)

The information processing apparatus according to (21), in which the adjustment unit uses, as the context, at least any one of a state of sunlight, a state of lighting, a state of atmosphere, and the distance to the frame to adjust the contrast of the content.

(23)

The information processing apparatus according to (21) or (22), further including:

an image processing unit that cuts out, from the image obtained by imaging, a region of another object in front of the frame, in which the display control unit generates the visual information for displaying an image of the region of the other object on top of the content with adjusted contrast.

REFERENCE SIGNS LIST

105 Output control unit, 201 Information superimposition appropriate visual field setting unit, 202 Superimposition target frame selection unit, 203 Display control unit, 204 Content acquisition unit, 211 Image analysis unit, 212 Light state mode setting unit, 213 Object detection unit, 214 Frame setting unit, 215 Appropriate visual field setting unit, 231 Pre-analysis unit, 232 Fitness calculation unit, 233 Superimposition location setting unit, 251 Fitting contrast calculation unit, 252 Contrast adjustment unit, 253 Mask processing unit, 254 Display processing unit, 271, 272, 272-1 to 272-3 Camera, 321 Pseudo-3D model wireframe generation unit, 322 Content superimposition unit, 323 Defocus processing unit, 324 Visual point position detection unit, 324*a* Number-of-people detection unit, 325 Defocus range setting unit, 326 Defocus range map storage unit, 361 Liquid crystal polarization shutter, 371 Buffer, 372 Combining unit, 373 Timing control unit, 374 Shutter control unit, 381 Lenticular lens, 391 Combining unit

The invention claimed is:

1. An information processing apparatus comprising:
   circuitry configured to:
   track an angular velocity of a visual field of a user relative to a surface of an object;
   set a frame as a superimposition location of content in a region corresponding to the surface of the object on a basis of a movement state of a moving body on which the user rides and on a basis of the angular velocity of the visual field of the user relative to the surface of the object being within a predetermined range; and
   generate visual information for displaying the content in the region corresponding to the set frame.

2. The information processing apparatus according to claim 1, wherein the circuitry is configured to:
   predict the movement state including a traveling route and a traveling speed of the moving body on which the user rides.

3. The information processing apparatus according to claim 1, further comprising:
   a detector that detects the object by analyzing an image obtained by imaging a scene in a traveling direction.

4. The information processing apparatus according to claim 1, wherein the circuitry is configured to:
   set the frame on a basis of angles toward the surface of the object from respective positions including a first position on a movement route and a second position after a lapse of predetermined time.

5. The information processing apparatus according to claim 1, wherein the circuitry is configured to:
   set the frame on a basis of an angle of the surface of the object with respect to a traveling direction.

6. The information processing apparatus according to claim 1, wherein the circuitry is configured to:
   set the frame on a basis of an exposed area of the surface of the object in a case where the surface of the object is blocked by another object in front.

7. The information processing apparatus according to claim 1, wherein the circuitry is configured to:
   set the frame on a basis of time that the surface of the object is included in a visual field of the user obtained on a basis of the movement state.

8. The information processing apparatus according to claim 1, further comprising:
   a light state detector that detects a state of light on the surface of the object, wherein
   the circuitry sets the frame on a basis of the state of light.

9. The information processing apparatus according to claim 1, wherein the circuitry is configured to:
   calculate fitness of each content and each frame on a basis of information regarding specifications required for displaying the content, and
   generate the visual information for displaying each content in the region corresponding to the frame selected on a basis of the fitness.

10. The information processing apparatus according to claim 9, wherein
    the circuitry is configured to calculate the fitness on a basis of an element that varies according to a type of the content.

11. The information processing apparatus according to claim 10, wherein
    in a case where the content is an image, the circuitry calculates the fitness on a basis of a relationship between an aspect ratio of the image and an aspect ratio of the frame.

12. The information processing apparatus according to claim 11, wherein
    in a case where the content is a moving image, the circuitry calculates the fitness also on the basis of a relationship between reproduction time of the moving image and time that the frame is included in a visual field of the user.

13. The information processing apparatus according to claim 10, wherein
    in a case where the content includes characters, the circuitry calculates the fitness on a basis of at least any one of a relationship between an aspect ratio of a display range of the characters and an aspect ratio of the frame and a relationship between viewing time defined by the number of characters and the time that the frame is included in a visual field of the user.

14. The information processing apparatus according to claim 1, wherein
    the circuitry is configured to apply a defocusing process to the visual information that is generated in the region corresponding to the set frame and is for displaying the content on a basis of a visual point position of the user riding on a moving body.

15. The information processing apparatus according to claim 14, further comprising:
    an imager that images the user riding on the moving body; and
    the circuitry is configured to set a defocus range according to a distance between the specified visual point position of the user and each position of the region corresponding to the frame on a basis of an image taken by the imager wherein
    the circuitry is configured to apply, according to the defocus range, the defocusing process to the visual information that is generated in the region corresponding to the set frame and is for displaying the content on a basis of the visual point position of the user riding on the moving body.

16. The information processing apparatus according to claim 15, wherein
    the closer the distance between each position of the region corresponding to the frame and the visual point position of the user is, the smaller the defocus range set by the circuitry is, the farther the distance between each position of the region corresponding to the frame and the visual point position of the user is, the larger the defocus range set by the circuitry is, and
    the smaller the defocus range is, the higher a degree of focus in the defocusing process of the circuitry applied to the visual information that is generated in the region corresponding to the set frame and is for displaying the content on a basis of the visual point position of the user riding on the moving body is, the larger the defocus range is, the higher a degree of defocus in the defocusing process of the circuitry is.

17. The information processing apparatus according to claim 14, wherein the circuitry is configured to
set for each of a plurality of the users, the frame as the superimposition location of the content in the region corresponding to the surface of the corresponding object on a basis of the movement state of the user, and
apply the defocusing process to the visual information that is generated in the region corresponding to the frame set for each of the plurality of the users and is for displaying the content.

18. An information processing method executed by an information processing apparatus, the method comprising:
tracking an angular velocity of a visual field of a user relative to a surface of an object;
setting a frame as a superimposition location of content in a region corresponding to the surface of the object on the basis of a movement state of a moving body on which the user rides and on a basis of the angular velocity of the visual field of the user relative to the surface of the object being within a predetermined range; and
generating visual information for displaying the content in the region corresponding to the set frame.

19. A non-transitory computer-readable medium storing executable instructions which when executed by circuitry cause the circuitry to perform a method, the method comprising:
tracking an angular velocity of a visual field of a user relative to a surface of an object;
setting a frame as a superimposition location of content in a region corresponding to the surface of the object on the basis of a movement state of a moving body on which the user rides and on a basis of the angular velocity of the visual field of the user relative to the surface of the object being within a predetermined range; and
generating visual information for displaying the content in the region corresponding to the set frame.

20. A moving body comprising:
circuitry configured to:
track an angular velocity of a visual field of a user relative to a surface of an object;
set a frame as a superimposition location of content in a region corresponding to the surface of the object on a basis of a movement state of the moving body on which the user rides and on a basis of the angular velocity of the visual field of the user relative to the surface of the object being within a predetermined range;
generate visual information for displaying the content in the region corresponding to the set frame; and
display the visual information.

* * * * *